US010759446B2

(12) United States Patent
Motomura et al.

(10) Patent No.: US 10,759,446 B2
(45) Date of Patent: Sep. 1, 2020

(54) INFORMATION PROCESSING SYSTEM, INFORMATION PROCESSING METHOD, AND PROGRAM

(71) Applicant: PANASONIC INTELLECTUAL PROPERTY MANAGEMENT CO., LTD., Osaka (JP)

(72) Inventors: Hideto Motomura, Kyoto (JP); Mohamed Sahim Kourkouss, Osaka (JP); Yoshihide Sawada, Tokyo (JP); Toshiya Mori, Osaka (JP); Masanaga Tsuji, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 319 days.

(21) Appl. No.: 15/567,268

(22) PCT Filed: Apr. 21, 2016

(86) PCT No.: PCT/JP2016/002125
§ 371 (c)(1),
(2) Date: Oct. 17, 2017

(87) PCT Pub. No.: WO2016/170786
PCT Pub. Date: Oct. 27, 2016

(65) Prior Publication Data
US 2018/0105186 A1    Apr. 19, 2018

(30) Foreign Application Priority Data

Apr. 21, 2015  (JP) ................................ 2015-087069
May 14, 2015  (JP) ................................ 2015-099474
(Continued)

(51) Int. Cl.
B60W 50/14        (2020.01)
B60W 40/09        (2012.01)
(Continued)

(52) U.S. Cl.
CPC ............. B60W 50/14 (2013.01); B60K 35/00 (2013.01); B60R 16/02 (2013.01); B60W 40/09 (2013.01);
(Continued)

(58) Field of Classification Search
CPC ...... B60W 50/14; B60W 40/09; B60W 50/00; B60W 50/0097; B60W 2050/0002;
(Continued)

(56) References Cited

U.S. PATENT DOCUMENTS 5,483,446 A * 1/1996 Momose ................. F16H 59/00
                                                                701/1
2009/0174540 A1  7/2009 Smith
(Continued)

FOREIGN PATENT DOCUMENTS

DE    102011121948 A1    6/2013
EP        2669109 A1   12/2013
(Continued)

OTHER PUBLICATIONS

The Extended European Search Report dated Mar. 6, 2018 from the European Patent Office (EPO) for the related European Patent Application No. 16782788.0.
(Continued)

Primary Examiner — Nicholas K Wiltey
Assistant Examiner — Terry C Buse
(74) Attorney, Agent, or Firm — Greenblum & Bernstein, P.L.C.

(57) ABSTRACT

An information processing system that appropriately estimates a driving conduct includes: a detector that detects a
(Continued)

vehicle environment state, which is at least one of surroundings of a vehicle and a driving state of the vehicle; a behavior learning unit configured to cause a neural network to learn a relationship between the vehicle environment state detected by the detector and a behavior of the vehicle implemented after the vehicle environment state; and a behavior estimation unit configured to estimate a behavior of the vehicle by inputting, into the neural network that learned, the vehicle environment state detected at a current point in time by the detector.

6 Claims, 57 Drawing Sheets

(30) Foreign Application Priority Data

| Jun. 12, 2015 | (JP) | 2015-119139 |
|---|---|---|
| Oct. 30, 2015 | (JP) | 2015-215049 |
| Feb. 29, 2016 | (JP) | 2016-038476 |

(51) Int. Cl.
*B60K 35/00* (2006.01)
*B60R 16/02* (2006.01)
*B60W 50/00* (2006.01)
*G08G 1/01* (2006.01)
*G08G 1/0967* (2006.01)
*G08G 1/16* (2006.01)
*G08G 1/0962* (2006.01)
*G06K 9/62* (2006.01)
*G06N 3/08* (2006.01)
*G06K 9/00* (2006.01)
*G06N 3/04* (2006.01)
*G05D 1/00* (2006.01)

(52) U.S. Cl.
CPC ........ *B60W 50/00* (2013.01); *B60W 50/0097* (2013.01); *G05D 1/0088* (2013.01); *G06K 9/00791* (2013.01); *G06K 9/00845* (2013.01); *G06K 9/6274* (2013.01); *G06N 3/0454* (2013.01); *G06N 3/08* (2013.01); *G08G 1/0112* (2013.01); *G08G 1/0129* (2013.01); *G08G 1/0141* (2013.01); *G08G 1/0962* (2013.01); *G08G 1/09626* (2013.01); *G08G 1/096716* (2013.01); *G08G 1/096725* (2013.01); *G08G 1/096741* (2013.01); *G08G 1/096775* (2013.01); *G08G 1/167* (2013.01); *B60W 2050/0002* (2013.01); *B60W 2050/0075* (2013.01); *B60W 2050/146* (2013.01); *B60W 2420/42* (2013.01); *B60W 2420/52* (2013.01); *B60W 2520/10* (2013.01); *B60W 2530/14* (2013.01); *B60W 2540/10* (2013.01); *B60W 2540/12* (2013.01); *B60W 2540/20* (2013.01); *B60W 2554/00* (2020.02); *B60W 2554/80* (2020.02); *B60W 2556/50* (2020.02); *G05D 2201/0213* (2013.01)

(58) Field of Classification Search
CPC ... B60W 2050/0075; B60W 2050/146; B60W 2420/42; B60W 2420/52; B60W 2520/10; B60W 2530/14; B60W 2540/10; B60W 2540/12; B60W 2540/20; B60W 2550/20; B60W 2550/30; B60W 2550/402; B60K 35/00; B60R 16/02; G06K 9/00791; G06K 9/00845; G06K 9/6274; G06N 3/0454; G06N 3/08; G08G 1/0112; G08G 1/0129; G08G 1/0141; G08G 1/0962; G08G 1/09626; G08G 1/096716; G08G 1/096725; G08G 1/096741; G08G 1/096775; G08G 1/167; G05D 2201/0213; G05D 1/0088
USPC .......................................................... 701/23
See application file for complete search history.

(56) References Cited

U.S. PATENT DOCUMENTS

| 2009/0174572 A1 | 7/2009 | Smith | |
|---|---|---|---|
| 2009/0174573 A1 | 7/2009 | Smith | |
| 2009/0234552 A1 | 9/2009 | Takeda et al. | |
| 2012/0265596 A1* | 10/2012 | Mazed | G06Q 20/12 705/14.23 |
| 2012/0268260 A1* | 10/2012 | Miller | G08G 1/166 340/435 |
| 2013/0179023 A1 | 7/2013 | Schmidt | |
| 2013/0302756 A1 | 11/2013 | Takeuchi et al. | |
| 2015/0178620 A1* | 6/2015 | Ascari | G06N 3/063 706/21 |
| 2016/0231743 A1 | 8/2016 | Bendewald et al. | |
| 2019/0187705 A1* | 6/2019 | Ganguli | B60W 30/12 |

FOREIGN PATENT DOCUMENTS

| JP | 2002-140786 | | 5/2002 |
|---|---|---|---|
| JP | 2004-034917 | A | 2/2004 |
| JP | 3583873 | B2 | 11/2004 |
| JP | 2005-067483 | | 3/2005 |
| JP | 2006-243856 | | 9/2006 |
| JP | 2007-198853 | | 8/2007 |
| JP | 2009-110184 | | 5/2009 |
| JP | 2009-205646 | | 9/2009 |
| JP | 2009-234442 | | 10/2009 |
| JP | 2009-245149 | | 10/2009 |
| JP | 2010-211380 | | 9/2010 |
| JP | 2012-113631 | | 6/2012 |
| JP | 2013-117809 | A | 6/2013 |
| JP | 2014-081947 | A | 5/2014 |
| JP | 2015-022499 | A | 2/2015 |
| WO | 2007/077867 | | 7/2007 |
| WO | 2015/049231 | A1 | 4/2015 |

OTHER PUBLICATIONS

The Extended European Search Report dated May 9, 2018 from the European Patent Office (EPO) for the related European Patent Application No. 16782797.1.
Office Action from Japan Patent Office (JPO) in Japanese Patent Appl. No. 2016-195803, dated Jul. 3, 2018.
U.S. Appl. No. 15/567,791 to Masanaga Tsuji et al., filed Oct. 19, 2017.
International Search Report (ISR) from International Searching Authority (Japan Patent Office) in International Pat. Appl. No. PCT/JP2016/002125, dated Jul. 19, 2016.
Japanese Office Action dated Apr. 7, 2020 issued in Japanese patent application No. 2016-195802 with English machine translation.
Japanese Office Action dated Apr. 21, 2020 issued in Japanese patent application No. 2016-232084 with English machine translation.

\* cited by examiner

FIG. 48A
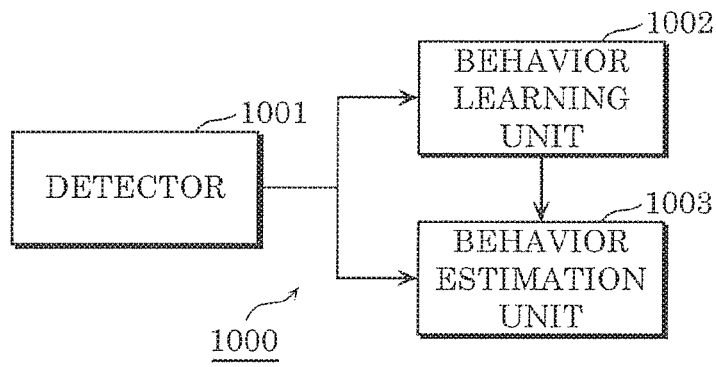
FIG. 48B
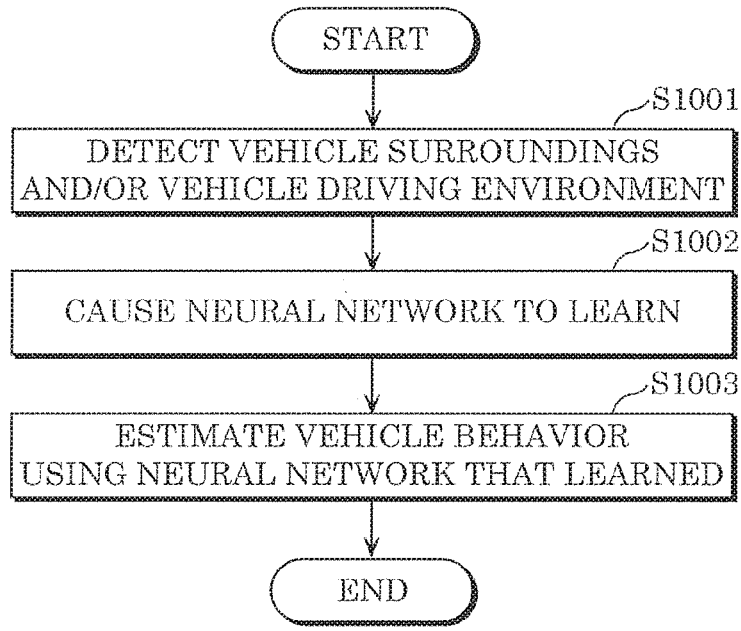
FIG. 49
| DRIVING ENVIRONMENT | NEARING MERGING REGION | | | SLOW VEHICLE AHEAD | | | ... |
|---|---|---|---|---|---|---|---|
| BEHAVIOR | DECELERATE | ACCELERATE | CHANGE LANES | FOLLOW | OVERTAKE | CHANGE LANES | ... |
| DRIVER x | 3 | 1 | 5 | 2 | 2 | 1 | ... |
| DRIVER y | 9 | 1 | 2 | 0 | 0 | 0 | ... |

FIG. 50

| | DRIVING ENVIRONMENT | NEARING MERGING REGION | | | SLOW VEHICLE AHEAD | | | ... |
|---|---|---|---|---|---|---|---|---|
| | BEHAVIOR | DECELERATE | ACCELERATE | CHANGE LANES | FOLLOW | OVERTAKE | CHANGE LANES | ... |
| MODEL A | DRIVER a | 3 | 1 | 5 | 1 | 1 | 5 | ... |
| | DRIVER b | 4 | 2 | 7 | 2 | 0 | 3 | ... |
| | DRIVER c | 3 | 2 | 2 | 1 | 2 | 8 | ... |
| MODEL B | DRIVER d | 5 | 2 | 2 | 5 | 2 | 2 | ... |
| | DRIVER e | 7 | 2 | 2 | 5 | 0 | 3 | ... |
| | DRIVER f | 5 | 2 | 5 | 4 | 1 | 1 | ... |
| | ... | ... | ... | ... | ... | ... | ... | ... |

FIG. 51

| DRIVING ENVIRONMENT | NEARING MERGING REGION | | | SLOW VEHICLE AHEAD | | | ... |
|---|---|---|---|---|---|---|---|
| BEHAVIOR | DECELERATE | ACCELERATE | CHANGE LANES | FOLLOW | OVERTAKE | CHANGE LANES | ... |
| MODEL A | 3.3 | 1.7 | 4.6 | 1.3 | 1 | 5.3 | ... |
| MODEL B | 5.7 | 2 | 3 | 4.7 | 1 | 2 | ... |

FIG. 52

| DRIVING ENVIRONMENT | NEARING MERGING REGION | SLOW VEHICLE AHEAD | ... |
|---|---|---|---|
| MODEL A | CHANGE LANES | CHANGE LANES | ... |
| MODEL B | DECELERATE | FOLLOW | ... |

FIG. 53

| | DRIVING ENVIRONMENT | NEARING MERGING REGION | | | SLOW VEHICLE AHEAD | | | ... |
|---|---|---|---|---|---|---|---|---|
| | BEHAVIOR | DECELERATE | ACCELERATE | CHANGE LANES | FOLLOW | OVERTAKE | CHANGE LANES | ... |
| | DRIVER a | 3 | 1 | 5 | 1 | 1 | 5 | ... |
| | DRIVER b | 4 | 2 | 7 | 2 | 0 | 3 | ... |
| MODEL FOR DRIVER y ⇐ | DRIVER c | 3 | 2 | 2 | 1 | 2 | 8 | ... |
| ⇐ | DRIVER d | 5 | 2 | 2 | 5 | 2 | 2 | ... |
| ⇐ | DRIVER e | 7 | 2 | 2 | 5 | 0 | 3 | ... |
| | DRIVER f | 5 | 2 | 5 | 4 | 1 | 1 | ... |
| | ... | ... | ... | ... | ... | ... | ... | ... |

FIG. 54

| DRIVING ENVIRONMENT | NEARING MERGING REGION | | | SLOW VEHICLE AHEAD | | | ... |
|---|---|---|---|---|---|---|---|
| BEHAVIOR | DECELERATE | ACCELERATE | CHANGE LANES | FOLLOW | OVERTAKE | CHANGE LANES | ... |
| MODEL FOR DRIVER y | 5 | 2 | 2 | 3.7 | 1.3 | 4.3 | ... |

FIG. 55

| | BEHAVIOR | PASSENGERS | SPEED | STEERING WHEEL | BRAKE | ACCELERATOR | ... | COUNT |
|---|---|---|---|---|---|---|---|---|
| DRIVER x | CHANGE LANES | NONE | 8 | 4 | 6 | 8 | ... | 80 |
| | | ADULTS: 1 CHILDREN: 2 | 3 | 3 | 4 | 3 | ... | 40 |
| | | ADULTS: 1 | 5 | 7 | 5 | 5 | ... | 60 |
| | | ... | ... | ... | ... | ... | ... | ... |
| | OVERTAKE | ... | ... | ... | ... | ... | ... | ... |
| | ... | ... | ... | ... | ... | ... | ... | ... |
| DRIVER y | CHANGE LANES | ... | ... | ... | ... | ... | ... | ... |
| | OVERTAKE | ... | ... | ... | ... | ... | ... | ... |
| | ... | ... | ... | ... | ... | ... | ... | ... |
| ... | ... | ... | ... | ... | ... | ... | ... | ... |

FIG. 60

DRIVER x

| HISTORY | BEHAVIOR | ENVIRONMENT PARAMETERS ||||||||||||||||| |
|---|---|---|---|---|---|---|---|---|---|---|---|---|---|---|---|---|---|---|
| | | HOST VEHICLE INFORMATION | LEADING VEHICLE INFORMATION ||| ADJACENT LANE INFORMATION |||||||| MERGE LANE INFORMATION ||| POSITIONAL INFORMATION || |
| | | | | | | DIAGONALLY REARWARD VEHICLE ||| DIAGONALLY FORWARD VEHICLE ||| | | | | | | |
| | | Va | Vba | DRba | RSb | Vca | Dca | Rca | Vda | Dda | Rda | DRda | Vma | Dma | Rma | DRIVING LANES | DISTANCE UNTIL MERGING POINT | ... |
| (a) | DECELERATE | 4 | 1 | 2 | 5 | 4 | 2 | 2 | 3 | 3 | 1 | 3 | 0 | 0 | 0 | 2 | 0 | ... |
| (b) | CHANGE LANES | 3 | 2 | 5 | 4 | 2 | 2 | 1 | 0 | 0 | 0 | 10 | 1 | 2 | 3 | 1 | 4 | ... |
| (c) | DECELERATE | 3 | 2 | 5 | 4 | 3 | 1 | 3 | 3 | 1 | 3 | 2 | 2 | 2 | 2 | 1 | 4 | ... |
| ... | ... | ... | ... | ... | ... | ... | ... | ... | ... | ... | ... | ... | ... | ... | ... | ... | ... | ... |

| | | HOST VEHICLE INFORMATION | LEADING VEHICLE INFORMATION | | | ENVIRONMENT PARAMETERS | | | | | | | | |
|---|---|---|---|---|---|---|---|---|---|---|---|---|---|---|
| | | | | | | ADJACENT LANE INFORMATION | | | | | | MERGE LANE INFORMATION | POSITIONAL INFORMATION | |
| | | | | | | DIAGONALLY REARWARD VEHICLE | | | DIAGONALLY FORWARD VEHICLE | | | | | |
| | BEHAVIOR | Va | Vba | DRba | RSb | Vca | Dca | Rca | Vda | Dda | Rda | DRda | Vma | Dma | Rma | DRIVING LANES | DISTANCE UNTIL MERGING POINT |
| | ??? | 3 | 3 | 5 | 4 | 1 | 2 | 1 | 0 | 0 | 0 | 9 | 1 | 2 | 3 | 1 | 4 |
| | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |

(b)

| | | HOST VEHICLE INFORMATION | LEADING VEHICLE INFORMATION | | | ENVIRONMENT PARAMETERS | | | | | | | | |
|---|---|---|---|---|---|---|---|---|---|---|---|---|---|---|
| | | | | | | ADJACENT LANE INFORMATION | | | | | | MERGE LANE INFORMATION | POSITIONAL INFORMATION | |
| | | | | | | DIAGONALLY REARWARD VEHICLE | | | DIAGONALLY FORWARD VEHICLE | | | | | |
| HISTORY | BEHAVIOR | Va | Vba | DRba | RSb | Vca | Dca | Rca | Vda | Dda | Rda | DRda | Vma | Dma | Rma | DRIVING LANES | DISTANCE UNTIL MERGING POINT |
| (d) | DECELERATE | 4 | 1 | 2 | 5 | 4 | 2 | 2 | 3 | 3 | 1 | 3 | 0 | 0 | 0 | 1 | 0 |
| (e) | CHANGE LANES | 3 | 2 | 5 | 4 | 2 | 2 | 1 | 0 | 0 | 0 | 10 | 1 | 2 | 3 | 1 | 4 |
| (f) | DECELERATE | 3 | 2 | 5 | 4 | 3 | 1 | 3 | 3 | 1 | 3 | 2 | 2 | 2 | 2 | 1 | 4 |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |

INFORMATION PROCESSING SYSTEM, INFORMATION PROCESSING METHOD, AND PROGRAM

TECHNICAL FIELD

The present invention relates to an information processing system, an information processing method, and a program for processing information related to a vehicle.

BACKGROUND ART

In recent years, various techniques have been presented relating to vehicles capable of both manual driving in which a driving operation is performed by the driver and autonomous driving in which a driving operation is partially or completely performed autonomously based on the surroundings of the vehicle and/or the driving state of the vehicle (for example, control information on the speed, steering, accelerator, brake, turn signals, and/or an actuator of the host vehicle), and fully autonomous vehicles.

For example, Patent Literature (PTL) 1 discloses a driving control device that allows the driver to visually recognize the operational state of the autonomous steering control mode and/or autonomous acceleration/deceleration control when the host vehicle switches to autonomous steering control mode and/or autonomous acceleration/deceleration control.

CITATION LIST

Patent Literature

PTL 1: Japanese Unexamined Patent Application Publication No. 2005-67483

SUMMARY OF THE INVENTION

Technical Problem

However, with the driving control device (i.e., information processing system) according to PTL 1, there is a problem that a vehicle driving operation cannot be appropriately estimated. Note that "driving operation" is also referred to as "driving conduct" or "behavior".

In light of this, the present invention provides, for example, an information processing system capable of appropriately estimating the driving conduct of the vehicle.

Solutions to Problem

An information processing system according to one aspect of the present invention includes: a detector that detects a vehicle environment state, the vehicle environment state being at least one of surroundings of a vehicle and a driving state of the vehicle; a behavior learning unit configured to cause a neural network to learn a relationship between the vehicle environment state detected by the detector and a behavior of the vehicle implemented after the vehicle environment state; and a behavior estimation unit configured to estimate a behavior of the vehicle by inputting, into the neural network that learned, the vehicle environment state detected at a current point in time by the detector.

With this, since a behavior of the vehicle is estimated by using a neural network, the behavior (i.e., the driving conduct) of the vehicle can be appropriately estimated.

Moreover, the behavior learning unit may include: a general purpose behavior learning unit configured to cause a neural network to learn, for each of a plurality of drivers, the relationship between the vehicle environment state detected by the detector and the behavior of the vehicle implemented after the vehicle environment state; and a dedicated behavior learning unit configured to build a dedicated neural network for a specific driver by transfer learning involving causing the neural network that learned to relearn by using the vehicle environment state detected by the detector for the specific driver and the behavior of the vehicle implemented after the vehicle environment state. The behavior estimation unit may be configured to estimate a behavior of the vehicle for the specific driver by using the dedicated neural network. More specifically the behavior estimation unit may include: a general purpose behavior estimation unit configured to estimate a tentative behavior of the vehicle for the specific driver by inputting the vehicle environment state detected by the detector for the specific driver into the neural network caused to learn by the general purpose behavior learning unit; and a dedicated behavior estimation unit configured to estimate a behavior of the vehicle for the specific driver by using the dedicated neural network. The information processing system may further include: a histogram generator that generates a histogram of an estimation result of the tentative behavior by the general purpose behavior estimation unit. The dedicated behavior learning unit may be configured to build the dedicated neural network by the transfer learning involving referring to the histogram generated.

With this, even when there are few histories indicating the detected vehicle surroundings or driving state for the specific driver and the following behavior and learning would be insufficient with those histories alone, it is possible to appropriately estimate a vehicle behavior for a specific driver since the histories of a plurality of drivers are used in the learning. Moreover, a general purpose neural network that has learned by using histories for a plurality of drivers, such as described above, is fine-tuned into a dedicated neural network by using the history for the specific driver. Accordingly, it is possible to increase the precision of the estimation of the behavior.

Moreover, the information processing system may further include an evaluation unit configured to determine whether the behavior estimated by the behavior estimation unit is valid or not, and output the behavior estimated when the behavior estimated is determined to be valid.

This makes it possible to prevent an inappropriate behavior from being notified to the driver.

Moreover, the information processing system may further include: an input unit configured to receive a behavior of the vehicle input by the specific driver; and an evaluation unit configured to evaluate the behavior of the vehicle estimated by the behavior estimation unit, based on the behavior of the vehicle received by the input unit. When the evaluation unit evaluates that there is an error in the behavior of the vehicle estimated by the behavior estimation unit, the evaluation unit may be configured to cause the behavior learning unit to cause the neural network to relearn by using the behavior of the vehicle received by the input unit and the surroundings of the vehicle detected by the detector at a time of the estimation of the behavior of the vehicle.

With this, the prediction precision of the driving conduct, that is to say, the estimation precision of the behavior of the vehicle can be increased even if there is an error in the surroundings or the driving state detected by the detector.

Moreover, the dedicated behavior learning unit may be configured to build, for each scene in which the vehicle drives, the dedicated neural network for the specific driver in accordance with the scene, and select, from among a plurality of the dedicated neural networks, the dedicated neural network that is in accordance with a current scene in which the vehicle is driving, and the dedicated behavior estimation unit may be configured to estimate the behavior of the vehicle for the specific driver by using the dedicated neural network selected.

With this, an appropriate neural network can be selected for each scene, and the behavior estimation precision of the vehicle in each scene, that is to say, the driving conduct prediction precision, can be improved.

Moreover, the information processing system may further include a notifier that notifies a driver of the behavior estimated by the behavior estimation unit before the behavior is implemented.

With this, since the estimated behavior is notified, the driver can easily comprehend what sort of behavior is going to be implemented before it is implemented, which relieves any concern the driver may have.

Note that general or specific aspects of the above may be realized as a system, method, integrated circuit, computer program, computer readable medium such as a CD-ROM, or any given combination thereof.

Since the vehicle is being consigned with driving during autonomous driving (including both fully and partially autonomous driving), trust between the vehicle and driver is extremely important. Accordingly, the exchange of appropriate information between vehicle and driver (passenger) is necessary. In PTL 1, only the current operational state is notified to the driver.

During autonomous driving, notifying the driver of only the current behavior (operational state) of the vehicle leads to substantial uneasiness in the driver when the driver is not privy to anything about the behavior to be implemented next (for example, the behavior, such as changing lanes, accelerating, decelerating, to be implemented by the vehicle when, in particular, the vehicle is approaching a merging region, is approaching an intersection, is coming into proximity with an emergency vehicle, or when a surrounding vehicle performs or attempts some driving maneuver). This is a first problem.

Moreover, in the case of fully autonomous driving, there is a high possibility that the driver will do something else other than supervise the driving, so even if the current operational state is suddenly displayed, the driver cannot comprehend the current surroundings of the vehicle or the driving state of the vehicle, making it impossible to immediately react when the driver is prompted make a conscious driving choice, whereby the driver cannot smoothly instruct the vehicle. This is a second problem.

Moreover, by only notifying the driver of the current operational state, even if the driver attempts to manually drive the vehicle directly, the driver cannot immediately switch over to manual driving. This is a third problem.

Moreover, when the computer attempts to implement the same movement as the driver or passenger, the timing and/or input amount of the movement differs from person to person, and as such, there may be a discrepancy from the sensation of when the driver is driving manually, and in a worst case scenario, this may induce the driver to intervene the autonomous driving and make an unnecessary operational input. This is a fourth problem.

In light of this, the present invention provides an information notification device, information notification method, information notification program, and information processing system capable of solving at least one of the above-described problems, during fully or partially autonomous driving.

In other words, an information notification device according to one aspect of the present invention is installed in a vehicle including: a detector that detects surroundings of the vehicle and a driving state of the vehicle; and a vehicle controller that determines a behavior of the vehicle based on the surroundings of the vehicle and the driving state of the vehicle detected by the detector. The information notification device includes an information obtainer that obtains information on a behavior to be implemented, when it is determined that there is a possibility that the behavior of the vehicle may be updated during autonomous driving, and a notifier that notifies the driver of the behavior to be implemented before the behavior is updated.

An information notification method according to one aspect of the present invention is implemented in a vehicle that detects surroundings of the vehicle and a driving state of the vehicle; and determines a behavior of the vehicle based on the surroundings of the vehicle and the driving state of the vehicle detected by the detector. The information notification method includes obtaining information on a behavior to be implemented, when it is determined that there is a possibility that the behavior of the vehicle may be updated during autonomous driving, and notifying the driver of the behavior to be implemented before the behavior is updated.

An information notification program according to one aspect of the present invention is executed by a computer in a vehicle that detects surroundings of the vehicle and a driving state of the vehicle; and determines a behavior of the vehicle based on the surroundings of the vehicle and the driving state of the vehicle detected by the detector. The information notification program causes the computer to function as an information obtainer that obtains information on a behavior to be implemented, when it is determined that there is a possibility that the behavior of the vehicle may be updated during autonomous driving, and notifier that notifies the driver of the behavior to be implemented before the behavior is updated.

With such an information notification device, information notification method, and information notification program, during fully or partially autonomous driving, it is possible to appropriately convey information with minimal conflict between the vehicle and the driver so as to achieve a more pleasant autonomous driving experience.

Advantageous Effect of Invention

With the present invention, it is possible to appropriately estimate a driving conduct of the vehicle.

BRIEF DESCRIPTION OF DRAWINGS

FIG. 48A illustrates a configuration of an information processing system according to one aspect of the present invention.

FIG. 48B is a flow chart of an information processing method according to one aspect of the present invention.

FIG. 49 illustrates one example of a driving environment history.

FIG. 50 illustrates a method of building a clustering driver model.

FIG. 51 illustrates one example of a built clustering driver model.

FIG. 52 illustrates another example of a built clustering driver model.

FIG. 53 illustrates a method of building an individual adaptive driver model.

FIG. 54 illustrates one example of a built individual adaptive driver model.

FIG. 55 illustrates one example of a driving characteristics model.

FIG. 60 illustrates one example of a driving environment history.

FIG. 61 illustrates a usage method of a driver model according to this variation.

DESCRIPTION OF EXEMPLARY EMBODIMENTS

Figure 1:
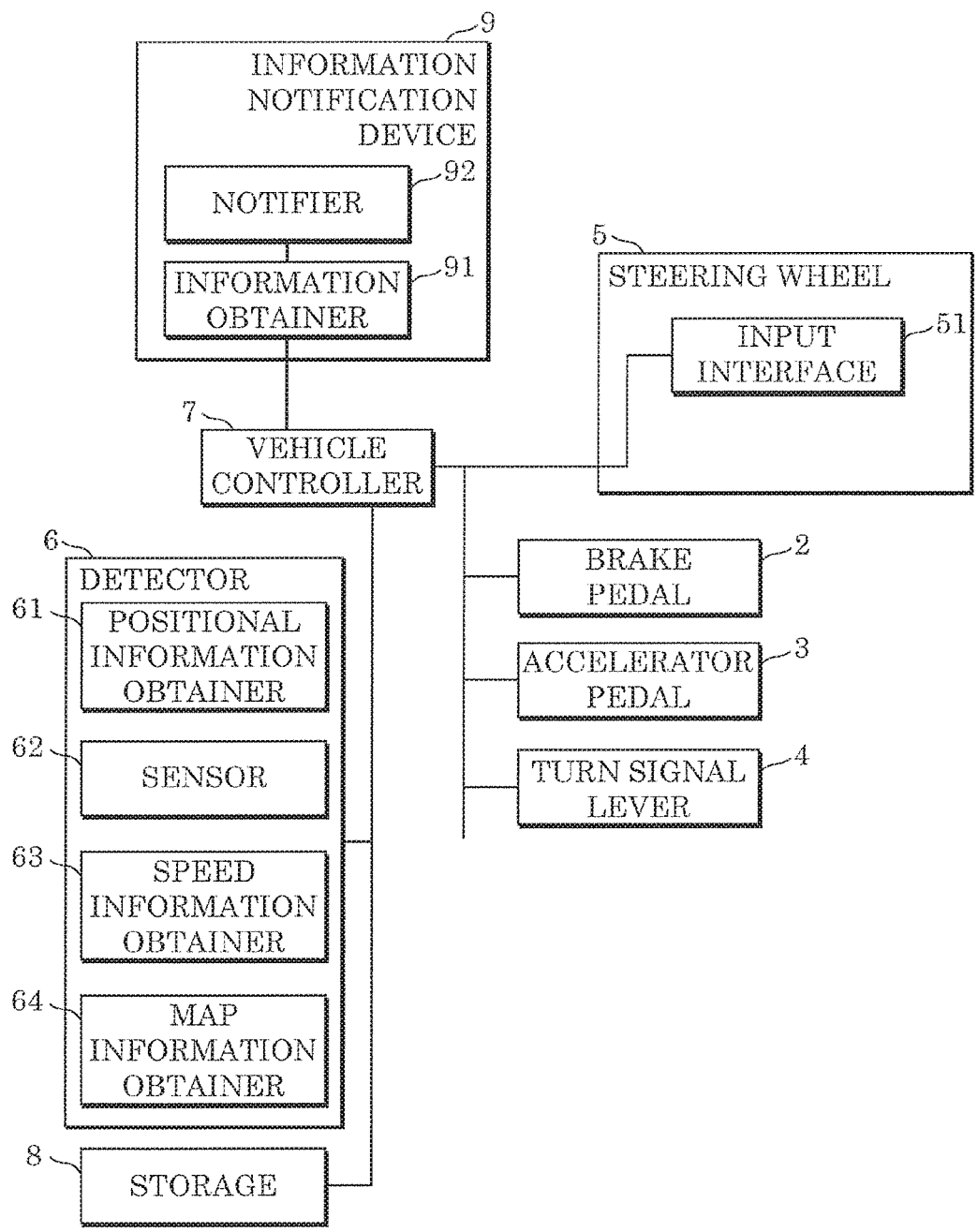
FIG. 1 is a block diagram illustrating relevant components in a vehicle including the information notification device according to Embodiment 1 of the present invention.

Hereinafter, embodiments of the present invention will be described in detail with reference to the drawings. In Embodiments 1 through 3, an information notification device, information notification method, and information notification program capable of appropriately conveying information with minimal conflict between the vehicle and the driver so as to achieve a more pleasant autonomous driving experience will be described. In Embodiments 4 through 6, an information processing system, information processing method, and program according to one aspect of the present invention that are capable of appropriately estimating vehicle driving conduct will be described. Further, in Embodiment 7, an information processing system that estimates driving conduct in a different aspect than Embodiments 4 through 6 will be described.

Note that each of the embodiments described below is merely one specific example of the present invention, and therefore do not limit the present invention. The following embodiments each present a general or specific example. The numerical values, shapes, materials, elements, arrangement and connection of the elements, steps, and order of the steps, etc., indicated in the following embodiments are given merely by way of illustration and are not intended to limit the present invention. Therefore, among elements in the following embodiments, those not recited in any one of the independent claims defining the broadest aspect the present invention are described as optional elements.

Note that the drawings are represented schematically and are not necessarily precise illustrations. Additionally, like elements share like reference numerals in the drawings.

Embodiment 1

FIG. 1 is a block diagram illustrating relevant components in vehicle 1 including the information notification device according to Embodiment 1 of the present invention. Vehicle 1 is a vehicle that does not require operational input from a driver and can, fully or partially, autonomously control driving.

Vehicle 1 includes brake pedal 2, accelerator pedal 3, turn signal lever 4, steering wheel 5, detector 6, vehicle controller 7, storage 8, and information notification device 9.

Brake pedal 2 causes vehicle 1 to decelerate upon receiving a braking operation by the driver. Brake pedal 2 may also make changes in the amount of braking in correspondence with the degree of deceleration of vehicle 1 upon receiving a control result from vehicle controller 7. Accelerator pedal 3 increases the speed of vehicle 1 upon receiving an acceleration operation by the driver. Accelerator pedal 3 may also make changes in the amount of acceleration in correspondence with the degree of increase in speed of vehicle 1 upon receiving a control result from vehicle controller 7. Turn signal lever 4 activates the turn signal, which is not illustrated in the drawings of vehicle 1, upon the driver operating turn signal lever 4. Upon receiving a control result from vehicle controller 7, turn signal lever 4 may also change the state of turn signal lever 4 so as to correspond to the turning state of vehicle 1 and active the turn signal, which is not illustrated in the drawings of vehicle 1, accordingly.

Steering wheel 5 changes the driving direction of vehicle 1 upon receiving a steering operation by the driver. Steering wheel 5 may also make changes in the amount of steering in correspondence with the driving direction of vehicle 1 upon receiving a control result from vehicle controller 7. Steering wheel 5 includes input interface 51.

Input interface 51 is disposed on the front surface (the surface facing the driver) of steering wheel 5, and receives an input from the driver. For example, input interface 51 is a device such as a button, touch panel, or grip sensor. Input interface 51 outputs, to vehicle controller 7, information on the input received from the driver.

Detector 6 detects a driving state of vehicle 1 and detects the surroundings of vehicle 1. Detector 6 outputs information on the detected driving state and detected surroundings to vehicle controller 7.

Detector 6 includes positional information obtainer 61, sensor 62, speed information obtainer 63, and map information obtainer 64.

Positional information obtainer 61 obtains positional information on vehicle 1 via, for example, global positioning system (GPS), as information on the driving state.

Sensor 62 detects the surroundings of vehicle 1 based on the position of another vehicle in the vicinity of vehicle 1 and lane positional information, such as determining the position of another vehicle, determining whether another vehicle is a leading vehicle, the time to collision (TTC) from the speed of another vehicle and the speed of the host vehicle, and whether there is an obstacle in the vicinity of vehicle 1.

Speed information obtainer 63 obtains, as information on the driving state, information such as the speed and driving direction of vehicle 1 from, for example, a speed sensor, which is not illustrated in the drawings.

Map information obtainer 64 obtains, as information on the surroundings of vehicle 1, map information on the surroundings of vehicle 1, such as information on the road on which vehicle 1 is driving, information on a merge point where vehicle 1 merges with other vehicles on the road, information on the current lane that vehicle 1 is driving in, and information on intersections.

Note that sensor 62 includes a millimeter-wave radar, laser radar, or camera, or any combination thereof.

Storage 8 is a storage device such as read only memory (ROM), random access memory (RAM), hard disk drive, or solid state drive (SSD), and stores associations between the current driving environment and behavior candidates of next (after elapse of a first predetermined period of time) possible behaviors.

The current driving environment is an environment determined based on, for example, the position of vehicle 1, the road on which vehicle 1 is driving, and the positions and speeds of other vehicles in the vicinity of vehicle 1. Note that the determination need not be based only on instantaneous data, and may be based on data before and after that point in time. For example, the determination may be made based on data indicating that there is a chance for collision one second after a vehicle cuts in while accelerating or decelerating, determined from the position and/or speed of the vehicle. This makes it possible to predict the behavior of other vehicles, making it possible to more precisely, and in more detail, comprehend the driving environment. The behavior candidate is a candidate for a next (after elapse of a first predetermined period of time) possible behavior to be implemented by vehicle 1 with respect to the current driving environment.

For example, in a driving environment in which: there is a merging region ahead in the lane in which vehicle 1 is driving; a vehicle is attempting to merge from the left of the lane in which vehicle 1 is driving; and it is possible for vehicle 1 to change lanes from the lane in which vehicle 1 is driving to a lane to the right, three behavior candidates are stored in storage 8 in advance in association with such an environment: causing vehicle 1 to accelerate, causing vehicle 1 to decelerate, and causing vehicle 1 to change to a lane to the right.

Moreover, in a driving environment in which: a vehicle is driving in front of and in the same lane as vehicle 1 (hereinafter referred to as a "leading vehicle") and at a slower speed than vehicle 1; and it is possible for vehicle 1 to change to an adjacent lane, three behavior candidates are stored in storage 8 in advance in association with such an environment: causing vehicle 1 to overtake the leading vehicle, causing vehicle 1 to change lanes to an adjacent lane, and causing vehicle 1 to decelerate and follow the leading vehicle.

Storage 8 may further store priorities for each of the behavior candidates. For example, storage 8 may store the number of times a behavior is actually used in the same driving environment, and set the priority higher for behaviors having a high usage count.

For example, vehicle controller 7 may be realized as an LSI circuit or part of an electronic control unit (ECU) that controls the vehicle. Vehicle controller 7 controls the vehicle based on information on the driving state and the surroundings obtained from detector 6, and controls brake pedal 2, accelerator pedal 3, turn signal lever 4, and information notification device 9 in accordance with the vehicle control result. Note that the elements controlled by vehicle controller 7 are not limited to these examples.

First, vehicle controller 7 determines the current driving environment based on information on the driving state and the surroundings. Various conventional methods can be used to perform such a determination.

For example, vehicle controller 7 determines, based on information on the driving state and the surroundings, that the current driving environment is a "driving environment in which there is a merging region ahead in the lane in which vehicle 1 is driving, a vehicle is attempting to merge from the left of the lane in which vehicle 1 is driving, and it is possible for vehicle 1 to change lanes from the lane in which vehicle 1 is driving to a lane to the right".

Moreover, for example, vehicle controller 7 determines, from information on the driving state and the surroundings, that a time series of the driving environment is "a driving environment in which a vehicle is driving in front of and in the same lane as vehicle 1, and at a slower speed than vehicle 1, and it is possible for vehicle 1 to change to an adjacent lane".

Vehicle controller 7 causes notifier 92 of information notification device 9 to notify the driver with information on the driving environment, which indicates the driving state and the surroundings. Moreover, vehicle controller 7 reads, from storage 8, candidates for a next (after elapse of a first predetermined period of time) possible behavior to be implemented by vehicle 1 with respect to the determined driving environment.

Vehicle controller 7 determines which of the read behavior candidates is the most appropriate for the current driving environment, and sets the most appropriate behavior candidate for the current driving environment as a primary behavior. Note that the primary behavior may be the same as the current behavior currently implemented by the vehicle, in which case this means the vehicle continues implementing the same behavior. Then, vehicle controller 7 sets each behavior candidate capable of being implemented by the driver in the current driving environment that is not the primary behavior as a secondary behavior (i.e., a behavior different from a behavior to be implemented).

For example, vehicle controller 7 may set the most appropriate behavior as the primary behavior by using a conventional technique for determining the most appropriate behavior based on information on the driving state and the surroundings.

Moreover, vehicle controller 7 may: set a preset behavior from among a plurality of behavior candidates as the most appropriate behavior; information on a previously selected behavior may be sorted in storage 8 and vehicle controller 7 may determine the previously selected behavior to be the most appropriate behavior; a number of times each behavior has been selected may be stored in storage 8 and vehicle controller 7 may determine the behavior having the highest count to be the most appropriate behavior.

Vehicle controller 7 then causes notifier 92 of information notification device 9 to notify the driver with information on the primary behavior and the secondary behavior(s). Note that when vehicle controller 7 determines that there is no secondary behavior, vehicle controller 7 may cause notifier 92 to notify the driver of only information on the primary behavior.

Note that vehicle controller 7 may simultaneously notify notifier 92 of the information on the primary behavior and the secondary behavior(s) and the information on the driving state and the surroundings.

Vehicle controller 7 further obtains information on an input received by input interface 51 from the driver. After notifying the primary behavior and the secondary behavior(s), vehicle controller 7 determines whether input interface 51 has received an input or not within a second predetermined period of time. An input is, for example, a selection of one of the secondary behaviors.

When input interface 51 does not receive an input within the second predetermined period of time, vehicle controller 7 controls the vehicle by causing the vehicle to implement the primary behavior, and controls brake pedal 2, accelerator pedal 3, and turn signal lever 4 in accordance with the vehicle control result.

When input interface 51 receives an input within the second predetermined period of time, vehicle controller 7 performs control corresponding to the input received.

Information notification device 9 obtains various types of information related to the driving of vehicle 1 from vehicle controller 7, and notifies the driver of the obtained information. Information notification device 9 includes information obtainer 91 and notifier 92.

Information obtainer 91 obtains various types of information related to the driving of vehicle 1 from vehicle controller 7. For example, when vehicle controller 7 determines that the behavior of vehicle 1 may be updated, information obtainer 91 obtains information on the primary behavior and information on the secondary behavior(s) from vehicle controller 7.

Information obtainer 91 then temporarily stores the obtained information in storage (not illustrated in the drawings), and reads stored information from the storage and outputs it to notifier 92 as necessary.

Notifier 92 notifies the driver of information related to the driving of vehicle 1. For example, notifier 92 may be a display that displays information, such as a light-emitting unit, like an LED, disposed on steering wheel 5 or a pillar of the vehicle, or a car navigation system, head-up display, or center display installed in the vehicle, may be a speaker that notifies the driver by converting the information into speech, and may be a vibrating body disposed in a location that is sensible by the driver (for example, the driver's seat or steering wheel 5). Moreover, notifier 92 may be a combination of any of these examples.

In the following description, notifier 92 is exemplified as a display device.

In such a case, notifier 92 is, for example, a head-up display (HUD), liquid crystal display (LCD), head-mounted display or helmet-mounted display (HMD), or a display provided in glasses (smart glasses), or some other dedicated display. For example, the HUD may be disposed on the windshield of vehicle 1 and may be disposed on a separate glass or plastic surface (for example, a combiner). Moreover, the "windshield" may be the front windshield, a side window, or the rear window of vehicle 1.

Further, the HUD may be a light-transmissive display provided on the surface of or inner side of the windshield. Here, a light-transmissive display is, for example, a light-transmissive organic EL display, or a transparent display that employs a glass that emits light upon being irradiated with light of a specific wavelength. Driver can simultaneously view the outside scenery and the imagery displayed on the light-transmissive display. In this way, notifier 92 may be a display medium that transmits light. In any case, an image is displayed on notifier 92.

Notifier 92 notifies the driver of information related to the driving obtained from vehicle controller 7 via information obtainer 91. For example, notifier 92 notifies the driver of information on the primary behavior and information on the secondary behavior(s) obtained from vehicle controller 7.

Next, a detailed example of the information displayed and inputs made on input interface 51 will be given.

Figure 2:
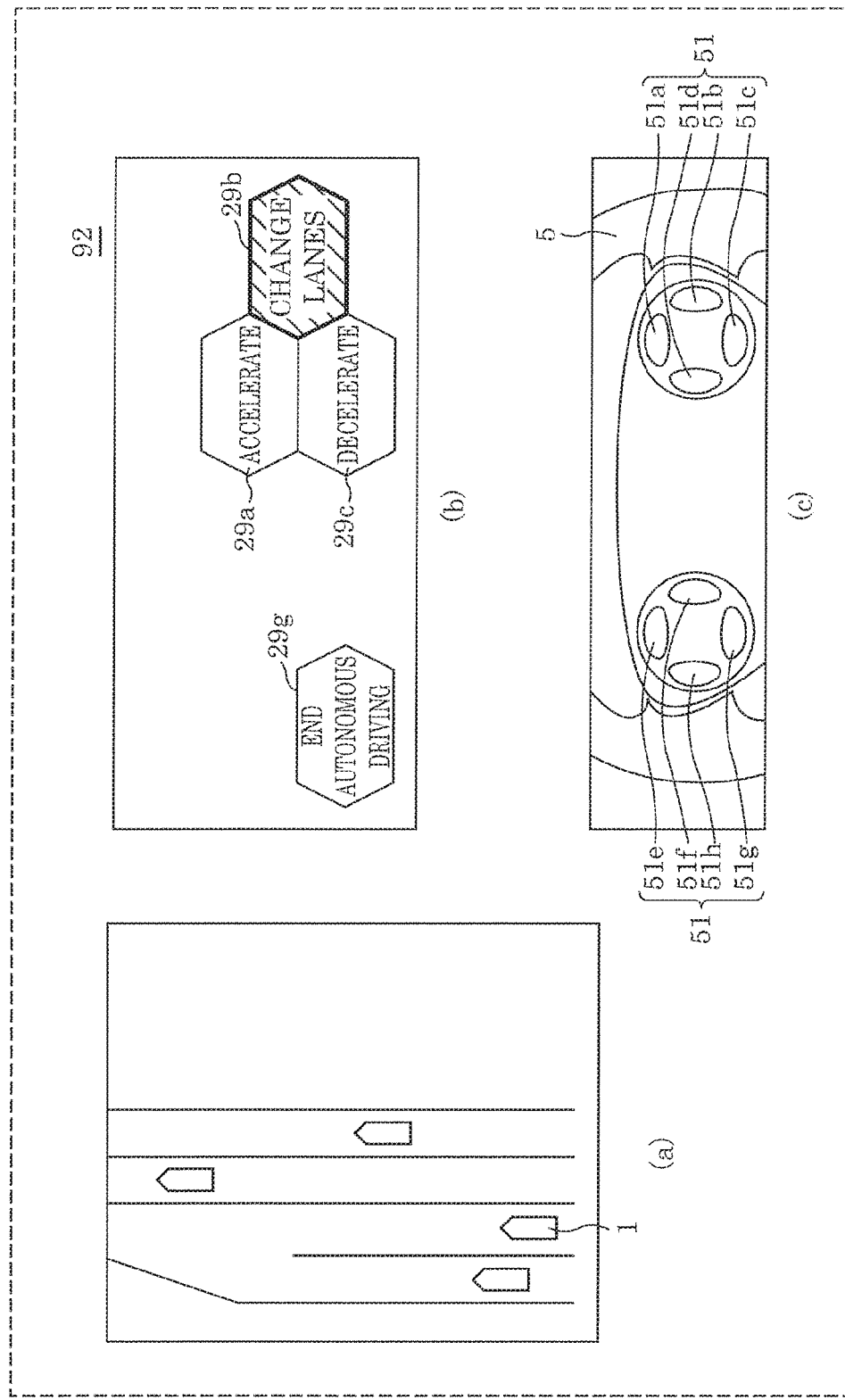
FIG. 2 illustrates a first example of a driving environment, a display on a notifier related to the first example, and inputs included in an input interface.

FIG. 2 illustrates a first example of a driving environment, a display on notifier 92 related to the first example, and inputs included in input interface 51.

In FIG. 2, (a) illustrates a bird's-eye view of the driving environment of vehicle 1. More specifically, (a) in FIG. 2 illustrates a driving environment in which there is a merging region ahead in the lane in which vehicle 1 is driving, a vehicle is attempting to merge from the left of the lane in which vehicle 1 is driving, and it is possible for vehicle 1 to change lanes from the lane in which vehicle 1 is driving to a lane to the right.

Vehicle controller 7 determines that the current driving environment is the driving environment illustrated in (a) in FIG. 2 based on information on the driving state and the surroundings. Note that vehicle controller 7 may generate the bird's-eye view illustrated in (a) in FIG. 2, and, in addition to the information on the primary behavior and the secondary behavior(s), may cause notifier 92 to notify the generated bird's-eye view.

In FIG. 2, (b) illustrates one example of a display on notifier 92 related to the driving environment illustrated in (a) in FIG. 2. In the display area on notifier 92, selections related to the behavior of vehicle 1 are displayed on the right, and information for switching to manual driving is displayed on the left.

The primary behavior is, among display regions 29a through 29c and 29g, display region 29b that is highlighted and indicates "change lanes". "Accelerate" and "decelerate" indicated in display regions 29a and 29c, respectively, are secondary behaviors. Moreover, display region 29g displays "end autonomous driving" which indicates switching to manual driving.

In FIG. 2, (c) illustrates one example of input interface 51 disposed on steering wheel 5. Input interface 51 includes input buttons 51a through 51d disposed on the right side of steering wheel 5 and input buttons 51e through 51h disposed on the left side of steering wheel 5. Note that the number and shapes, etc., of input interface 51 disposed on steering wheel 5 is not limited to this example.

In this embodiment, display regions 29a through 29c illustrated in (b) in FIG. 2 correspond to input buttons 51a through 51c, respectively, and display region 29g corresponds to input button 51g.

With this configuration, the driver presses the input buttons corresponding to the display regions to select the actions indicated in the display regions. For example, the driver presses input button 51a to select the behavior "accelerate" indicated in display region 29a.

Note that in (b) in FIG. 2, only text information is shown in the display regions, but as will be described next, symbols or icons relating to driving the vehicle may be displayed in the display regions. This allows the driver to comprehend the indicated action at a glance.

Figure 3:
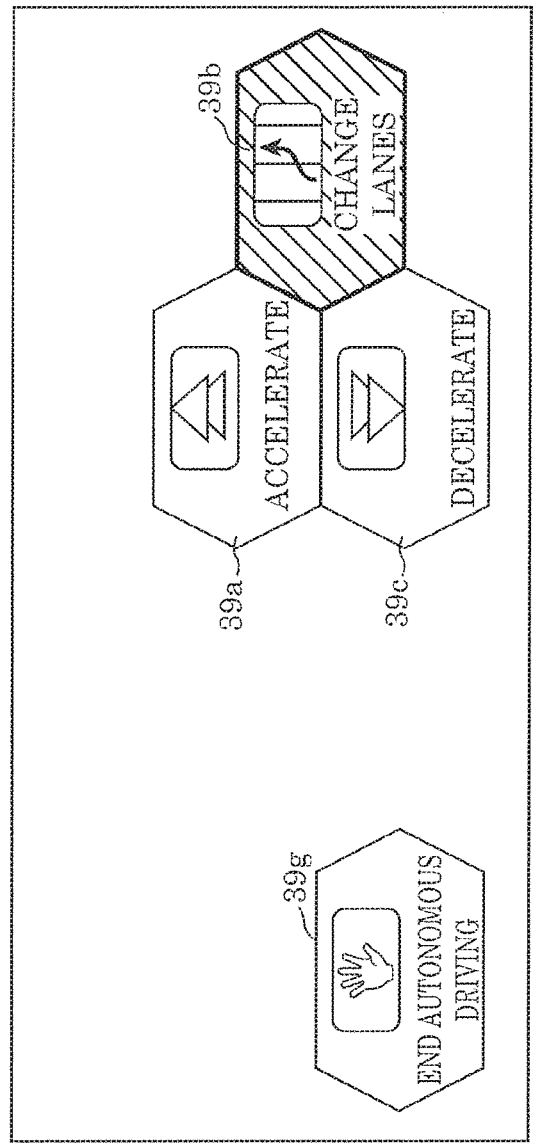
FIG. 3 illustrates another example of a display displayed by the notifier.

FIG. 3 illustrates another example of a display displayed by notifier 92. As illustrated in FIG. 3, display regions 39a through 39c, 39g include both text information and symbols illustrating the text information. Note that display regions may include only symbols.

Next, a detailed example of a driving environment will be given, and display control flow will be described.

Figure 4:
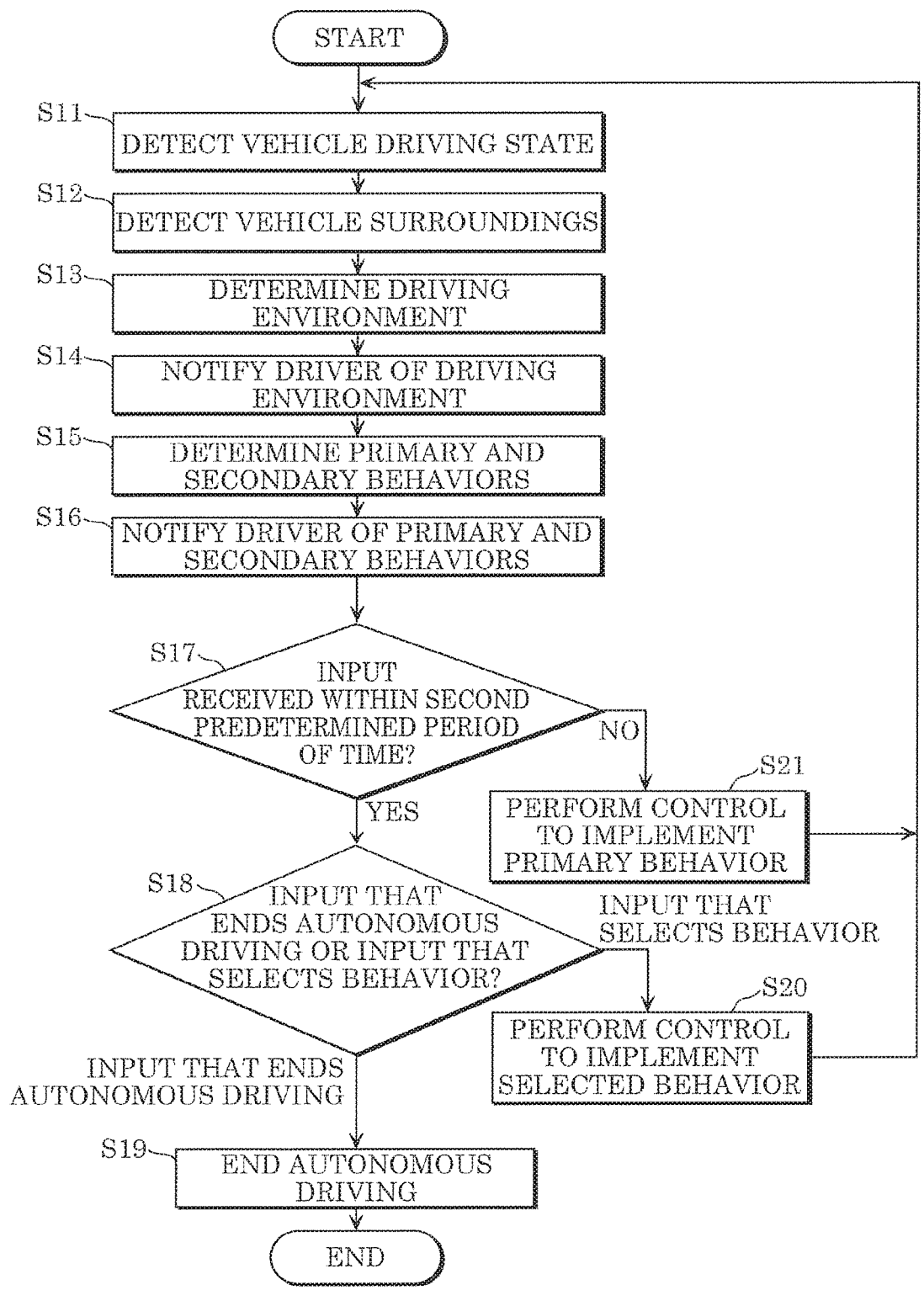
FIG. 4 is a flow chart illustrating a sequence of information notification processes according to this embodiment.
Figure 5:
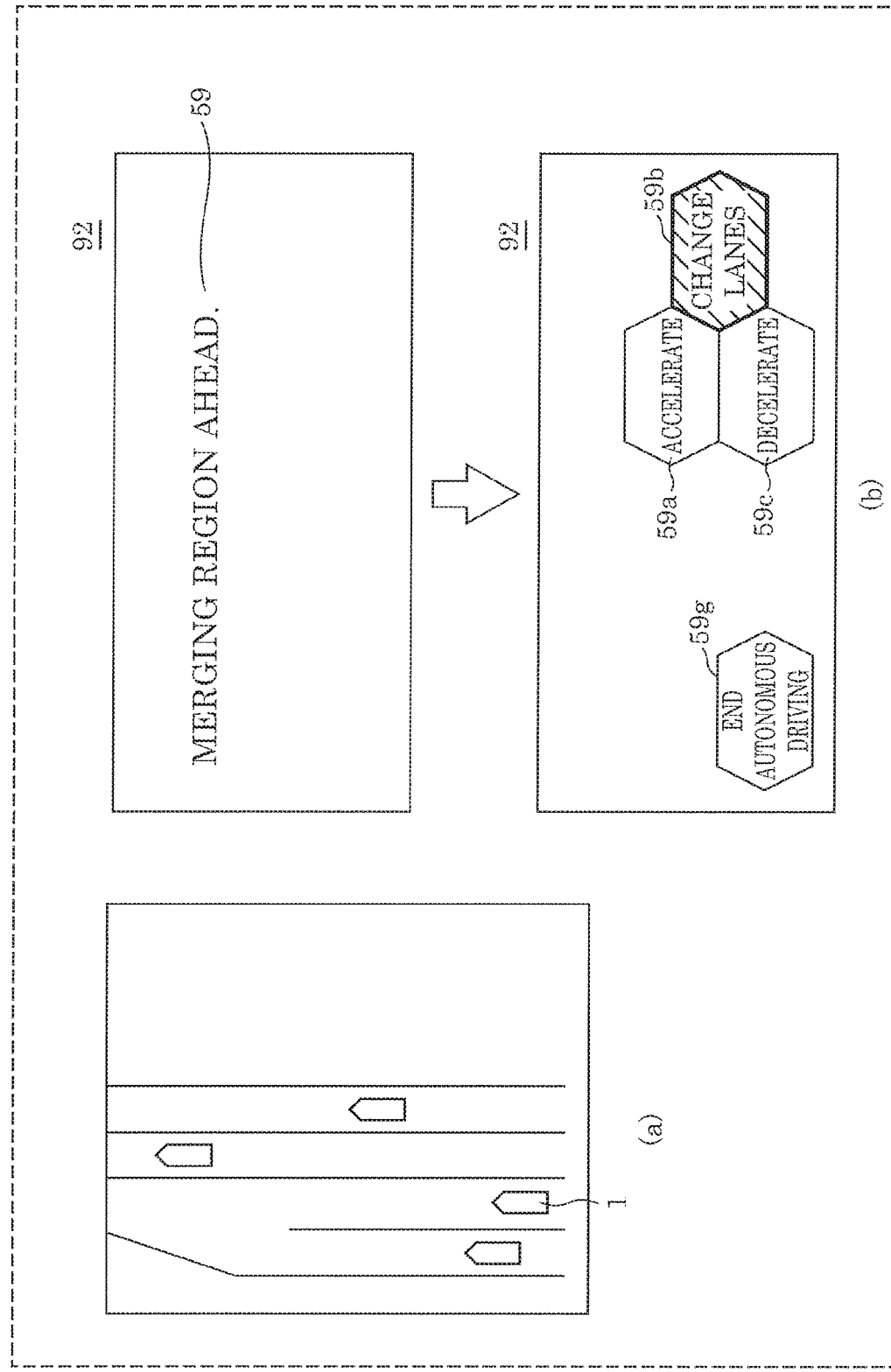
FIG. 5 illustrates the first example of the driving environment and display control related to the first example.

FIG. 4 is a flow chart illustrating a sequence of information notification processes according to this embodiment. FIG. 5 illustrates the first example of a driving environment and display control related to the first example.

As illustrated in FIG. 4, detector 6 detects the driving state of the vehicle (step S11). Next, detector 6 detects the surroundings of the vehicle (step S12). Information on the detected driving state of the vehicle and the surroundings of the vehicle is output to vehicle controller 7 by detector 6.

Next, vehicle controller 7 determines the current driving environment based on the information on the driving state and the surroundings (step S13). In the example illustrated in (a) in FIG. 5, vehicle controller 7 determines that the current driving environment is a "driving environment in which there is a merging region ahead in the lane in which vehicle 1 is driving, a vehicle is attempting to merge from the left of the lane in which vehicle 1 is driving, and it is possible for vehicle 1 to change lanes from the lane in which vehicle 1 is driving to a lane to the right".

Vehicle controller 7 then causes notifier 92 of information notification device 9 to notify the driver with information on the determined driving environment (step S14). In the example illustrated in (b) in FIG. 5, vehicle controller 7 outputs the information on the determined driving environment to information obtainer 91. Notifier 92 obtains the information on the driving environment from information obtainer 91, and displays this information as text information 59. Note that vehicle controller 7 may notify the driver with information on the driving environment by speech via a speaker instead of displaying the information on the driving environment on notifier 92. This makes it possible to convey the information to the driver with certainty, so as to circumvent instances in which the driver is not looking at the display or monitor or misses the notification thereon.

Next, vehicle controller 7 determines whether the determined driving environment may possibly lead to an update in the behavior, and when vehicle controller 7 determines that the behavior may be updated, vehicle controller 7 further determines the primary behavior and the secondary behavior(s) (step S15). The determination of whether the driving environment may possibly lead to an update in the behavior is based on whether the driving environment has changed or not. Examples of updated behaviors to be implemented include, for example, decelerating when there is a chance of a collision with, for example, another vehicle, modifying the speed when there ceases to be a leading vehicle when adaptive cruise control (ACC) is being used, and changing lanes when an adjacent lane is open. A conventional technique is used when determining whether to update.

In this case, vehicle controller 7 reads, from storage 8, candidates for a next (after elapse of a first predetermined period of time) possible behavior to be implemented by vehicle 1 with respect to the determined driving environment. Vehicle controller 7 then determines which of the read behavior candidates is the most appropriate for the current driving environment, and sets the most appropriate behavior candidate for the current driving environment as a primary behavior. Then, vehicle controller 7 sets each behavior candidate other than the primary behavior as a secondary behavior.

In the example illustrated in (b) in FIG. 5, vehicle controller 7 reads three behavior candidates from storage 8: causing vehicle 1 to accelerate, causing vehicle 1 to decelerate, and causing vehicle 1 to switch to a lane to the right. Vehicle controller 7 then determines that causing vehicle 1 to switch to a lane to the right is the most appropriate behavior based on the speed of the vehicle merging from the left and the state of the lane to the right of vehicle 1, and then sets that behavior as the primary behavior. Then, vehicle controller 7 sets each behavior candidate other than the primary behavior as a secondary behavior.

Vehicle controller 7 then causes notifier 92 of information notification device 9 to notify the driver with information on the primary behavior and the secondary behavior(s) (step S16). In the example illustrated in (b) in FIG. 5, notifier 92 displays the text information "change lanes," which is the primary behavior information, in the highlighted display region 59b, and displays "accelerate" and "decelerate," which are secondary behavior information, in display regions 59a and 59c, respectively.

Next, vehicle controller 7 determines, within a second predetermined period of time, whether input interface 51 has received an input from the driver or not (step S17).

For example, after vehicle controller 7 determines that the current driving environment is the driving environment illustrated in (a) in FIG. 5, vehicle controller 7 sets the first predetermined period of time to the time until the merge point is reached. Vehicle controller 7 then sets the second predetermined period of time, which is shorter than the first predetermined period of time, to a period of time in which it is possible to receive an input of the next behavior to be implemented before the merge point.

When input interface 51 receives an input from the driver within the second predetermined period of time (YES in step S17), vehicle controller 7 determines whether the received input is an input ending autonomous driving or an input selecting (or updating) a behavior (step S18).

As described with reference to FIG. 2, each display region in notifier 92 corresponds with one of the input buttons in input interface 51. When the driver wants to select "end autonomous driving" in (b) in FIG. 5, the driver presses input button 51g in (c) in FIG. 2. When the driver wants to select a behavior, the driver presses one of input buttons 51a through 51c in (c) in FIG. 2.

When the input received by input interface 51 is an input that ends autonomous driving (i.e., when vehicle controller 7 is notified that input button 51g is pressed), vehicle controller 7 ends autonomous driving (step S19). When the input received by input interface 51 is an input selecting a behavior (i.e., when any one of input buttons 51a through 51c is pressed), vehicle controller 7 controls vehicle 1 so as to implement the behavior corresponding to the pressed input button (step S20).

When input interface 51 does not receive an input from the driver within the second predetermined period of time (NO in step S17), vehicle controller 7 controls vehicle 1 so as to implement the primary behavior (step S21).

Figure 6:
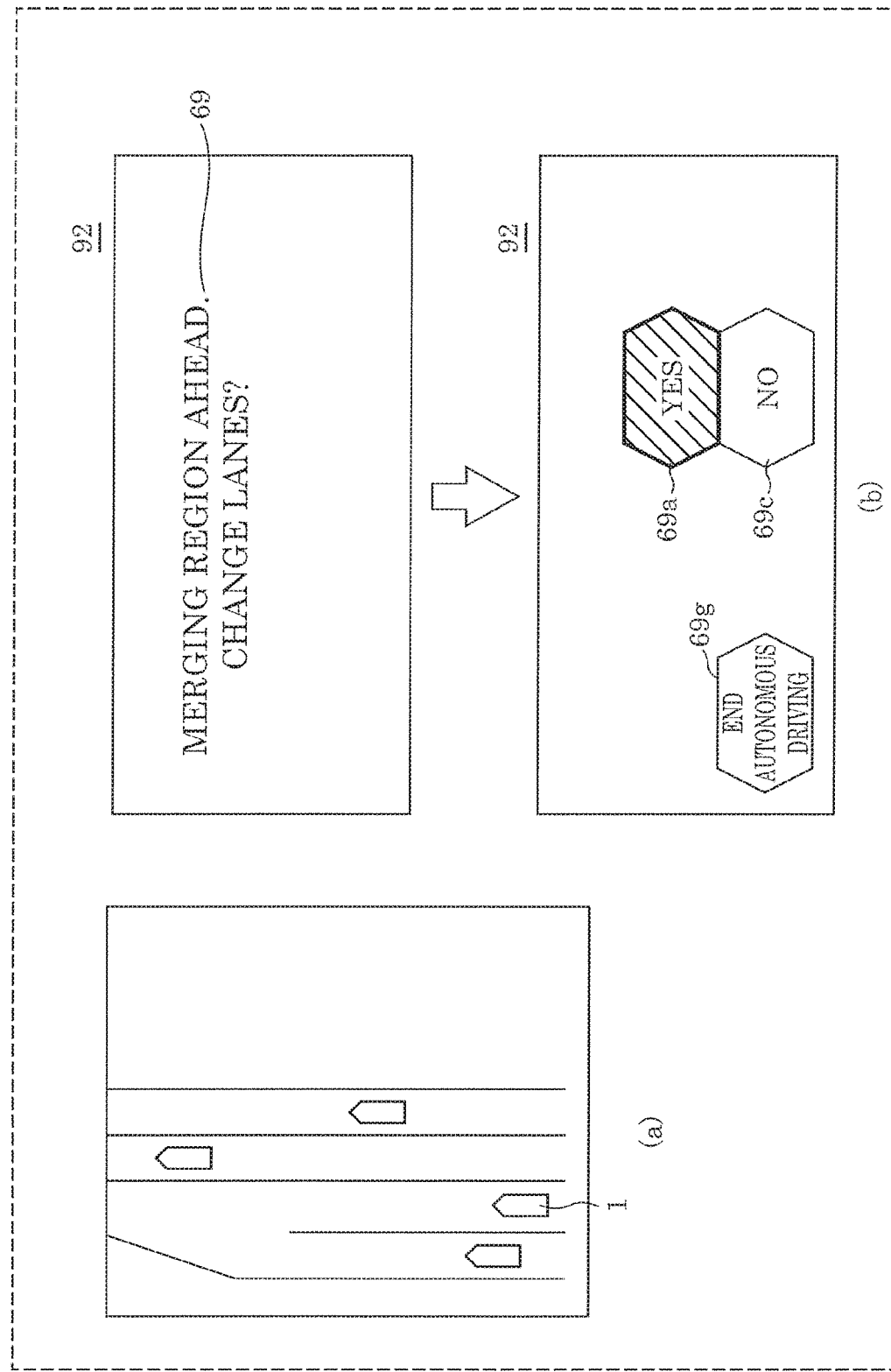
FIG. 6 illustrates the first example of the driving environment and another example of display control related to the first example.

FIG. 6 illustrates the first example of a driving environment and another example of display control related to the first example. In FIG. 6, (a) is the same as (a) in FIG. 5, and the display control illustrated in (b) in FIG. 6 is different from the display control illustrated in (b) in FIG. 5.

Similar to the example that referenced (b) in FIG. 5, vehicle controller 7 reads, from storage 8, three behavior candidates with respect to the driving environment illustrated in (a) in FIG. 6: causing vehicle 1 to accelerate, causing vehicle 1 to decelerate, and causing vehicle 1 to change lanes to the right. We will assume that the behavior of causing vehicle 1 to change lanes to the right is stored as the highest priority behavior in storage 8.

In this case, vehicle controller 7 then causes notifier 92 to notify the driver with information on the driving environment and information on the primary behavior. In the example illustrated in (b) in FIG. 6, vehicle controller 7 generates information on the driving environment and text information 69 indicating the information on the primary behavior, and causes notifier 92 to display text information 69.

Vehicle controller 7 then displays, in display regions 69a and 69c, displays prompting the driver to adopt or reject the primary behavior. Vehicle controller 7 also displays, in display region 69g, "end autonomous driving" which indicates switching to manual driving.

Here, vehicle controller 7 highlights the display of "YES" corresponding to the selection to adopt the primary behavior. Whether "YES" or "NO" is displayed highlighted may be determined in advance; the previously selected option may be highlighted; the number of times each option has been previously selected may be stored in storage 8 and the option selected the most may be highlighted on notifier 92.

By learning previously selected behaviors, vehicle controller 7 can appropriately notify the driver with information. Moreover, with this, the number of displays notified by notifier 92 is less than that in the example in (b) in FIG. 5, which reduces the burden placed on the driver.

Figure 7:
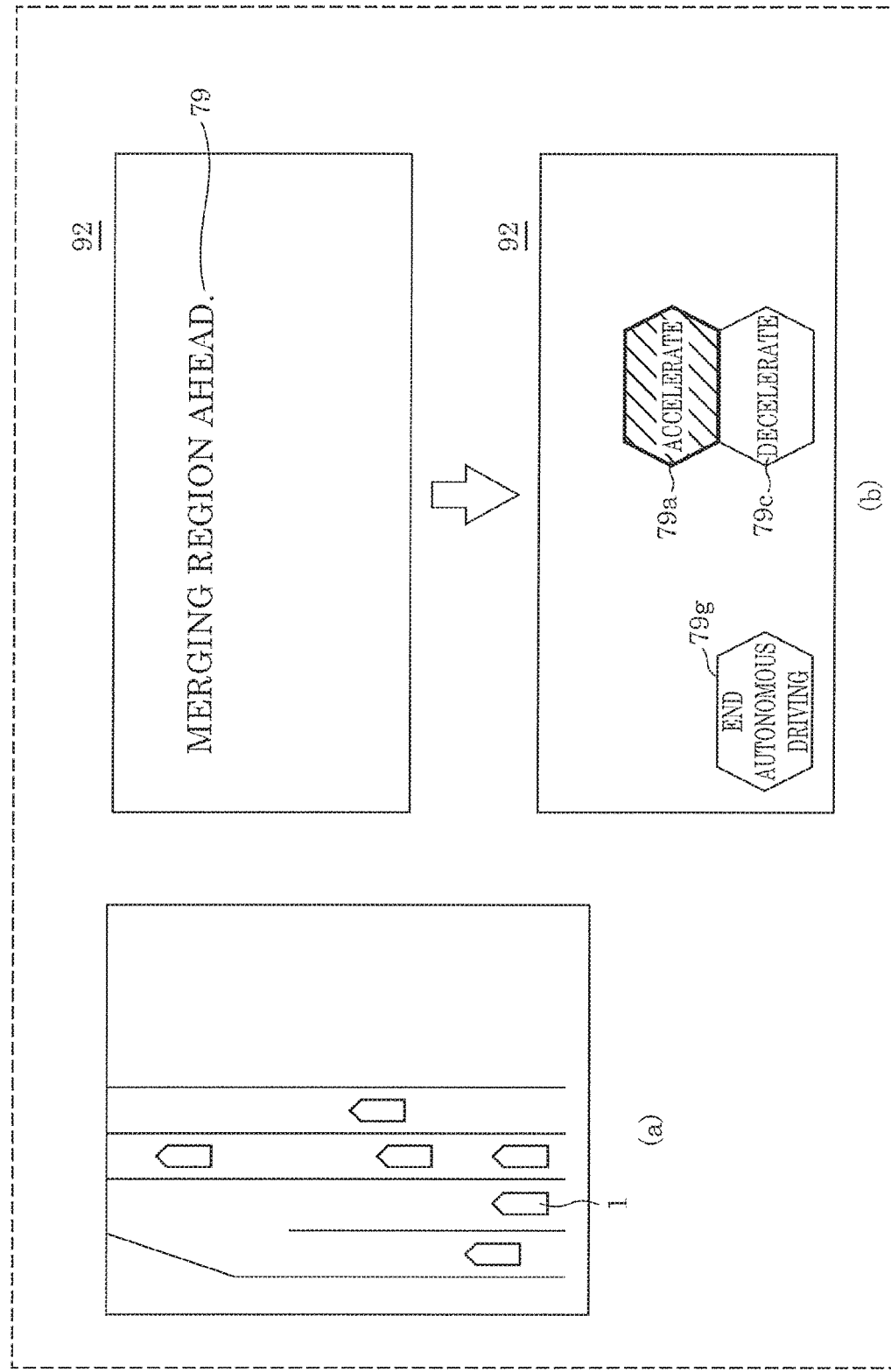
FIG. 7 illustrates a second example of the driving environment and display control related to the second example.

FIG. 7 illustrates a second example of a driving environment and display control related to the second example. In FIG. 7, (a) illustrates a bird's-eye view of the driving environment. The driving environment illustrated in (a) in FIG. 7 is similar to the driving environment illustrated in (a) in FIG. 5 and (a) in FIG. 6 in that there is a merging region in front of vehicle 1, but differs from the driving environment illustrated in (a) in FIG. 5 and (a) in FIG. 6 in that there are vehicles to the right of vehicle 1. In this case, vehicle controller 7 determines to not change lanes.

Then, when vehicle controller 7 determines that the driving environment of vehicle 1 is a driving environment like the one illustrated in (a) in FIG. 7, vehicle controller 7 displays information on the determined driving environment as text information 79 on notifier 92, as illustrated in (b) in FIG. 7.

Vehicle controller 7 further selects either causing vehicle 1 to accelerate or causing vehicle 1 to decelerate from among the three behavior candidates read from storage 8 of causing vehicle 1 to accelerate, causing vehicle 1 to decelerate, and causing vehicle 1 to change lanes to the right, since vehicle 1 cannot change lanes to the right.

Moreover, vehicle controller 7 predicts that vehicle 1 would come too close to the merging vehicle if vehicle 1 were to continue traveling at its current speed, and determines that causing vehicle 1 to decelerate is the most appropriate behavior, i.e., determines that causing vehicle 1 to decelerate is the primary behavior.

Here, determining which of the three behavior candidates is the most appropriate behavior is determined using a conventional technique for determining the most appropriate behavior based on information on the driving state and the surroundings. Moreover, which is the most appropriate behavior may be determined in advance; the previously selected behavior may be sorted in storage 8 the previously selected behavior may be determined to be the most appropriate behavior; a number of times each behavior has been selected may be stored in storage 8 and the behavior having the highest count may be determined to be the most appropriate behavior.

Then, vehicle controller 7 displays "decelerate" in display region 79c as the primary behavior, and displays "accelerate" in display region 79a as a secondary behavior. Vehicle controller 7 also displays, in display region 79g, "end autonomous driving" which indicates switching to manual driving.

With this sort of display control, vehicle controller 7 can notify the driver of the most appropriate behavior for any given driving environment as the primary behavior.

The information on the primary behavior may be arranged on top and the information on the secondary behavior(s) may be arranged on the bottom, and the selection function for each may be respectively assigned to input buttons 51a and 51c; information on the acceleration behavior may be arranged on top, information on the deceleration behavior may be arranged on the bottom, information on a behavior corresponding to a lane change to the right may be arranged on the right, information on a behavior corresponding to a lane change to the left may be arranged on the left, and the selection function for each may be respectively assigned to input buttons 51a, 51c, 51b, and 51d to make it possible to switch between the selections; moreover, priority may be given to the arrangement of the behaviors, and priority may be given to the arrangement of the input buttons. Further, the display size of the information on the primary behavior may be increased and the display size of the information on the secondary behavior(s) may be reduced. Note that by arranging the display of the behavior information so as to correspond to the forward, rearward, left, and right behaviors of the vehicle, the driver can more intuitively operate the inputs.

Next, an example of a driving environment other than one including a merging region in front of vehicle 1 will be given.

Figure 8:
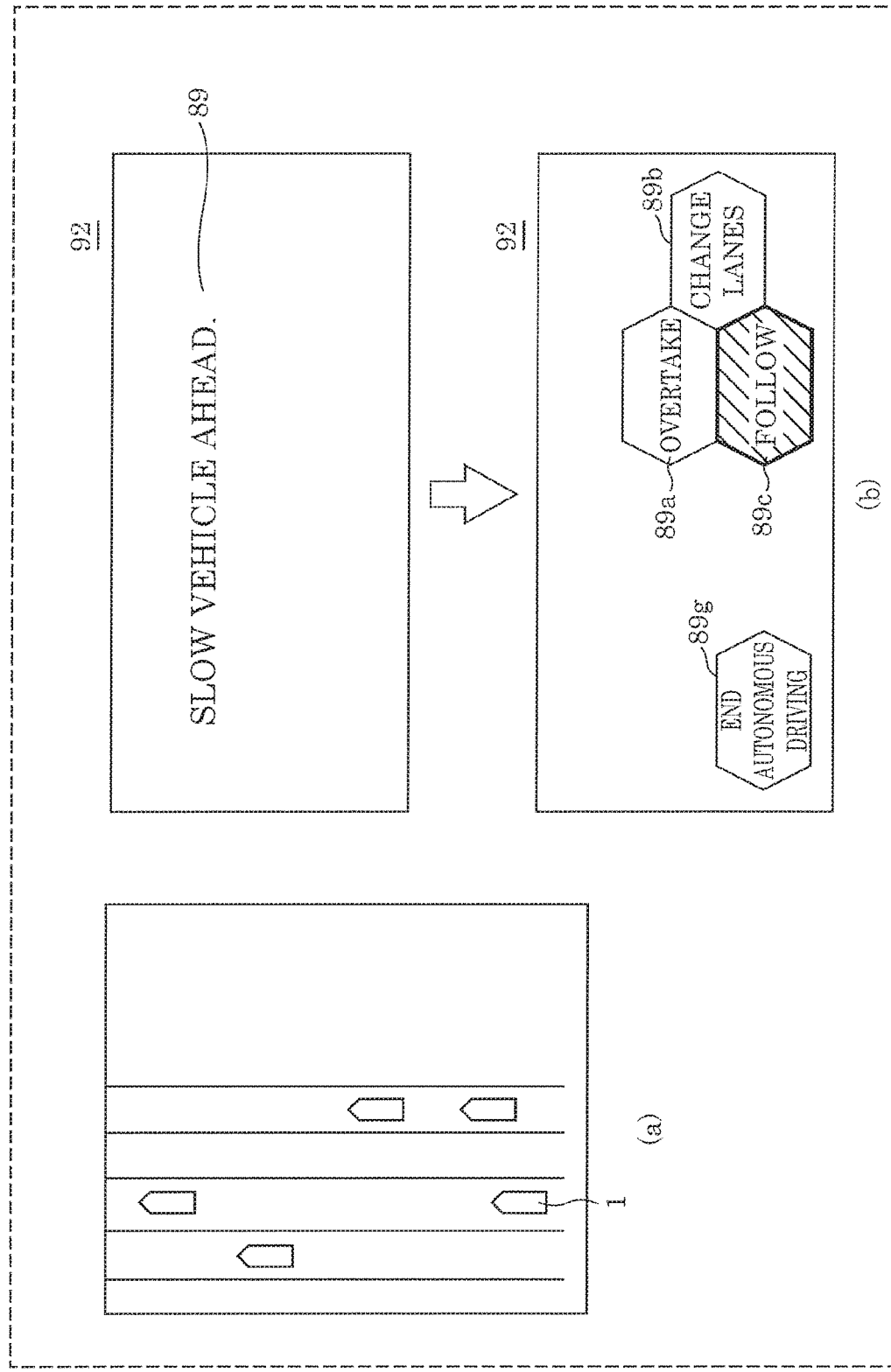
FIG. 8 illustrates a third example of the driving environment and display control related to the third example.

FIG. 8 illustrates a third example of a driving environment and display control related to the third example. In FIG. 8, (a) illustrates a bird's-eye view of the driving environment of vehicle 1. More specifically, (a) in FIG. 8 illustrates a driving environment in which the leading vehicle in front of vehicle 1 is traveling slower than vehicle 1 and vehicle 1 can change lanes to an adjacent lane.

Vehicle controller 7 determines that the current driving environment is the driving environment illustrated in (a) in FIG. 8 based on information on the driving state and the surroundings. In this case, vehicle controller 7 causes notifier 92 to display information on the determined driving environment as text information 89.

Vehicle controller 7 reads three behavior candidates from storage 8 as behavior candidates corresponding to the determined driving environment: overtaking the leading vehicle, changing lanes to an adjacent lane, and causing vehicle 1 to decelerate and follow the leading vehicle.

Then, since the speed of the leading vehicle after the leading vehicle decelerates is higher than a predetermined value and thus allowable, vehicle controller 7 determines that causing vehicle 1 to decelerate and follow the leading vehicle is the most appropriate behavior, i.e., determines that causing vehicle 1 to decelerate and follow the leading vehicle is the primary behavior.

Here, determining which of the three behavior candidates is the most appropriate behavior is determined using a conventional technique for determining the most appropriate behavior based on information on the driving state and the surroundings. Moreover, which is the most appropriate behavior may be determined in advance, the previously selected behavior may be sorted in storage 8 the previously selected behavior may be determined to be the most appropriate behavior, a number of times each behavior has been selected may be stored in storage 8, the behavior having the highest count may be determined to be the most appropriate behavior.

Moreover, as illustrated in (b) in FIG. 8, vehicle controller 7 highlights and displays the text information "follow" indicating the primary behavior in display region 89c, and displays the text information "overtake" and "change lanes" as secondary behaviors in display regions 89a and 89b, respectively. Vehicle controller 7 also displays, in display region 89g, "end autonomous driving" which indicates switching to manual driving.

The information on the primary behavior may be arranged on top and the information on the secondary behavior(s) may be arranged on the bottom, and the selection function for each may be respectively assigned to input buttons 51a and 51c; information on the overtake behavior may be arranged on top, information on the follow behavior may be arranged on the bottom, information on a behavior corresponding to a lane change to the right may be arranged on the right, information on a behavior corresponding to a lane change to the left may be arranged on the left, and the selection function for each may be respectively assigned to input buttons 51*a*, 51*c*, 51*b*, and 51*d* to make it possible to switch between the selections; moreover, priority may be given to the arrangement of the behaviors, and priority may be given to the arrangement of the input buttons. Further, the display size of the information on the primary behavior may be increased and the display size of the information on the secondary behavior(s) may be reduced.

Figure 9:
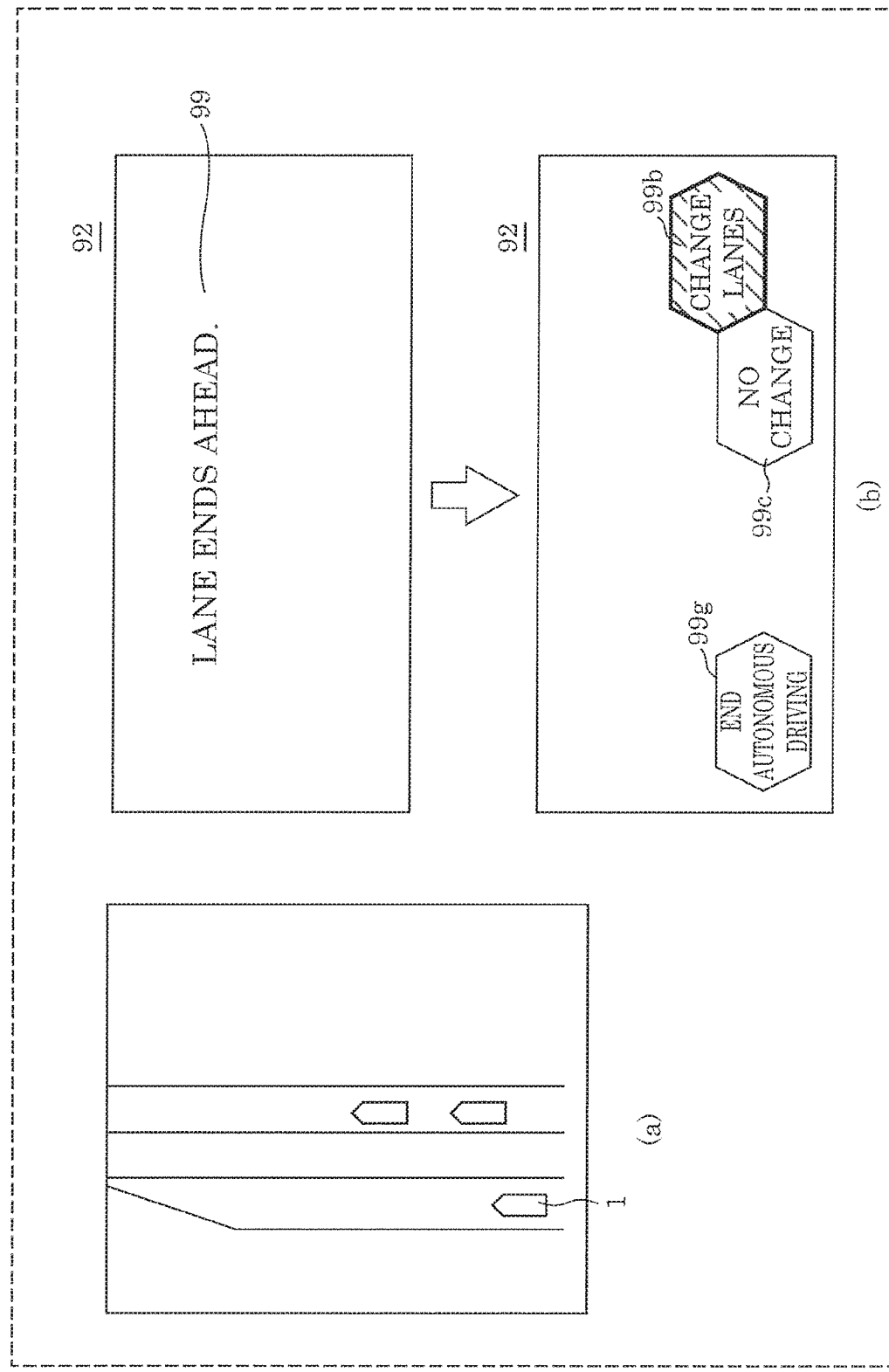
FIG. 9 illustrates a fourth example of the driving environment and display control related to the fourth example.

FIG. 9 illustrates a fourth example of a driving environment and display control related to the fourth example. In FIG. 9, (a) illustrates a bird's-eye view of the driving environment of vehicle 1. More specifically, the driving environment illustrated in (a) in FIG. 9 is a driving environment in which the lane in which vehicle 1 is driving ends ahead.

Vehicle controller 7 determines that the current driving environment is the driving environment illustrated in (a) in FIG. 9 based on information on the driving state and the surroundings. In this case, vehicle controller 7 causes notifier 92 to display information on the determined driving environment as text information 99.

Vehicle controller 7 reads two behavior candidates from storage 8 as behavior candidates corresponding to the determined driving environment: changing lanes to an adjacent lane; and continuing driving in the current lane.

Then, since the TTC to the point where the lane ends is less than a predetermined value, vehicle controller 7 determines that changing lanes to an adjacent lane is the most appropriate behavior, i.e., determines that changing lanes to an adjacent lane is the primary behavior.

Here, determining which of the two behavior candidates is the most appropriate behavior is determined using a conventional technique for determining the most appropriate behavior based on information on the driving state and the surroundings. Moreover, which is the most appropriate behavior may be determined in advance, the previously selected behavior may be sorted in storage 8 the previously selected behavior may be determined to be the most appropriate behavior, a number of times each behavior has been selected may be stored in storage 8, the behavior having the highest count may be determined to be the most appropriate behavior.

Moreover, as illustrated in (b) in FIG. 9, vehicle controller 7 highlights and displays the text information "change lanes" indicating the primary behavior in display region 99*b*, and displays the text information "no change" as the secondary behavior in display region 99*c*. Vehicle controller 7 also displays, in display region 99*g*, "end autonomous driving" which indicates switching to manual driving.

The information on the primary behavior may be arranged on top and the information on the secondary behavior may be arranged on the bottom, and the selection function for each may be respectively assigned to input buttons 51*a* and 51*c*; information indicating no change in behavior may be arranged on the bottom, information on a behavior corresponding to a lane change to the right may be arranged on the right, information on a behavior corresponding to a lane change to the left may be arranged on the left, and the selection function for each may be respectively assigned to input buttons 51*c*, 51*b*, and 51*d* to make it possible to switch between the selections; moreover, priority may be given to the arrangement of the behaviors, and priority may be given to the arrangement of the input buttons. Further, the display size of the information on the primary behavior may be increased and the display size of the information on the secondary behavior may be reduced. Note that assigning different functions to the different display regions in accordance with different driving environments, as illustrated in FIG. 7, FIG. 8, and FIG. 9, makes it possible to notify the driver of information and allow the driver to make inputs in a compact region.

In the above example, vehicle controller 7 causes notifier 92 to notify the driver of behaviors in accordance with information on the driving environment and the surroundings, but the present invention is not limited to this example. For example, notifier 92 may be caused to notify the driver of behaviors when driver makes a predetermined input.

Figure 10:
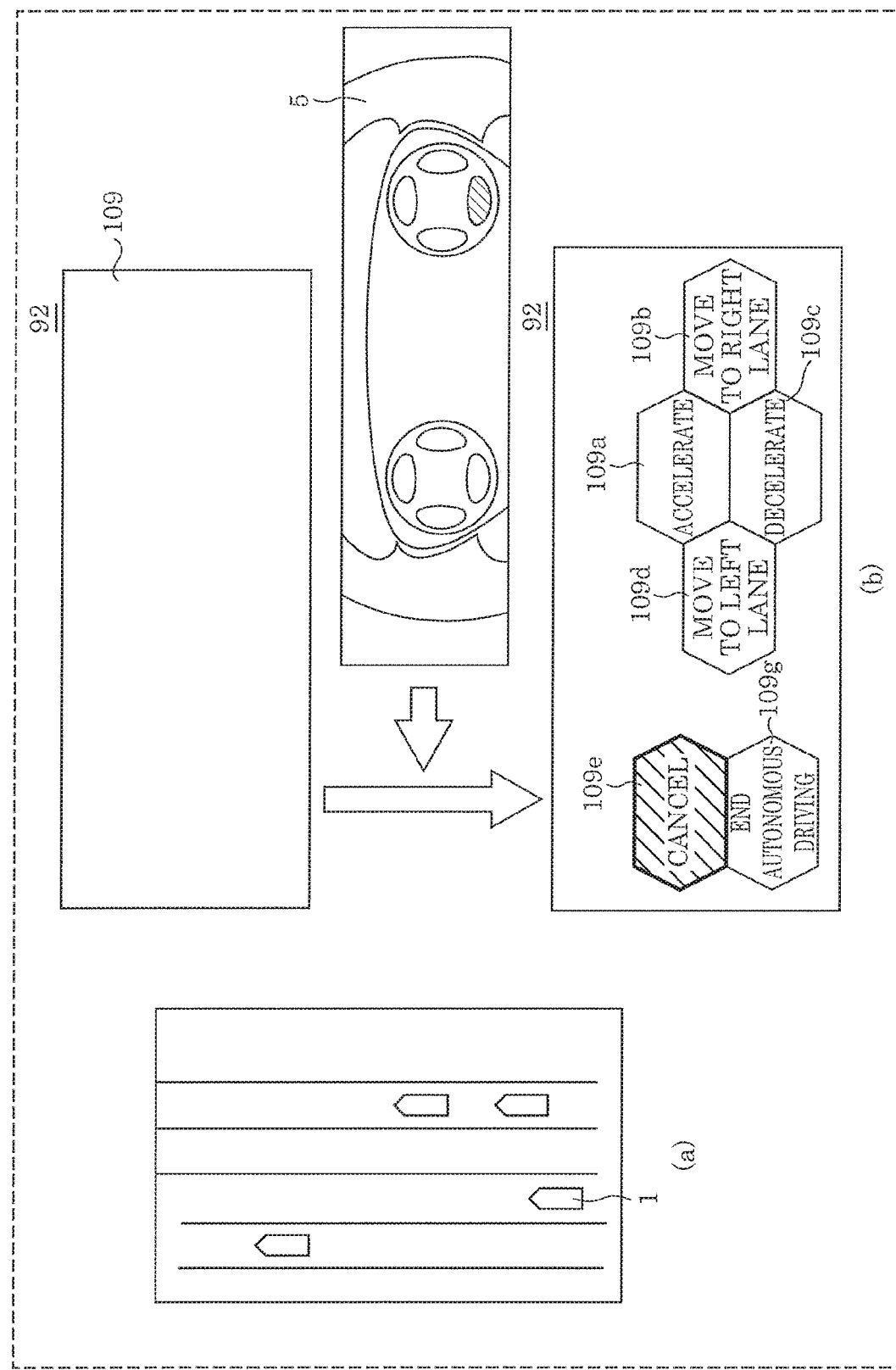
FIG. 10 illustrates a fifth example of the driving environment and display control related to the fifth example.

FIG. 10 illustrates a fifth example of a driving environment and display control related to the fifth example. In FIG. 10, (a) illustrates a bird's-eye view of the driving environment of vehicle 1. More specifically, (a) in FIG. 10 illustrates a driving environment in which it is possible for vehicle 1 to change lanes to the left and to the right.

The driving environment illustrated in (a) in FIG. 10 differs from the driving environments illustrated in (a) in FIG. 5 through (a) in FIG. 9 in that normal driving, i.e., driving in which changing lanes, acceleration or deceleration is not necessary is possible. In this case, vehicle controller 7 need not cause notifier 92 to display information on the driving environment as text information, as is illustrated in display 109 in (b) in FIG. 10.

In this way, in situations where text information is not displayed on notifier 92, when the driver presses any one of the input buttons in input interface 51, vehicle controller 7 reads, from storage 8, behavior candidates for normal driving.

More specifically, four behavior candidates are stored in storage 8 in association with a normal driving environment, such as the driving environment illustrated in (a) in FIG. 10: causing vehicle 1 to accelerate, causing vehicle 1 to decelerate, causing vehicle 1 to change lanes to the right, and causing vehicle 1 to change lanes to the left. Vehicle controller 7 reads these behavior candidates and displays them in display region 109*a* through 109*d* on notifier 92.

Vehicle controller 7 also displays, in display region 99*g*, "end autonomous driving" which indicates switching to manual driving, and highlights and displays, in display region 109*e*, "cancel" which indicates cancelling of the behavior update.

With the present embodiment described above, it is possible to efficiently notify the driver of candidates for the behavior to be implemented next, and allow the driver to select a preferable behavior.

Note that instead of the driver selecting the behavior to be implemented, the driver may manually perform the behavior directly using, for example, the steering wheel. This allows the driver to quickly switch to manual driving operation at the driver's will.

(Variation)

In the present embodiment described above, the display of notifier 92 is exemplified as displaying text information, but notifier 92 is not limited to this example. For example, notifier 92 may display visual information to the driver using symbols indicating the behaviors. Hereinafter, an example will be given in which the examples illustrated in FIG. 5 and FIG. 7 display symbols as visual indicators to the driver.

Figure 11:
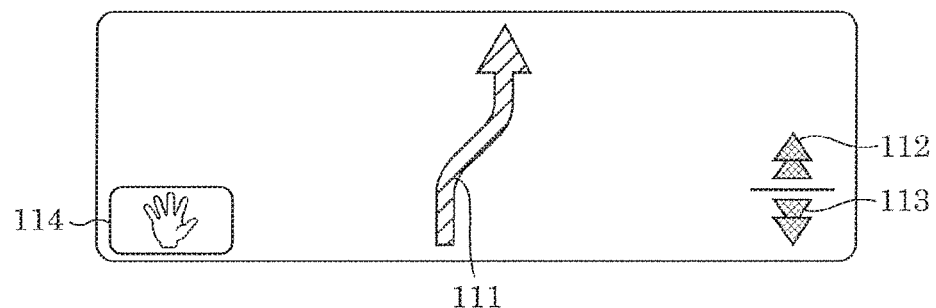
FIG. 11 illustrates another example of display control for the first example of the driving environment illustrated in FIG. 5.

FIG. 11 illustrates another example of display control for the first example of a driving environment illustrated in FIG. 5. In this example, the primary behavior is causing vehicle 1 to switch lanes to the right, and the secondary behaviors are causing vehicle 1 to accelerate and causing vehicle 1 to decelerate.

In these cases, symbol 111 indicating "change lanes", which is the primary behavior, is displayed as a large symbol in the center, symbol 112 indicating "cause vehicle 1 to accelerate" and symbol 113 indicating "cause vehicle 1 to decelerate", which are secondary behaviors, are displayed as small symbols to the right. Moreover, symbol 114 indicating "end autonomous driving" is displayed as a small symbol to the left.

If no instruction to change the behavior of vehicle 1 is received from the driver, vehicle 1 will be caused to change lanes.

Figure 12:
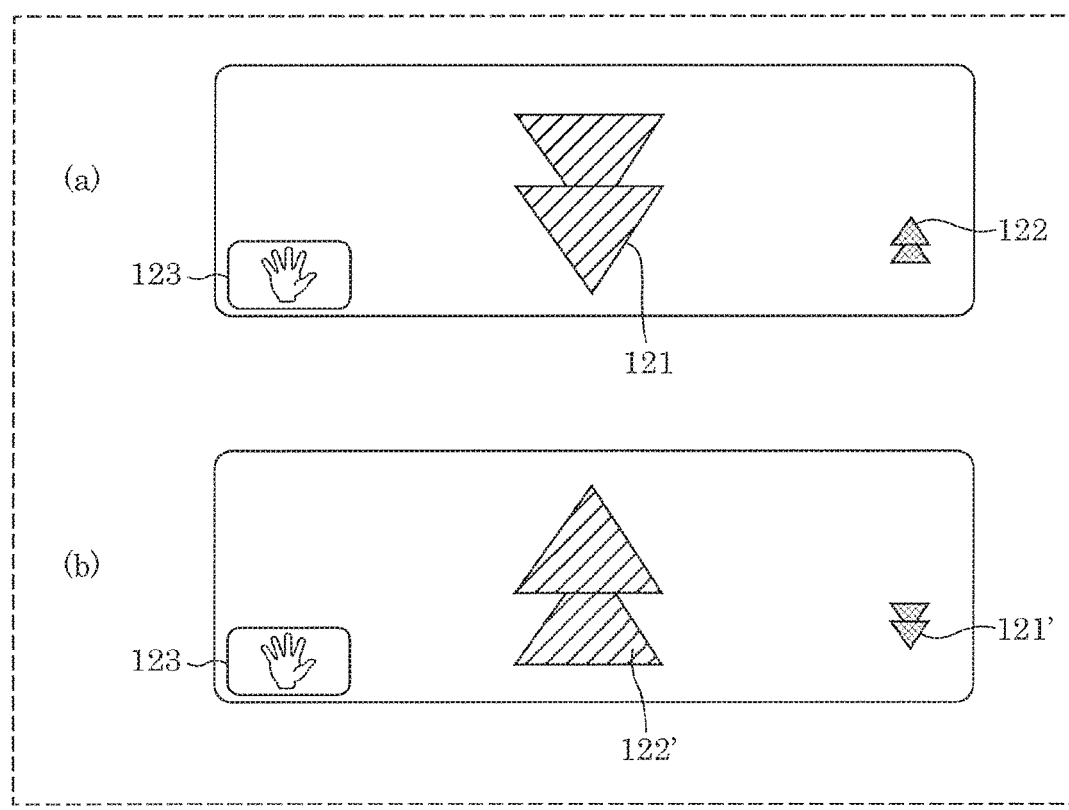
FIG. 12 illustrates another example of display control for the second example of the driving environment illustrated in FIG. 7.

FIG. 12 illustrates another example of display control for the second example of a driving environment illustrated in FIG. 7. In this example, in contrast to the first example, since there is a vehicle driving to the right of vehicle 1, vehicle 1 cannot change lanes. Accordingly, "cause vehicle 1 to decelerate" is set as the primary behavior, and "cause vehicle 1 to accelerate" is set as a secondary behavior.

In these cases, as illustrated in (a) in FIG. 12, symbol 121 indicating "cause vehicle 1 to decelerate", which is the primary behavior, is displayed as a large symbol in the center, and symbol 122 indicating "cause vehicle 1 to accelerate", which is a secondary behavior, is displayed as a small symbol to the right. Moreover, symbol 123 indicating "end autonomous driving" is displayed as a small symbol to the left.

Here, we will assume input interface 51 receives an input selecting "cause vehicle 1 to accelerate" from the driver. In these cases, as illustrated in (b) in FIG. 12, symbol 122' indicating "cause vehicle 1 to accelerate", which is the primary behavior, is displayed as a large symbol in the center, and symbol 121' indicating "cause vehicle 1 to decelerate", which is a secondary behavior, is displayed as a small symbol to the right.

With the present embodiment described above, it is possible to efficiently notify the driver of candidates for the behavior to be implemented next, and allow the driver to select a preferable behavior. The driver can also comprehend the behavior implemented by the vehicle and other selectable behaviors, reassuring the driver and allowing the driver to continue with autonomous driving. Moreover, this allows the driver to give instructions to the vehicle in a smooth manner.

Moreover, with this embodiment, the selections notified by the notifier, i.e., the secondary behaviors, are variable in accordance with the driving environment.

Embodiment 2

In Embodiment 1, an example is given in which inputs based on content displayed on notifier 92 is made via input interface 51 disposed on steering wheel 5. In this embodiment, an example in which a touch panel is used instead of input interface 51 disposed on steering wheel 5.

Figure 13:
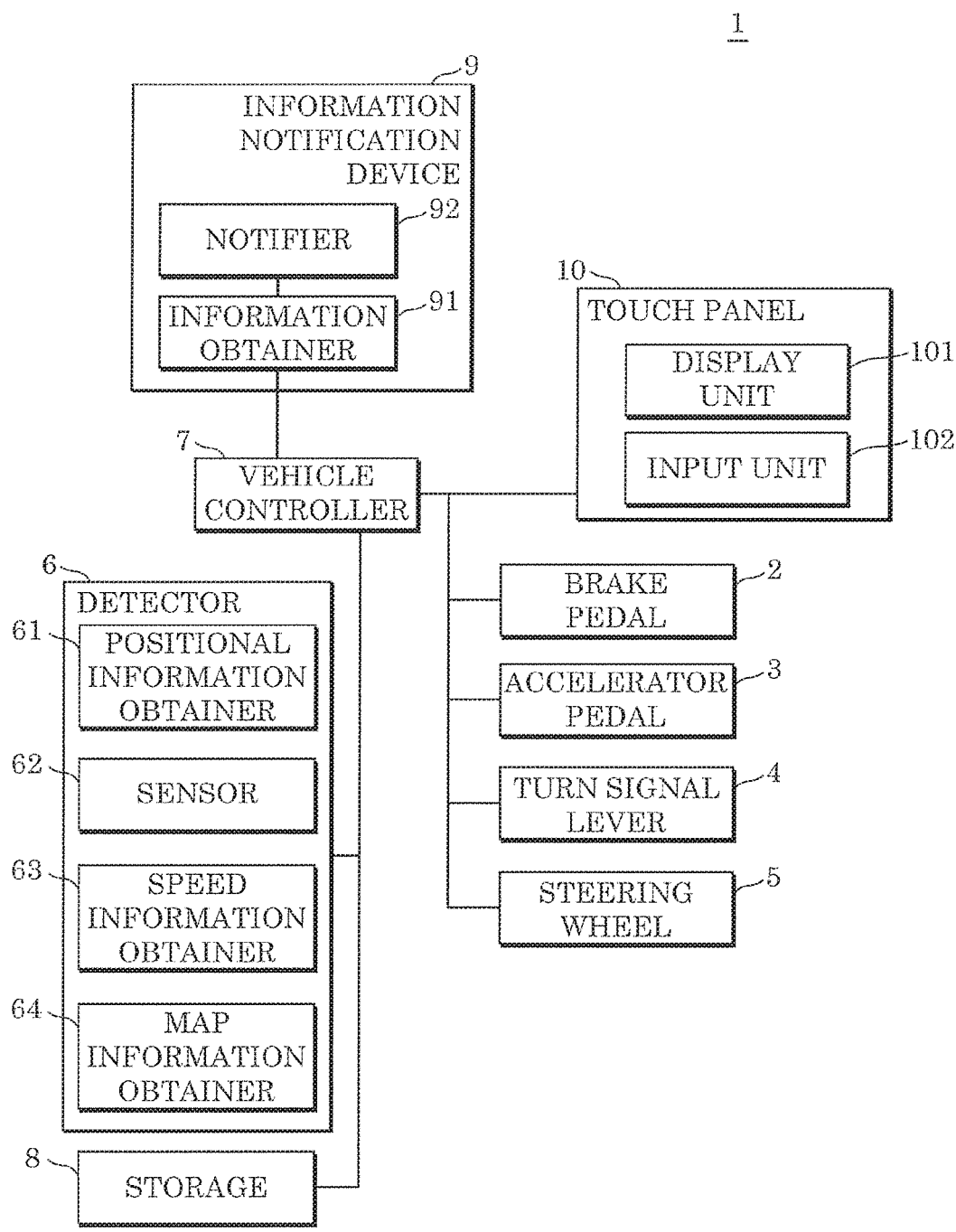
FIG. 13 is a block diagram illustrating relevant components in a vehicle including the information notification device according to Embodiment 2 of the present invention.

FIG. 13 is a block diagram illustrating relevant components in vehicle 1 including the information notification device according to Embodiment 2 of the present invention. Note that in FIG. 13, elements that are the same as in FIG. 1 share like reference marks, and detailed description thereof will be omitted. Vehicle 1 illustrated in FIG. 13 includes touch panel 10 instead of input interface 51 disposed on steering wheel 5.

Touch panel 10 is a device capable of displaying information and receiving an input, such as a liquid crystal panel, and is connected to vehicle controller 7. Touch panel 10 includes display unit 101 that displays information based on control performed by vehicle controller 7, and input unit 102 that receives an input from, for example, the driver, and outputs the received input to vehicle controller 7.

Next, display control related to touch panel 10 will be described. Here, display control for a situation in which vehicle 1 is driving in the middle lane of a three lane road, and it is possible for vehicle 1 to change lanes to either of the left or right lanes will be described.

Figure 14:
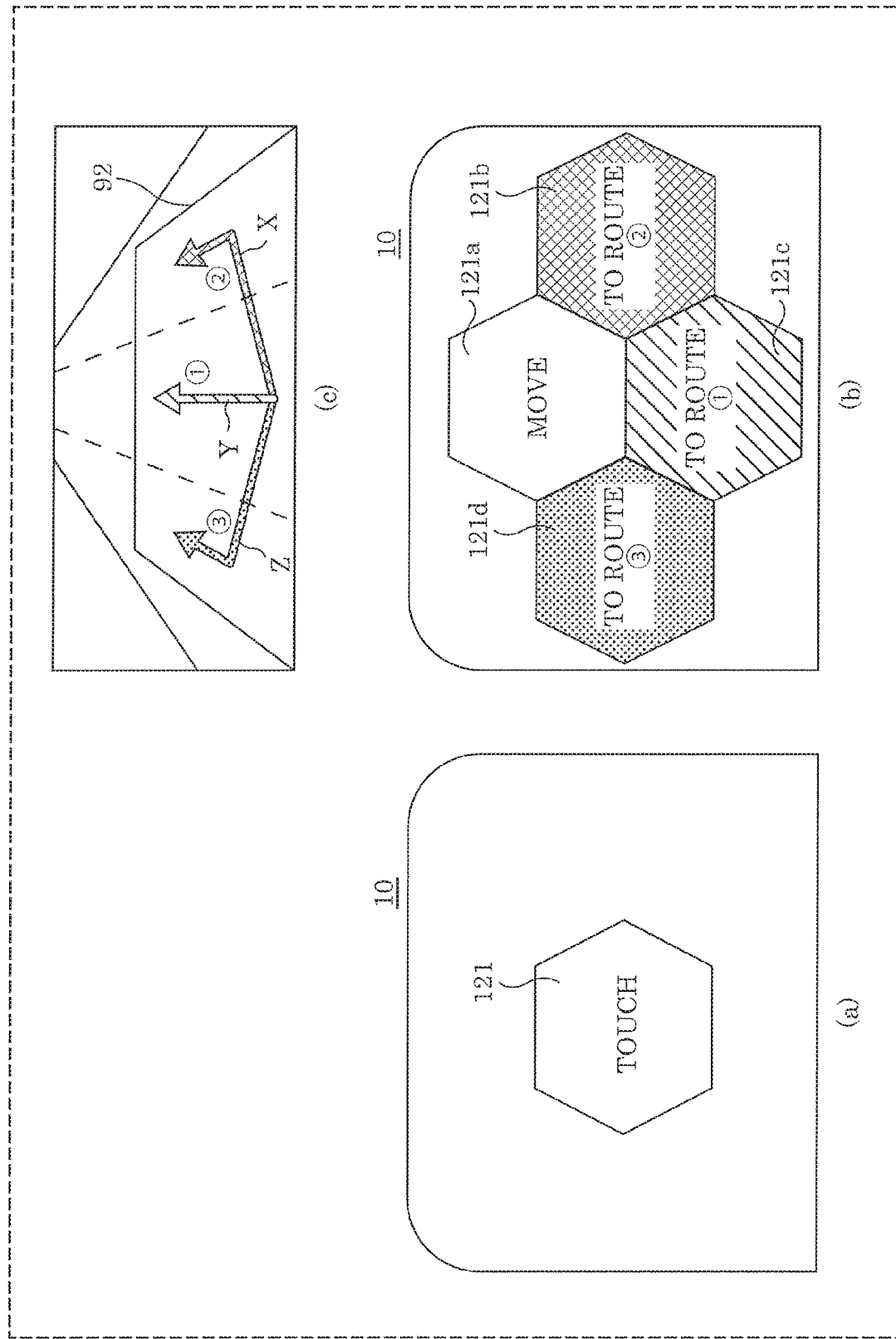
FIG. 14 illustrates screens displayed by a touch panel according to Embodiment 2.

FIG. 14 illustrates screens displayed by touch panel 10 according to Embodiment 2. In FIG. 14, (a) illustrates an initial display of display unit 101 of touch panel 10. When vehicle controller 7 determines that vehicle 1 can change lanes to either the right or left lane, vehicle controller 7 causes display unit 101 of touch panel 10 to display a screen like the one illustrated in (a) in FIG. 14. Here, the display of "touch" in display region 121 indicates that touch panel 10 is in a mode in which touch inputs can be received by driver.

In the screen illustrated in (a) in FIG. 14, when the driver makes an input by touching display region 121, input unit 102 receives this input and outputs, to vehicle controller 7, information indicating that such an input was made. Upon receiving such information, vehicle controller 7 causes display unit 101 to display the screen illustrated in (b) in FIG. 14, and causes notifier 92 to display the screen illustrated in (c) in FIG. 14.

In (b) in FIG. 14, display region 121*a* indicating "move" indicating an input instructing vehicle 1 to move is displayed. Moreover, in (b) in FIG. 14, display regions 121*b* through 121*d* indicating that vehicle 1 can drive in any of the three lanes are displayed. Note that display regions 121*b* through 121*d* each correspond to one of the arrows in (c) in FIG. 14 labeled X, Y, and Z, each of which indicates a lane.

Moreover, each display region in (b) in FIG. 14 and a corresponding one of the arrows in (c) in FIG. 14 correspond in some aspect (for example, color or position). This yields a more intuitive display for the driver.

Further, for example, the thickness of each of the X, Y, and Z arrows may be changed to differentiate between the behavior implemented by the vehicle determined by the vehicle control and the behavior(s) selectable by the driver.

The driver selects a behavior of vehicle 1 by touching one of display regions 121*b* through 121*d* corresponding to the lane in which the driver wants to drive. In these cases, input unit 102 receives an input of a behavior selection made by the driver, and outputs, to vehicle controller 7, information on the selected behavior. Then, vehicle controller 7 controls vehicle 1 so as to implement the selected behavior. This results in vehicle 1 driving in the lane that the driver wants to drive in.

Note that the driver may make an input on touch panel 10 via a swipe gesture rather than a touch gesture. For example, in the example illustrated in FIG. 14, when the driver wants to change lanes to the lane indicated by the X arrow in (c) in FIG. 14, the driver swipes to the right on touch panel 10.

In these cases, input unit 102 receives an input of a swipe gesture, and outputs, to vehicle controller 7, information indicating the characteristics of the swipe gesture. Then, vehicle controller 7 controls vehicle 1 so as to implement the selected behavior of changing lanes to the lane indicated by the X arrow.

Further, when display region 121*a* indicating "move" indicating an input instructing vehicle 1 to move is displayed, "behavior selection" may be announced by speech. This allows for control via only HUD display, eliminating the need for the driver to look at the touch panel.

Moreover, when an input of a touch or swipe gesture is made, an aspect of the display of the lane corresponding to the selected display region of the touch panel may be changed to allow the driver to confirm, before finalizing the selection, which lane is being selected. For example, at the instance that display region b is touched, the thickness of lane X may be enlarged, and in the case that the driver immediately removes his or her finger, lane X may be cancelled from being selected and returned to its original thickness, and at the instant the touch moves to display region 121*c*, the thickness of lane Y may be enlarged, and in the case that the driver keeps touching display region 121*c*, lane Y may be selected and lane Y may be displayed as flashing to notify the driver that lane Y has been selected. This makes it possible to select and confirm the selection without making the driver look at his or her hands.

Note that just as in Embodiment 1, vehicle control functions such as acceleration, deceleration, overtaking, and no change may be assigned to display regions in accordance with the driving environment.

According to this embodiment described above, by providing a touch panel instead of the input interface, the driver can intuitively make inputs. Moreover, since it is possible to freely change, for example, the number, shape and size of the display regions which receive the inputs with a touch panel, the degree of freedom with respect to the user interface increases.

Embodiment 3

In Embodiment 1, an example was given in which the primary behavior and the secondary behavior(s) are displayed at the same time. In this embodiment, a configuration in which the primary behavior is first displayed on notifier 92, and after an input is received from the driver, the secondary behavior(s) is/are displayed will be described.

The configuration according to this embodiment includes, in addition to the configuration illustrated in FIG. 1 and described in Embodiment 1, a grip sensor in input interface 51 that detects whether the driver is gripping steering wheel 5 or not.

Figure 15:
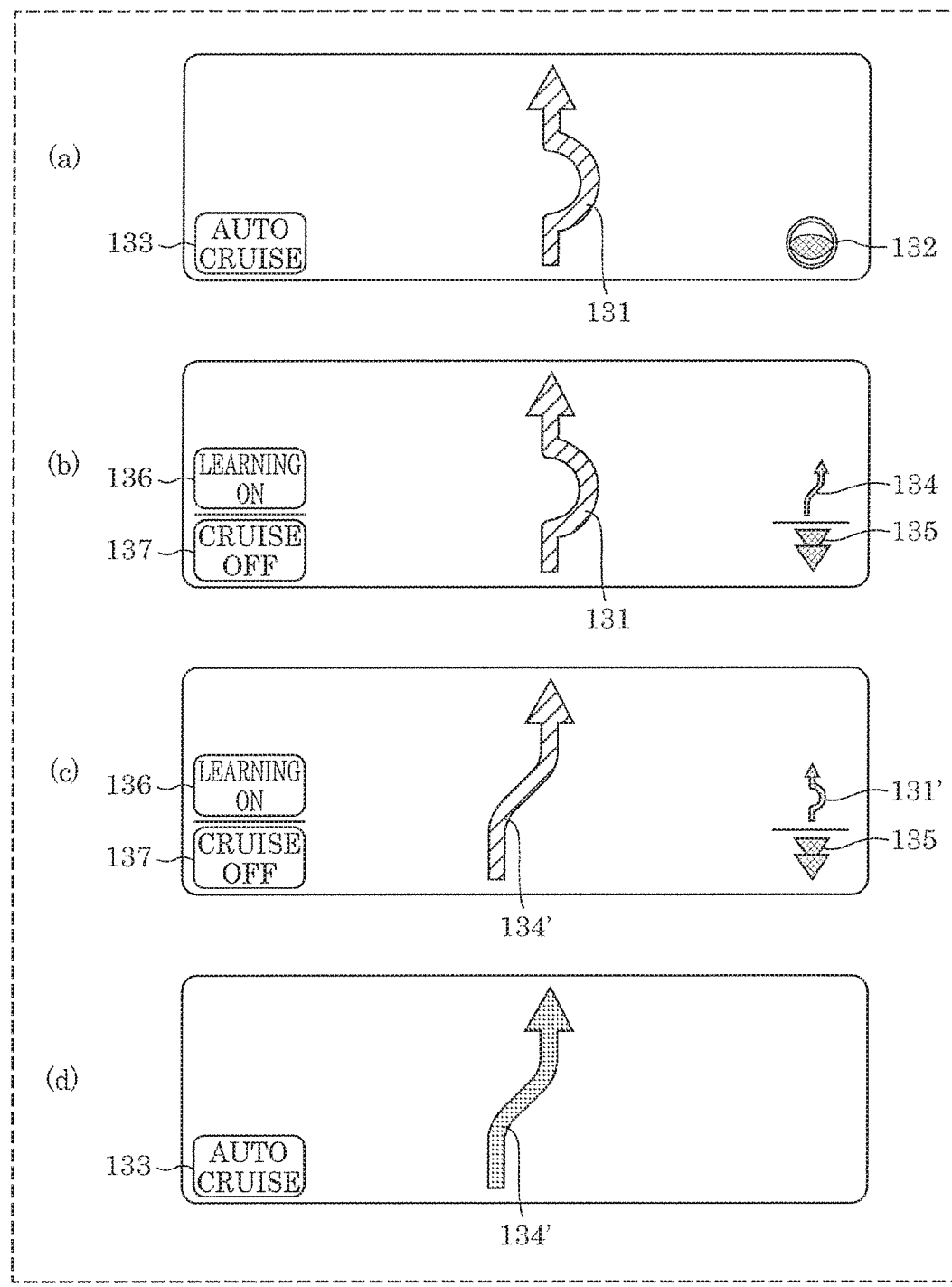
FIG. 15 illustrates screens displayed by a notifier according to Embodiment 3 of the present invention.

FIG. 15 illustrates screens displayed by notifier 92 according to Embodiment 3 of the present invention. Just as in the example illustrated in (a) in FIG. 8, FIG. 15 illustrates an example of a driving environment in which the leading vehicle in front of vehicle 1 is traveling slower than vehicle 1 and vehicle 1 can change lanes to an adjacent lane.

When vehicle controller 7 determines that the driving environment is the driving environment illustrated in (a) in FIG. 8, vehicle controller 7 first causes notifier 92 to display the screen illustrated in (a) in FIG. 15.

In (a) in FIG. 15, among behavior candidates to be implemented after elapse of a first predetermined period of time, symbol 131 indicating "overtake", which is the primary behavior, is displayed in a first aspect (for example, in a first color).

After notifier 92 is caused to display the screen in (a) in FIG. 15, after elapse of a second predetermined period of time, vehicle controller 7 causes notifier 92 change the display of symbol 131 from the first aspect to a different second aspect (for example, a second color different from the first color). Here, the second predetermined period of time is the same as the second predetermined period of time described in Embodiment 1.

In other words, while symbol 131 is being displayed in the first aspect, the driver can select a secondary behavior, but when symbol 131 is changed to the second aspect, the driver is not allowed to select a secondary behavior.

Moreover, in (a) in FIG. 15, symbol 132, which has the shape of a steering wheel and indicates that a secondary behavior is selectable, is displayed. When symbol 132 is being displayed, the secondary behavior(s) are displayed by the driver gripping steering wheel 5. Although symbol 132 indicates that a secondary behavior is selectable, the driver may be notified that a secondary behavior is selectable by symbol 131 being displayed in the first aspect. In these cases, symbol 132 need not be displayed.

Moreover, in (a) in FIG. 15, symbol 133, which indicates that autonomous driving is currently implemented, is displayed. Symbol 133 is an auxiliary display that indicates to the driver that autonomous driving is currently implemented, and symbol 133 need not be displayed.

When the driver grips steering wheel 5 while the screen in (a) in FIG. 15 is being displayed, it is detected by the grip sensor, and information on the detection result is output to vehicle controller 7. In these cases, vehicle controller 7 causes notifier 92 to display the screen illustrated in (b) in FIG. 15.

Just like in (a) in FIG. 15, in (b) in FIG. 15, symbol 131 indicating "overtake", which is the primary behavior, is displayed in the first aspect (for example, in the first color). Moreover, symbol 134 indicating "change lanes", which is a secondary behavior, and symbol 135 indicating "decelerate", which is a secondary behavior, are displayed.

The driver changes the driving behavior from the primary behavior to the secondary behavior by making an input on input interface 51 on steering wheel 5. For example, the driver changes the behavior to "change lanes" (symbol 134) or "decelerate" (symbol 135) by pressing input button 51*a* or input button 51*c* (see (c) in FIG. 2) on input interface 51.

Moreover, in (b) in FIG. 15, symbol 136, which indicates that the behavior of vehicle 1 is being learned by vehicle controller 7, is displayed. When symbol 136 is displayed, vehicle controller 7 learns the behavior selected by the driver. Symbol 136 need not be displayed. Moreover, learning may be performed at all times.

In other words, vehicle controller 7 stores, in storage 8, the behavior selected by the driver, and the next time vehicle 1 encounters the same driving environment, vehicle controller 7 causes notifier 92 to display the stored behavior as the primary behavior. Moreover, vehicle controller 7 may store, in storage 8, the number of times that each behavior is selected in the past, and cause notifier 92 to display the most selected behavior as the primary behavior.

Moreover, in (b) in FIG. 15, symbol 137, which indicates that autonomous driving is not currently implemented, is displayed. When symbol 137 is displayed, vehicle controller 7 waits until a behavior to be implemented after elapse of the first predetermined period of time is selected by the driver.

When the driver presses input button 51*a* on input interface 51 to select "change lanes" while the screen in (b) in FIG. 15 is being displayed, vehicle controller 7 receives information on this selection, and causes notifier 92 to display the screen in (c) in FIG. 15.

In (c) in FIG. 15, symbol 134' indicating "change lanes" is displayed in the first aspect. When vehicle controller 7 receives information on a selection of "change lanes", vehicle controller 7 determines that the selected behavior is the behavior to be implemented next, and causes notifier 92 to display symbol 134' indicating "change lanes" in the first aspect.

Moreover, symbol 131' in (c) in FIG. 15 indicates that symbol 131 displayed as the primary behavior in (b) in FIG. 15 is displayed in place of symbol 134.

The input previously selected by the driver may be cancelled when the driver presses any one of the input buttons twice sequentially while the screen in (c) in FIG. 15 is being displayed. In these cases, vehicle controller 7 receives information on the input of pressing any one of the input buttons twice sequentially, and causes notifier 92 to switch from the screen illustrated in (b) in FIG. 15 to the screen illustrated in (c) in FIG. 15.

After causing notifier 92 to display the screen in (a) in FIG. 15, in the time until the second predetermined period of time elapses, vehicle controller 7 causes notifier 92 to switch displays to the screen in (b) in FIG. 15 or the screen in (c) in FIG. 15, based on the input made by the driver. Vehicle controller 7 then causes notifier 92 to display the screen illustrated in (a) in FIG. 15, and after the second predetermined period of time has elapsed, subsequently causes notifier 92 to display the screen illustrated in (d) in FIG. 15.

Note that when vehicle controller 7 receives information from the grip sensor indicating that the driver has removed his or her hand or hands from steering wheel 5, vehicle controller 7 may cause notifier 92 to display the screen illustrated in (d) in FIG. 15 before the second predetermined period of time has elapsed.

Here, in (d) in FIG. 15, symbol 134' selected by the driver indicating "change lanes" is displayed as the next behavior in the second aspect, and symbol 133 indicating that autonomous driving is currently implemented is once again displayed.

With the present embodiment described above, vehicle controller 7 changes the displays on notifier 92 so that other behavior candidates can be checked only when the driver wants to update the next behavior to be implemented. This configuration makes it possible to reduce the number of displays that the driver looks at and thus reduce burden placed on the driver.

Embodiment 4

In this embodiment, an example in which a neural network (NN) that is built by preliminary learning is used as the method of determining which of a plurality of behavior candidates implementable by vehicle 1 is the most appropriate behavior, will be given. Note that the determining of the above-described behavior is hereinafter referred to as estimating a behavior.

Figure 16:
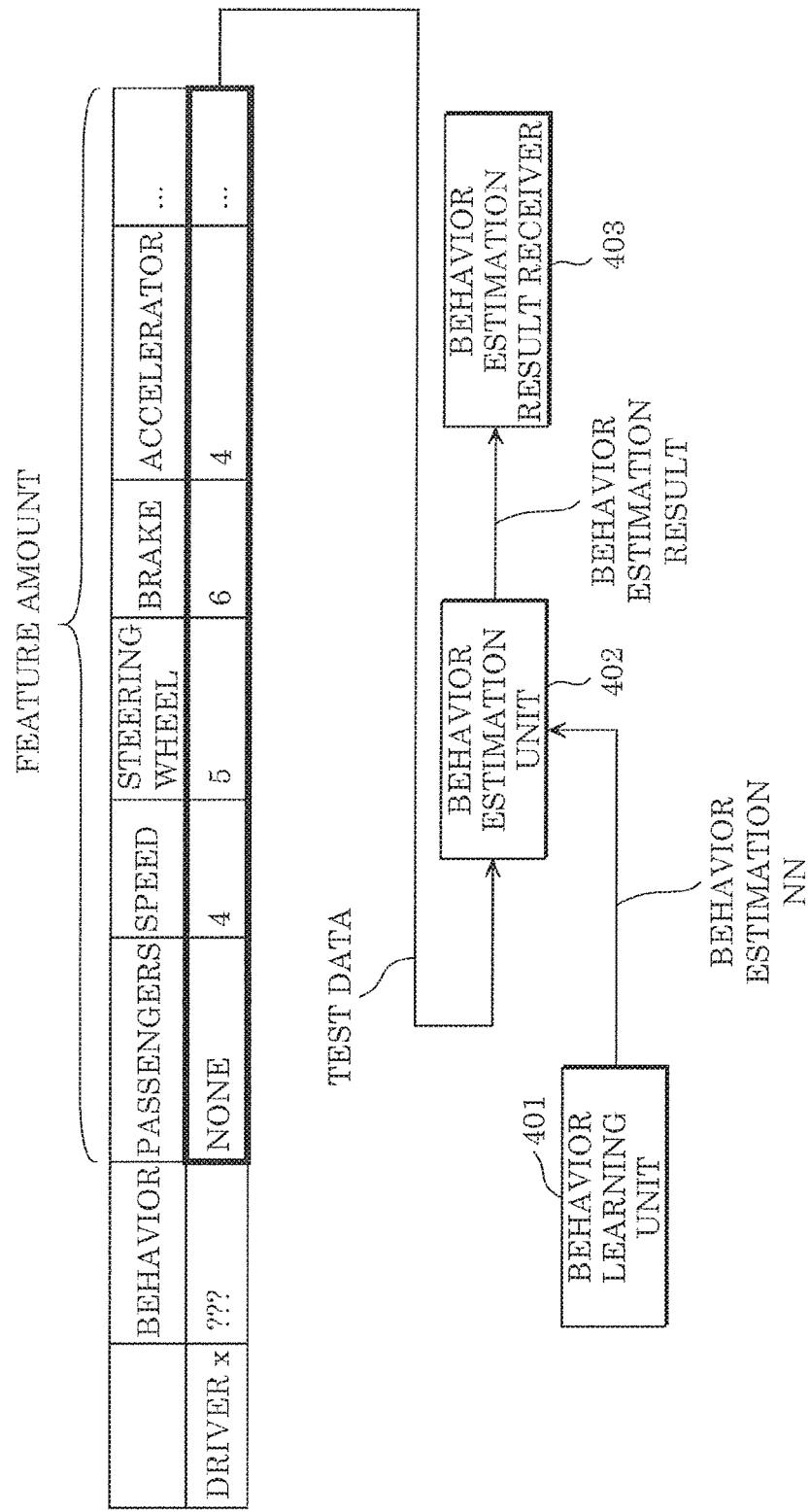
FIG. 16 is a block diagram illustrating one example of a functional configuration relating to behavior estimation by a vehicle controller according to Embodiment 4.

FIG. 16 is a block diagram illustrating one example of a functional configuration relating to behavior estimation by vehicle controller 7 according to this embodiment.

Vehicle controller 7 includes behavior learning unit 401, behavior estimation unit 402, and behavior estimation result receiver 403.

Behavior learning unit 401 builds a neural network for a specific driver (for example, driver x) from a driving history for driver x. Behavior learning unit 401 then outputs the built neural network as a behavior estimation NN to behavior estimation unit 402.

The driving history indicates a plurality of feature amounts (hereinafter collectively referred to as a feature amount set) for each behavior implemented by vehicle 1 in the past. Each feature amount corresponding to a behavior is, for example, an amount indicating a driving state of vehicle 1 at a point in time a first predetermined period of time before the point time when vehicle 1 implemented the corresponding behavior. For example, a feature amount indicates the number of passengers, the speed of vehicle 1, movement of the steering wheel, degree of application of the brake pedal, degree of application of the accelerator, etc. Moreover, the driving history may be the driving characteristics model illustrated in FIG. 55 according to Embodiment 7. In other words, a feature amount is, for example, a feature amount related to speed, a feature amount related to steering, a feature amount related to input timing, a feature amount related to vehicle external detection, or a feature amount related to vehicle internal detection. Moreover, these feature amounts are driving states of vehicle 1 detected by detector 6 described above.

Behavior estimation unit 402 inputs, into a behavior estimation NN built by behavior learning unit 401, a feature amount set obtained at the current point in time, as test data, to output a behavior estimation result on a behavior corresponding to the feature amount set. In other words, behavior estimation unit 402 estimates a behavior to be implemented after elapse of the first predetermined period of time described above.

Behavior estimation result receiver 403 receives the behavior estimation result output from behavior estimation unit 402. Behavior estimation result receiver 403 outputs the received behavior estimation result to information obtainer 91 described above. With this, the behavior estimation result is obtained by information obtainer 91.

Figure 17:
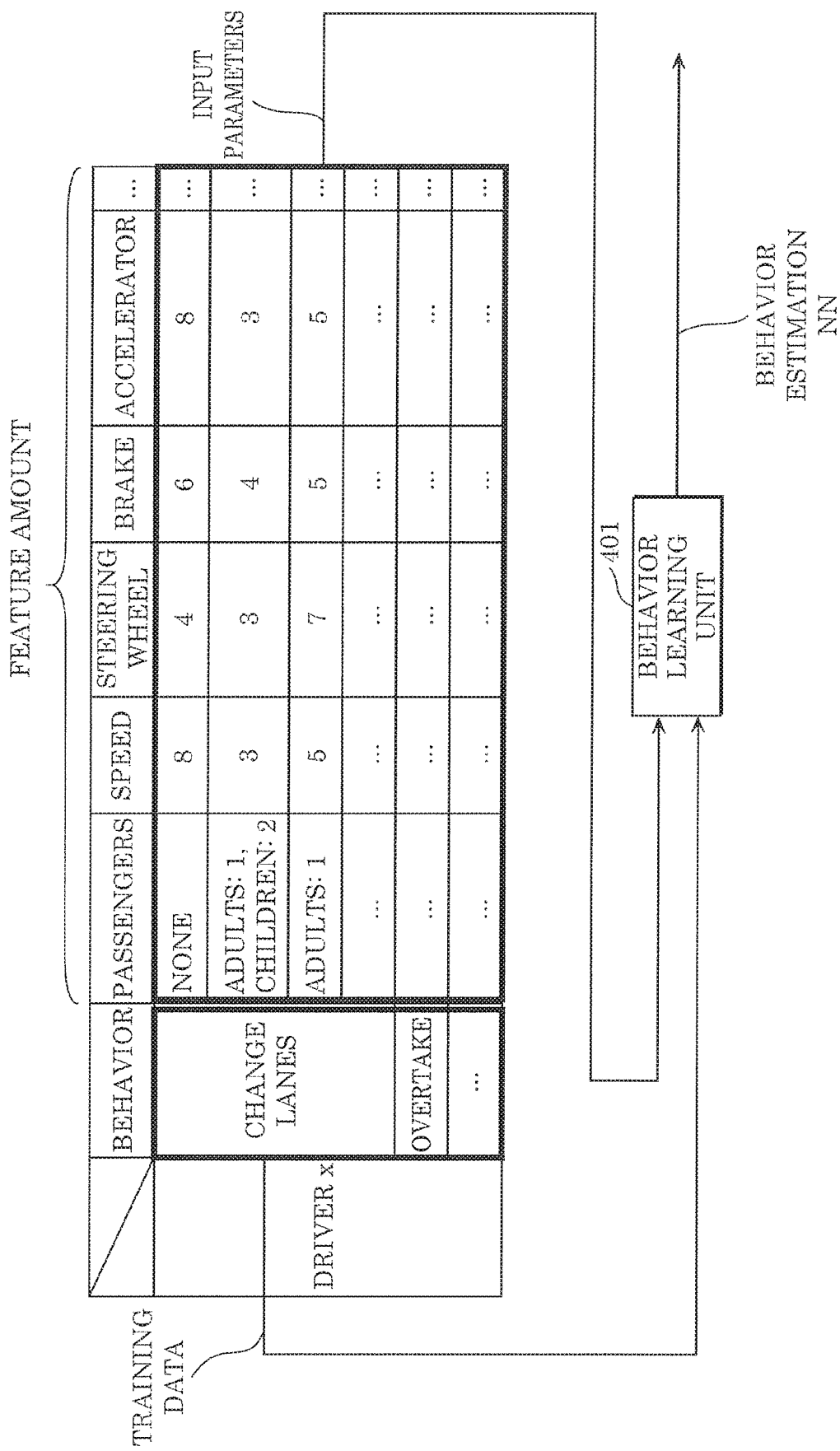
FIG. 17 is for illustrating how a behavior learning unit according to Embodiment 4 learns.

FIG. 17 is for illustrating how behavior learning unit 401 learns.

Behavior learning unit 401 obtains a feature amount set included in the driving history for a specific driver (for example, driver x) as input parameters. Behavior learning unit 401 also obtains behaviors associated with the feature amount set included in the driving history as training data. Then, behavior learning unit 401 adjusts the neural network based on the input parameters and the training data. In other words, behavior learning unit 401 inputs the input parameters into the neural network to obtain an output of training data, and adjusts, for example, the weighting in the neural network. With this adjusting, behavior learning unit 401 causes the neural network to learn the relationships between the input parameters and the training data, which builds the behavior estimation NN.

Figure 18A:
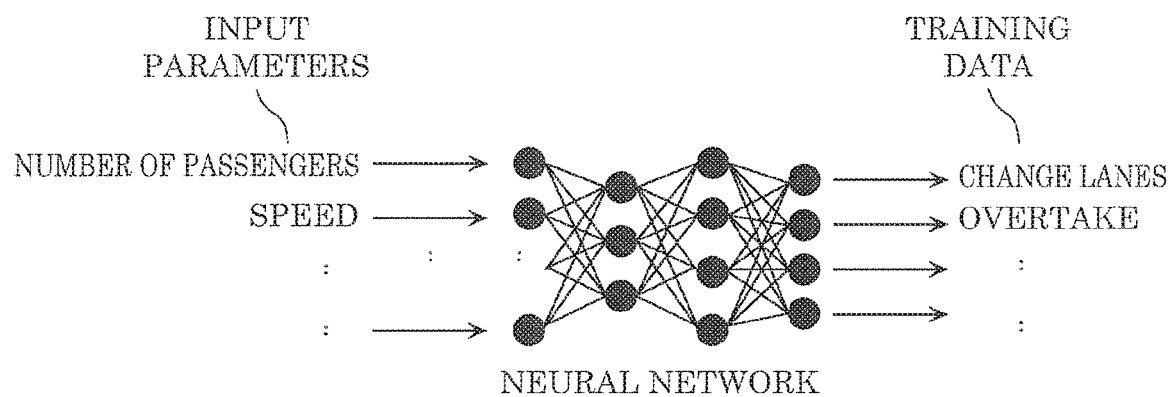
FIG. 18A is for illustrating how a neural network according to Embodiment 4 learns.

FIG. 18A illustrates how the neural network learns.

Behavior learning unit 401 inputs, into the neural network, a plurality of input parameters included in the driving history for driver x, the parameters including, for example, the number of passengers and speed. Then, behavior learning unit 401 optimizes the weighting in the neural network so as to match the output from the neural network and the training data associated with the input parameters. This builds the behavior estimation NN.

Figure 18B:
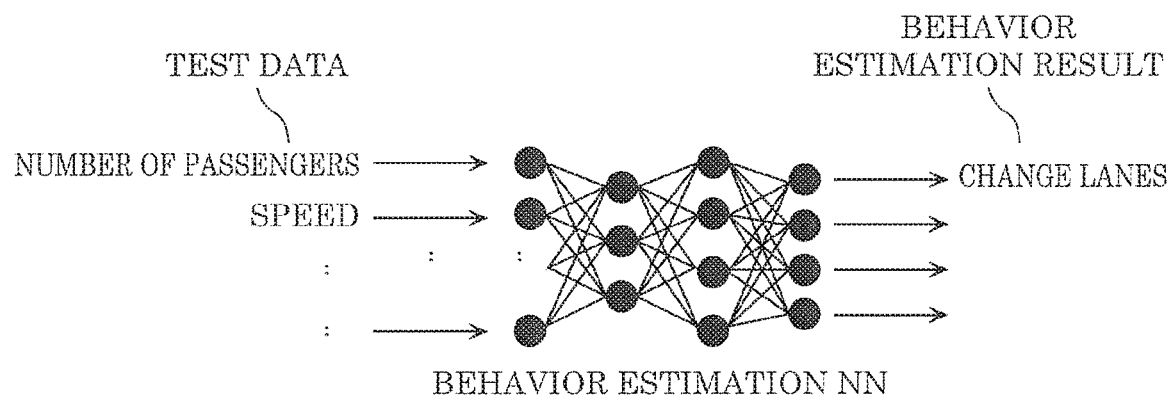
FIG. 18B illustrates behavior estimation using a behavior estimation NN according to Embodiment 4.

FIG. 18B illustrates behavior estimation using the behavior estimation NN.

Behavior estimation unit 402 obtains a feature amount set at the current time for driver x as test data, and inputs the test data into the behavior estimation NN. Note that the feature amounts included in the test data include, for example, the number of passengers and speed, and correspond to the feature amounts used as the input parameters. With this, behavior estimation unit 402 obtains, as an output from the behavior estimation NN, a behavior estimation result indicating, for example, "change lanes".

In this way in this embodiment, the information processing system is configured of information notification device 9 according to any one of the above Embodiments 1 through 3, behavior learning unit 401, and behavior estimation unit 402. In other words, the information processing system according to this embodiment includes information notification device 9 according to any one of the above Embodiments 1 through 3, behavior learning unit 401, and behavior estimation unit 402. Using the driving history, behavior learning unit 401 causes the neural network to learn relationships between the driving state of vehicle 1 detected by detector 6 and a behavior of vehicle 1 implemented after that driving state of vehicle 1. Behavior estimation unit 402 estimates a behavior of vehicle 1 by inputting, into the learned neural network, the current driving state of vehicle 1 detected by detector 6.

With this, the behavior of vehicle 1 can be appropriately estimated without the use of clustering or degree of similarity. Note that the information processing system according to this embodiment includes information notification device 9, but the information processing system can appropriately estimate the behavior of vehicle 1 even when information notification device 9 is not included.

Here, in the above example, the neural network is built solely from the driving history for a specific driver, but the neural network may be built using the driving history for another driver, that is to say, from the driving histories for a plurality of drivers.

Figure 19:
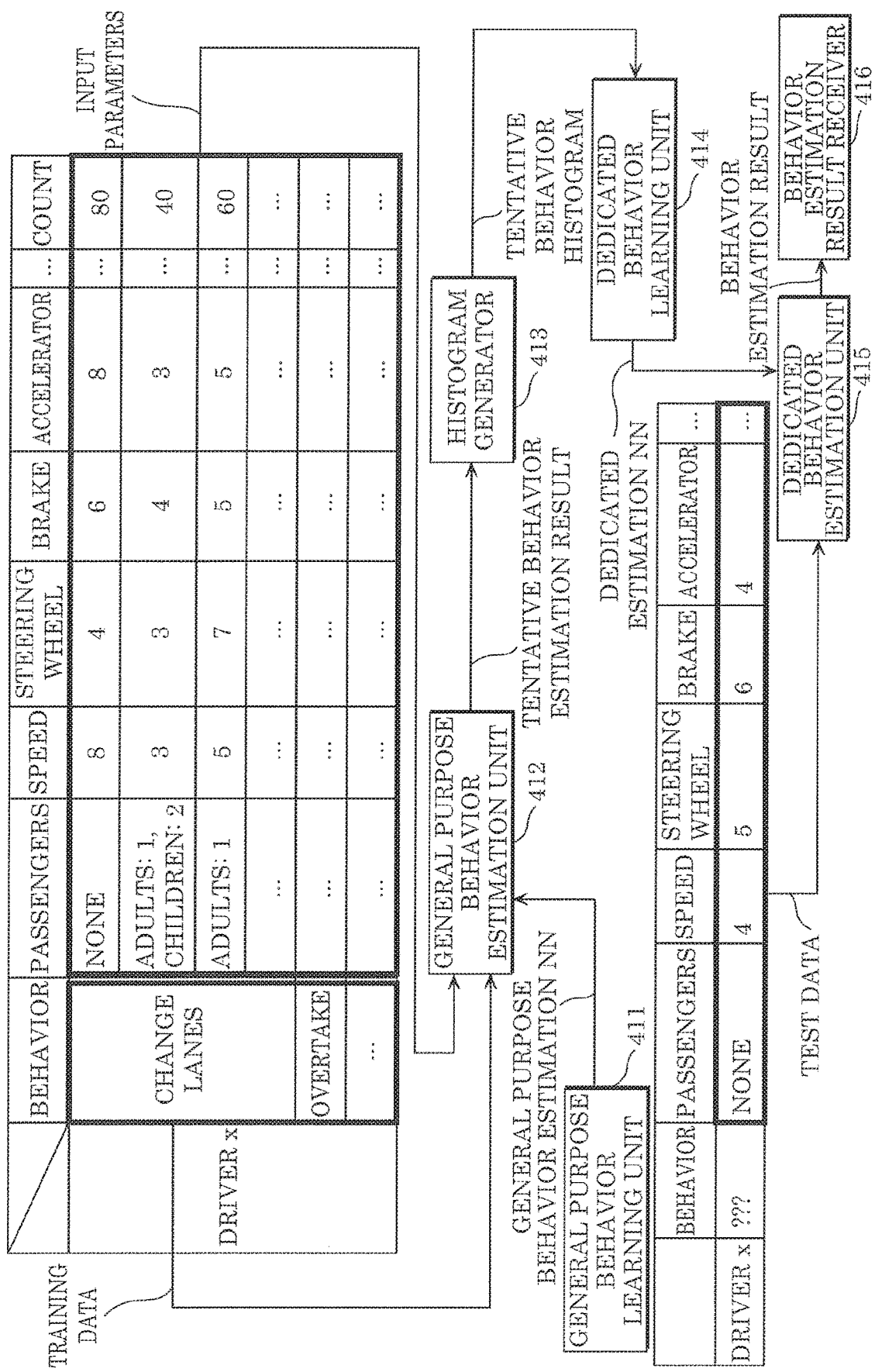
FIG. 19 is a block diagram illustrating one example of a functional configuration relating to behavior estimation by a vehicle controller according to Embodiment 4.

FIG. 19 is a block diagram illustrating another example of a functional configuration relating to behavior estimation by vehicle controller 7 according to this embodiment.

Vehicle controller 7 builds a neural network using driving histories for a plurality of drivers. This vehicle controller 7 includes general purpose behavior learning unit 411, general purpose behavior estimation unit 412, histogram generator 413, dedicated behavior learning unit 414, dedicated behavior estimation unit 415, and behavior estimation result receiver 416. With such a vehicle controller 7, first, a general purpose neural network is built as a general purpose behavior estimation NN using driving histories for a plurality of drivers. Then, vehicle controller 7 builds a dedicated behavior estimation NN by transfer learning that causes the general purpose behavior estimation NN to relearn using the driving history for a specific driver (for example, driver x). Vehicle controller 7 estimates the behavior of vehicle 1 using this dedicated behavior estimation NN.

General purpose behavior learning unit 411 builds a general purpose neural network as a general purpose behavior estimation NN from the driving histories for a plurality of drivers. General purpose behavior learning unit 411 then outputs the built general purpose behavior estimation NN to general purpose behavior estimation unit 412.

General purpose behavior estimation unit 412 obtains behaviors included in the driving history for the specific driver (for example, driver x) as training data. General purpose behavior estimation unit 412 further obtains, as input parameters, a feature amount set associated with the behaviors included in the driving history. General purpose behavior estimation unit 412 inputs the input parameters to general purpose behavior estimation NN and outputs the output from the general purpose behavior estimation NN to histogram generator 413 as a tentative behavior estimation result. General purpose behavior estimation unit 412 also outputs the training data to histogram generator 413.

Histogram generator 413 obtains behaviors included in the training data and the tentative behavior estimation result corresponding to the behaviors, and generates a tentative behavior histogram indicating a cumulative value of the tentative behavior estimation result corresponding to the behaviors included in the training data.

Based on the tentative behavior histogram, dedicated behavior learning unit 414 relearns the weighting in the general purpose behavior estimation NN so as to increase the degree of coincidence between the general purpose behavior estimation NN output and the training data to build the dedicated behavior estimation NN.

Dedicated behavior estimation unit 415 inputs, into the dedicated behavior estimation NN built by dedicated behavior learning unit 414, a feature amount set obtained at the current point in time for a specific driver (for example, driver x), as test data. As a result, dedicated behavior estimation unit 415 obtains behaviors output by the dedicated behavior estimation NN that correspond to the feature amount set, and outputs the behaviors as a behavior estimation result. In other words, for example, dedicated behavior estimation unit 415 estimates a behavior to be implemented after elapse of the first predetermined period of time described above.

Behavior estimation result receiver 416 receives the behavior estimation result output from dedicated behavior estimation unit 415. Behavior estimation result receiver 416 outputs the received behavior estimation result to information obtainer 91 described above. With this, the behavior estimation result is obtained by information obtainer 91.

Figure 20:
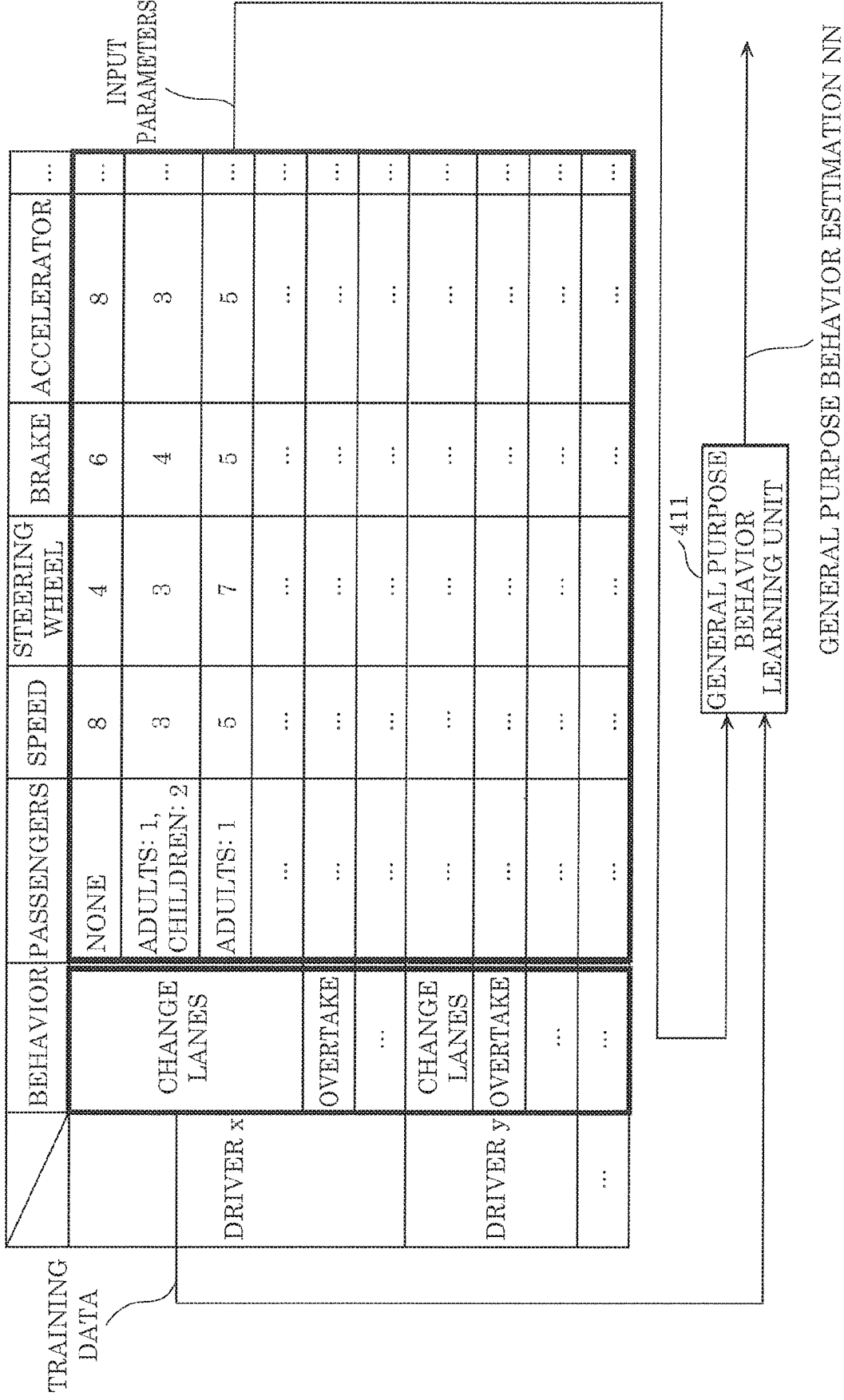
FIG. 20 is for illustrating how a general purpose behavior learning unit according to Embodiment 4 learns.

FIG. 20 is for illustrating how general purpose behavior learning unit 411 learns.

General purpose behavior learning unit 411 obtains a feature amount set included in the driving histories for a plurality of driver as input parameters. General purpose behavior learning unit 411 also obtains behaviors associated with the feature amount set included in the driving histories as training data. Then, general purpose behavior learning unit 411 adjusts the neural network based on the input parameters and the training data. In other words, general purpose behavior learning unit 411 inputs the input parameters into the neural network to obtain an output of training data, and adjusts, for example, the weighting in the neural network. With this adjusting, general purpose behavior learning unit 411 causes the neural network to learn the relationships between the input parameters and the training data.

Figure 21A:
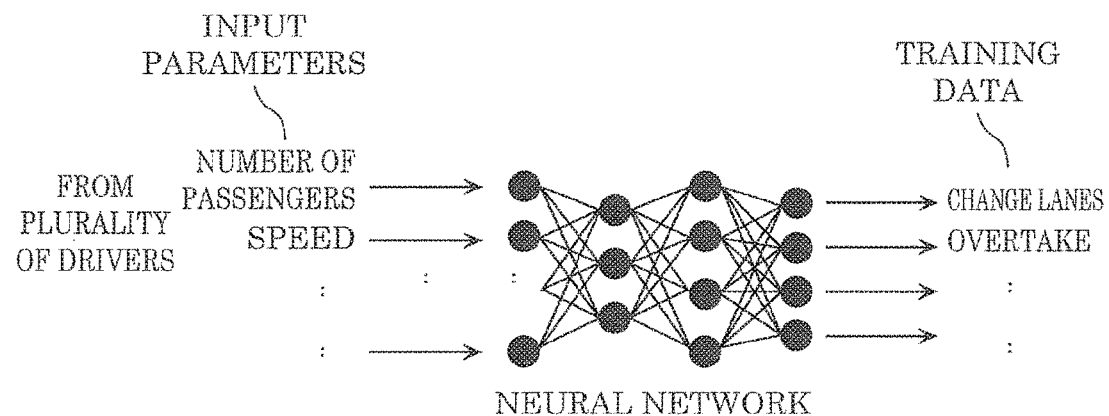
FIG. 21A is for illustrating how a neural network in a general purpose behavior learning unit according to Embodiment 4 learns.

FIG. 21A is for illustrating how the neural network in general purpose behavior learning unit 411 learns.

General purpose behavior learning unit 411 inputs, into the neural network, a plurality of input parameters included in the driving history for a given number of drivers, the parameters including, for example, the number of passengers and speed. Then, general purpose behavior learning unit 411 optimizes the weighting in the neural network so as to match the output from the neural network with the training data associated with the input parameters. This optimization may be performed based on the driving history for one driver and may also be performed based on driving histories for a plurality of drivers. This builds the general purpose behavior estimation NN.

Figure 21B:
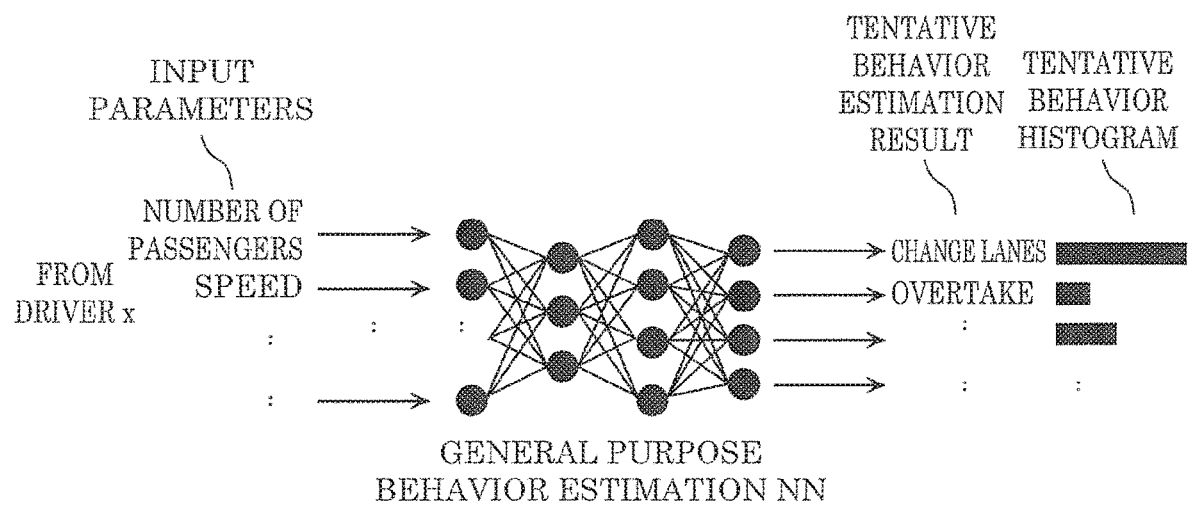
FIG. 21B illustrates behavior estimation using a general purpose behavior estimation NN according to Embodiment 4.

FIG. 21B illustrates behavior estimation using the general purpose behavior estimation NN.

General purpose behavior estimation unit 412 estimates a tentative behavior using the general purpose behavior estimation NN built by general purpose behavior learning unit 411. In other words, general purpose behavior estimation unit 412 obtains, as training data, a specific behavior (for example, "change lanes") included in the driving history for a specific driver (for example, driver x), and obtains, as input parameters, a feature amount set associated with that behavior. When there is a plurality of feature amount sets associated with the specific behavior in the driving history, general purpose behavior estimation unit 412 obtains, as input parameters, the plurality of feature amount sets.

General purpose behavior estimation unit 412 then inputs the input parameters into general purpose behavior estimation NN in sequence. With this, general purpose behavior estimation unit 412 obtains, as tentative behavior estimation results for the training data, which is the specific behavior (for example "change lanes"), mutually different estimation results including "overtake" in addition to "change lanes".

Histogram generator 413 generates a histogram of the tentative behavior estimation result (tentative behavior histogram) for the training data, which is the specific behavior (for example, "change lanes"). This tentative behavior histogram indicates a cumulative value of the tentative behavior estimation result obtained as the output from the general purpose behavior estimation NN.

Figure 22:
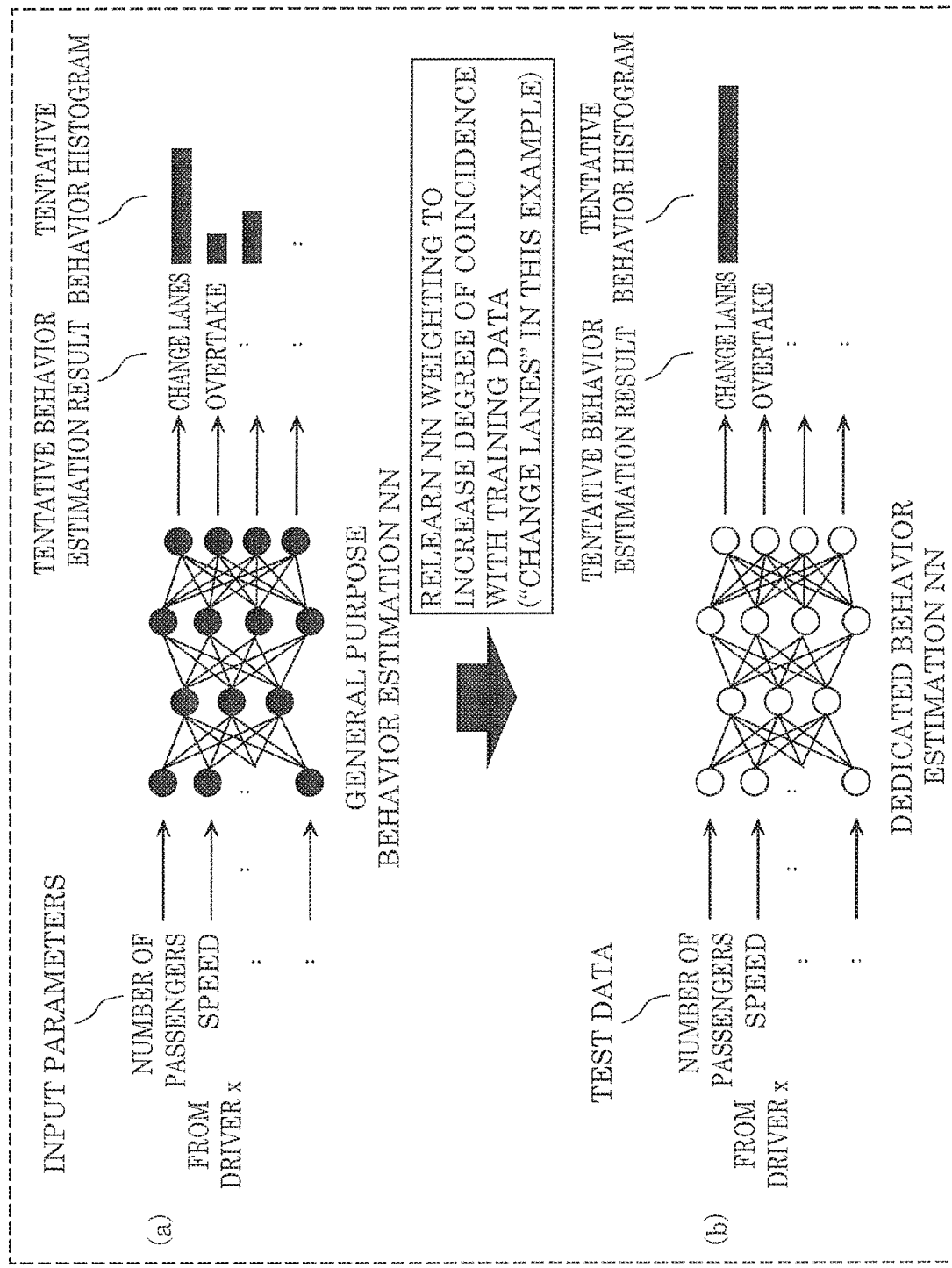
FIG. 22 illustrates a method used to build a dedicated behavior estimation NN according to Embodiment 4.

FIG. 22 illustrates a method used to build the dedicated behavior estimation NN.

After the tentative behavior histogram illustrated in (a) in FIG. 22 is generated, dedicated behavior learning unit 414 relearns the weighting in the general purpose behavior estimation NN so as to increase the degree of coincidence between the general purpose behavior estimation NN output and the training data (for example, "change lanes"). With this, as illustrated in (b) in FIG. 22, dedicated behavior learning unit 414 builds a dedicated behavior estimation NN whose output is an estimation result for only a behavior in the training data (for example, "change lanes"). This relearning can be performed for a single unit of training data, and can also be performed for a plurality of units of training data. In other words, dedicated behavior learning unit 414 builds a dedicated neural network for a specific driver by transfer learning.

Figure 23:
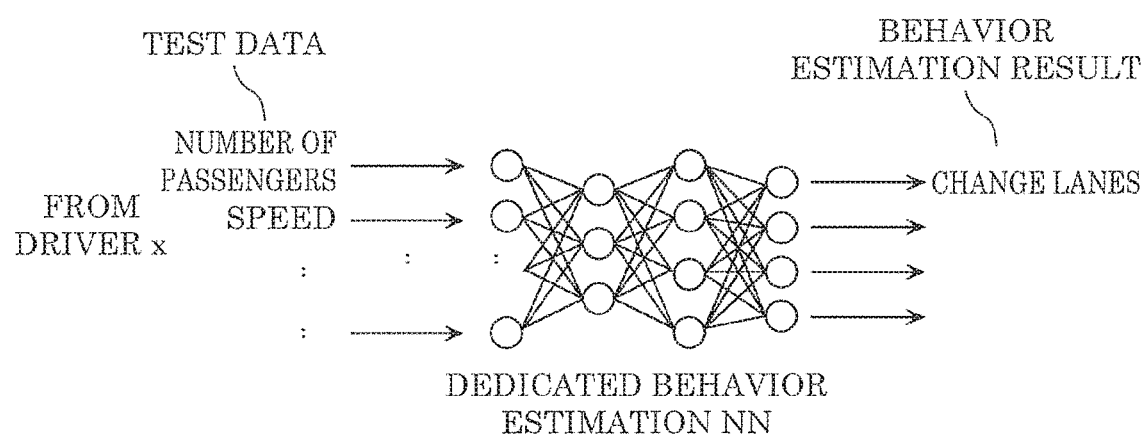
FIG. 23 illustrates behavior estimation using a dedicated behavior estimation NN according to Embodiment 4.

FIG. 23 illustrates behavior estimation using the dedicated behavior estimation NN.

Dedicated behavior estimation unit 415 obtains a feature amount set at the current time for driver x as test data, and inputs the test data into the dedicated behavior estimation NN. Note that the feature amounts included in the test data include, for example, the number of passengers and speed, and correspond to the feature amounts used as the input parameters. With this, dedicated behavior estimation unit 415 obtains, as an output from the dedicated behavior estimation NN, a behavior estimation result indicating, for example, "change lanes".

In this way, the information processing system according to this embodiment includes general purpose behavior learning unit 411, dedicated behavior learning unit 414, general purpose behavior estimation unit 412, dedicated behavior estimation unit 415, and histogram generator 413. For each of a plurality of drivers, general purpose behavior learning unit 411 causes the neural network to learn relationships between the driving state of vehicle 1 detected by detector 6 and a behavior of vehicle 1 implemented after that driving state of vehicle 1. General purpose behavior estimation unit 412 estimates a tentative behavior of vehicle 1 for a specific driver by inputting, into the neural network that was caused to learn by general purpose behavior learning unit 411, the driving state of vehicle 1 detected by detector 6 for the specific driver. Histogram generator 413 generates a histogram of an estimate result of the tentative behavior estimated by the general purpose behavior estimation unit 412. Dedicated behavior learning unit 414 builds a dedicated neural network for the specific driver by transfer learning which causes the learned neural network to relearn using the driving state of vehicle 1 detected by detector 6 for the specific driver and a behavior of vehicle 1 implemented after the driving state of vehicle 1. Here, dedicated behavior learning unit 414 builds the dedicated neural network by transfer learning which includes referring to the generated histogram. Dedicated behavior estimation unit 415 estimates a behavior of vehicle 1 for the specific driver using this dedicated neural network.

With this, even when there are few behaviors included in the driving history for a specific driver and few feature amount sets, since the driving histories for a plurality of drivers are used, it is possible to appropriately estimate a behavior of vehicle 1 for the specific driver.

(Variation 1)

Here, in the above example, the neural network is built using a driving history. In this variation, the neural network is built using the driving environment history illustrated in FIG. 60 and FIG. 61 according to Embodiment 7.

Figure 24:
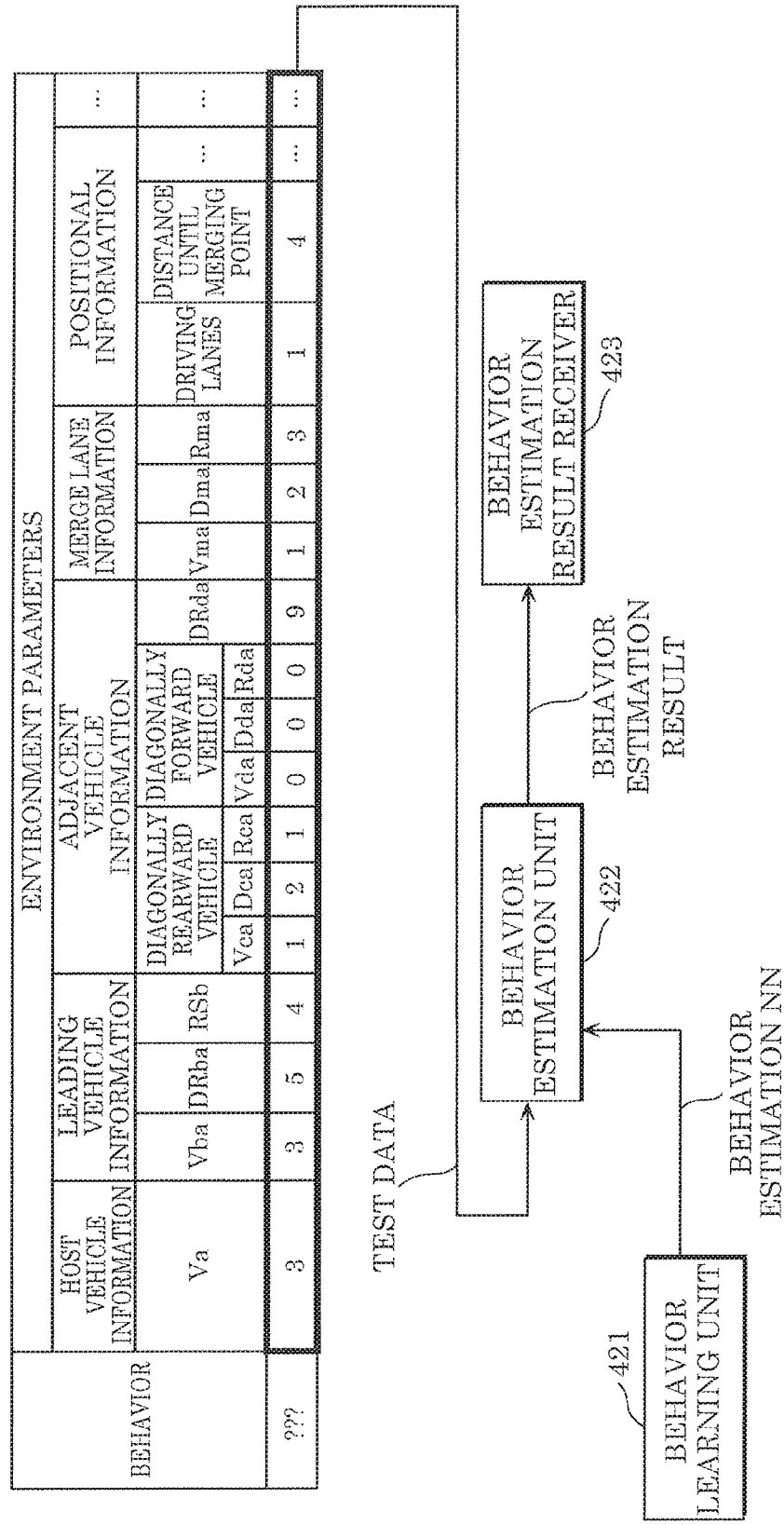
FIG. 24 is a block diagram illustrating one example of a functional configuration relating to behavior estimation by a vehicle controller according to Variation 1 of Embodiment 4.

FIG. 24 is a block diagram illustrating one example of a functional configuration relating to behavior estimation by vehicle controller 7 according to this variation.

Vehicle controller 7 includes behavior learning unit 421, behavior estimation unit 422, and behavior estimation result receiver 423.

Behavior learning unit 421 builds a neural network for a specific driver (for example, driver x) from a driving environment history for driver x. Behavior learning unit 421 then outputs the built neural network as a behavior estimation NN to behavior estimation unit 422.

The driving environment history indicates a plurality of environment parameters (hereinafter collectively referred to as an environment parameter set) for each behavior implemented by vehicle 1 in the past. Each environment parameter corresponding to a behavior is, for example, a parameter indicating the environment (surroundings) of vehicle 1 at a point in time a first predetermined period of time before the point time when vehicle 1 implemented the corresponding behavior. Examples of environment parameters include speed Va, which is the speed of the host vehicle, relative speed Vba, which is the speed of a leading vehicle relative to the host vehicle, and inter-vehicle distance DRba, which is the distance between the leading vehicle and the host vehicle. Moreover, these environment parameters are surroundings of vehicle 1 detected by detector 6 described above.

Behavior estimation unit 422 inputs, into a behavior estimation NN built by behavior learning unit 421, an environment parameter set obtained at the current point in time, as test data, to output a behavior estimation result on a behavior corresponding to the environment parameter set. In other words, behavior estimation unit 422, for example, estimates a behavior to be implemented after elapse of the first predetermined period of time described above.

Behavior estimation result receiver 423 receives the behavior estimation result output from behavior estimation unit 422. Behavior estimation result receiver 423 outputs the received behavior estimation result to information obtainer 91 described above. With this, the behavior estimation result is obtained by information obtainer 91.

Figure 25:
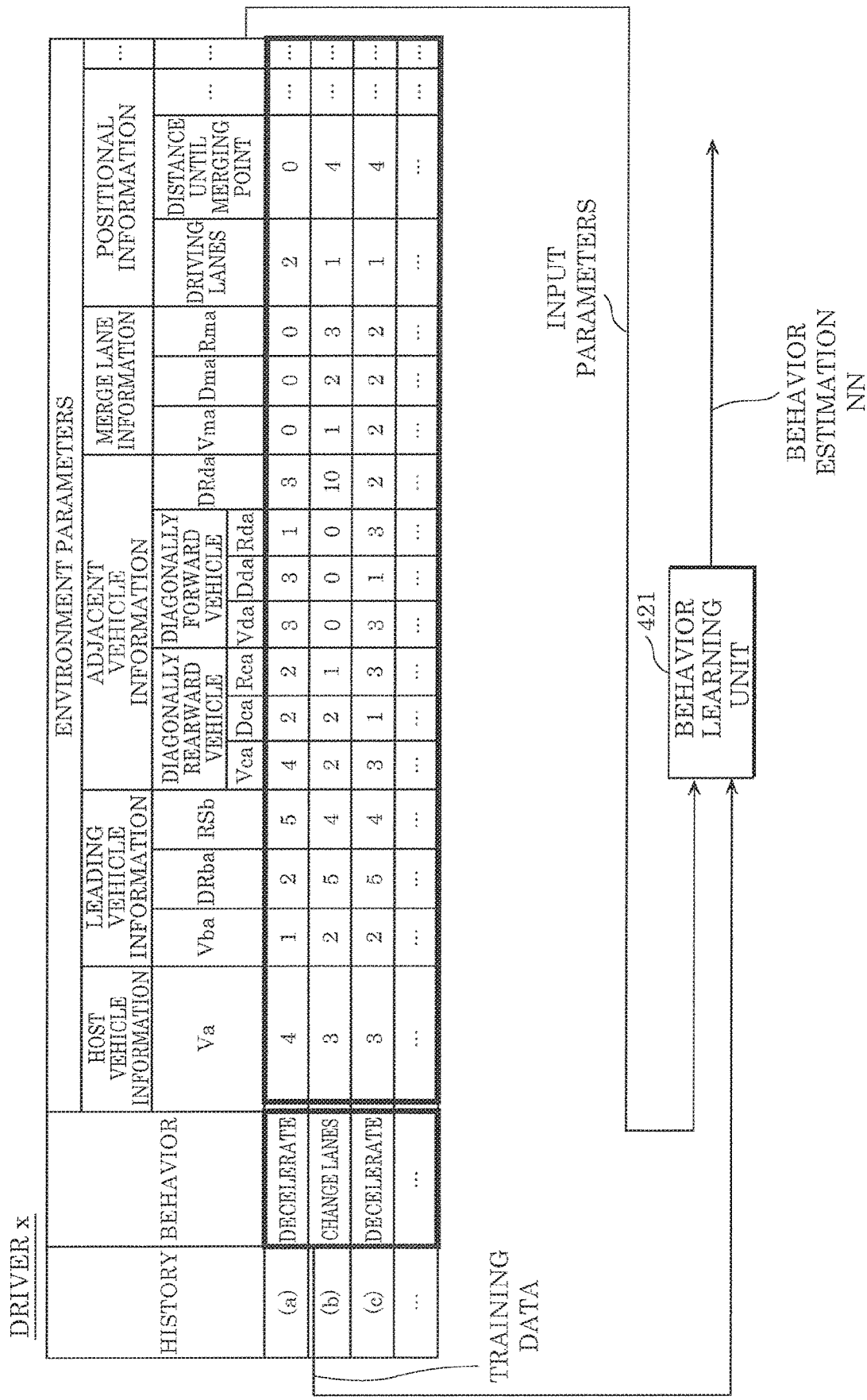
FIG. 25 is for illustrating how a behavior learning unit according to Variation 1 of Embodiment 4 learns.

FIG. 25 is for illustrating how behavior learning unit 421 learns.

Behavior learning unit 421 obtains an environment parameter set included in the driving environment history for a specific driver (for example, driver x) as input parameters. Behavior learning unit 421 also obtains behaviors associated with the environment parameter set included in the driving environment history as training data. Then, behavior learning unit 421 adjusts the neural network based on the input parameters and the training data. In other words, behavior learning unit 421 inputs the input parameters into the neural network to obtain an output of training data, and adjusts, for example, the weighting in the neural network. With this adjusting, behavior learning unit 421 causes the neural network to learn the relationships between the input parameters and the training data, which builds the behavior estimation NN.

Figure 26A:
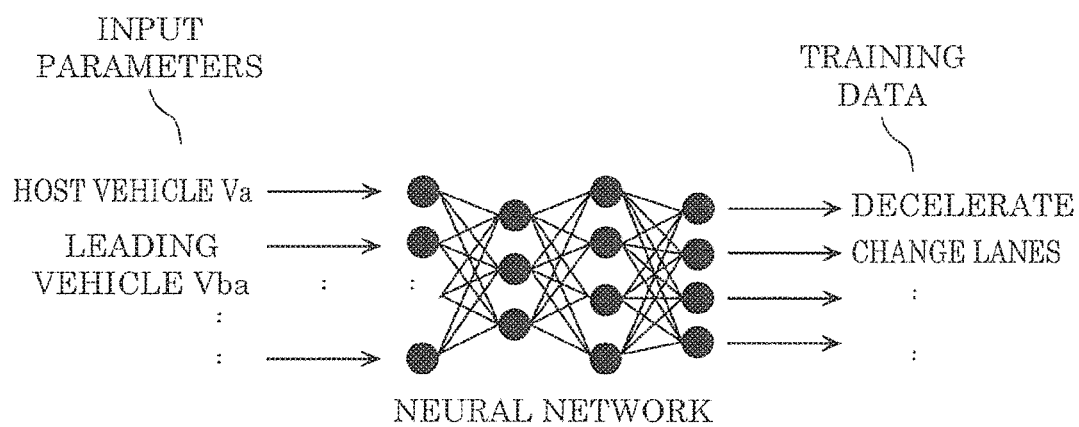
FIG. 26A is for illustrating how a neural network according to Variation 1 of Embodiment 4 learns.

FIG. 26A illustrates how the neural network learns.

Behavior learning unit 421 inputs, into the neural network, a plurality of input parameters included in the driving environment history for driver x, the parameters including, for example, speed Va of the host vehicle and relative speed Vba of the leading vehicle. Then, behavior learning unit 421 optimizes the weighting in the neural network so as to match the output from the neural network and the training data associated with the input parameters. This builds the behavior estimation NN.

Figure 26B:
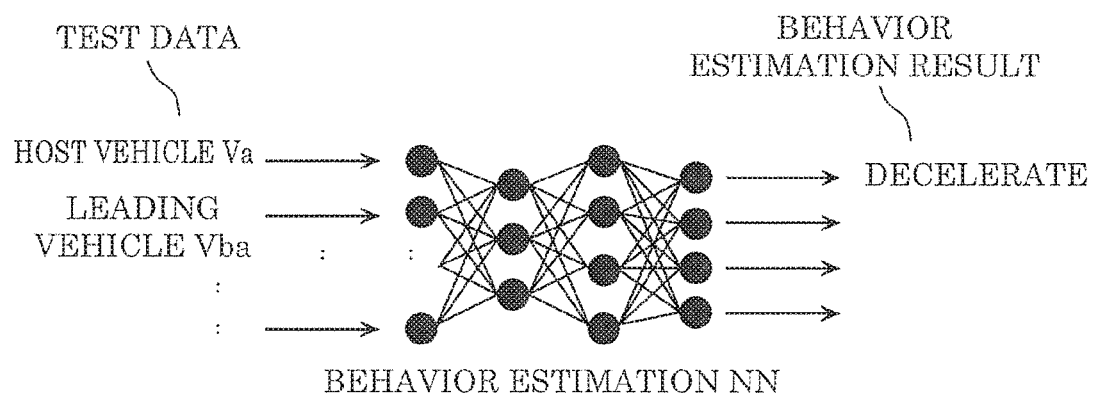
FIG. 26B illustrates behavior estimation using a behavior estimation NN according to Variation 1 of Embodiment 4.

FIG. 26B illustrates behavior estimation using the behavior estimation NN.

Behavior estimation unit 422 obtains an environment parameter set at the current time for driver x as test data, and inputs the test data into the behavior estimation NN. Note that the environment parameters included in the test data are, for example, speed Va of the host vehicle and relative speed Vba of the leading vehicle, and correspond to the environment parameters used as the input parameters. With this, behavior estimation unit 422 obtains, as an output from the behavior estimation NN, a behavior estimation result indicating, for example, "decelerate".

In this way, in this variation, the information processing system is configured of information notification device 9 according to any one of the above Embodiments 1 through 3, behavior learning unit 421, and behavior estimation unit 422. In other words, the information processing system according to this embodiment includes information notification device 9 according to any one of the above Embodiments 1 through 3, behavior learning unit 421, and behavior estimation unit 422. Using the driving environment history, behavior learning unit 421 causes the neural network to learn relationships between the surroundings of vehicle 1 detected by detector 6 and a behavior of vehicle 1 implemented after the surroundings of vehicle 1 were detected. Behavior estimation unit 422 estimates a behavior of vehicle 1 by inputting, into the learned neural network, the current driving state of vehicle 1 detected by detector 6.

With this, the behavior of vehicle 1 can be appropriately estimated without the use of clustering or degree of similarity. Note that the information processing system according to this variation includes information notification device 9, but the information processing system can appropriately estimate the behavior of vehicle 1 even when information notification device 9 is not included.

Here, in the above example, the neural network is built solely from the driving environment history for a specific driver, but the neural network may be built using the driving environment history for another driver, that is to say, from the driving environment histories for a plurality of drivers.

Figure 27:
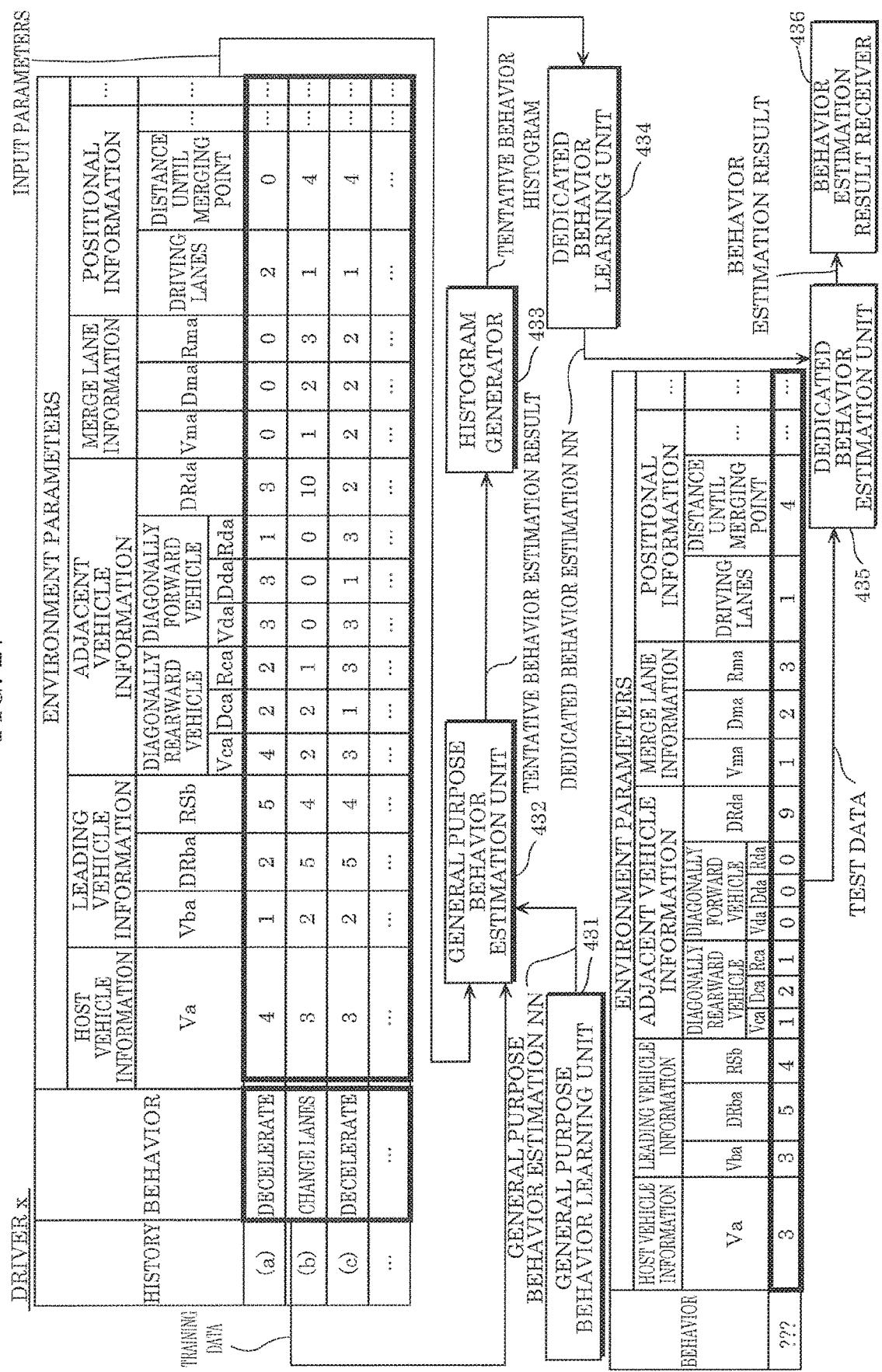
FIG. 27 is a block diagram illustrating one example of a functional configuration relating to behavior estimation by a vehicle controller according to Variation 1 of Embodiment 4.

FIG. 27 is a block diagram illustrating another example of a functional configuration relating to behavior estimation by vehicle controller 7 according to this embodiment.

Vehicle controller 7 builds a neural network using driving environment histories for a plurality of drivers. This vehicle controller 7 includes general purpose behavior learning unit 431, general purpose behavior estimation unit 432, histogram generator 433, dedicated behavior learning unit 434, dedicated behavior estimation unit 435, and behavior estimation result receiver 436. With such a vehicle controller 7, first, a general purpose neural network is built as a general purpose behavior estimation NN using driving environment histories for a plurality of drivers. Then, vehicle controller 7 builds a dedicated behavior estimation NN by transfer learning that causes the general purpose behavior estimation NN to relearn using the driving environment history for a specific driver (for example, driver x). Vehicle controller 7 estimates the behavior of vehicle 1 using this dedicated behavior estimation NN.

General purpose behavior learning unit 431 builds a general purpose neural network as a general purpose behavior estimation NN from the driving environment histories for a plurality of drivers. General purpose behavior learning unit 431 then outputs the built general purpose behavior estimation NN to general purpose behavior estimation unit 432.

General purpose behavior estimation unit 432 obtains behaviors included in the driving environment history for the specific driver (for example, driver x) as training data. General purpose behavior estimation unit 432 further obtains, as input parameters, an environment parameter set associated with the behaviors included in the driving environment history. General purpose behavior estimation unit 432 inputs the input parameters to general purpose behavior estimation NN and outputs the output from the general purpose behavior estimation NN to histogram generator 433 as a tentative behavior estimation result. General purpose behavior estimation unit 432 also outputs the training data to histogram generator 433.

Histogram generator 433 obtains behaviors included in the training data and the tentative behavior estimation result corresponding to the behaviors, and generates a tentative behavior histogram indicating a cumulative value of the tentative behavior estimation result corresponding to the behaviors included in the training data.

Based on the tentative behavior histogram, dedicated behavior learning unit 434 relearns the weighting in the general purpose behavior estimation NN so as to increase the degree of coincidence between the general purpose behavior estimation NN output and the training data to build the dedicated behavior estimation NN.

Dedicated behavior estimation unit 435 inputs, into the dedicated behavior estimation NN built by dedicated behavior learning unit 434, an environment parameter set obtained at the current point in time for a specific driver (for example, driver x), as test data. As a result, dedicated behavior estimation unit 435 obtains behaviors output by the dedicated behavior estimation NN that correspond to the environment parameter set, and outputs the behaviors as a behavior estimation result. In other words, for example, dedicated behavior estimation unit 435 estimates a behavior to be implemented after elapse of the first predetermined period of time described above.

Behavior estimation result receiver 436 receives the behavior estimation result output from dedicated behavior estimation unit 435. Behavior estimation result receiver 436 outputs the received behavior estimation result to information obtainer 91 described above. With this, the behavior estimation result is obtained by information obtainer 91.

Figure 28:
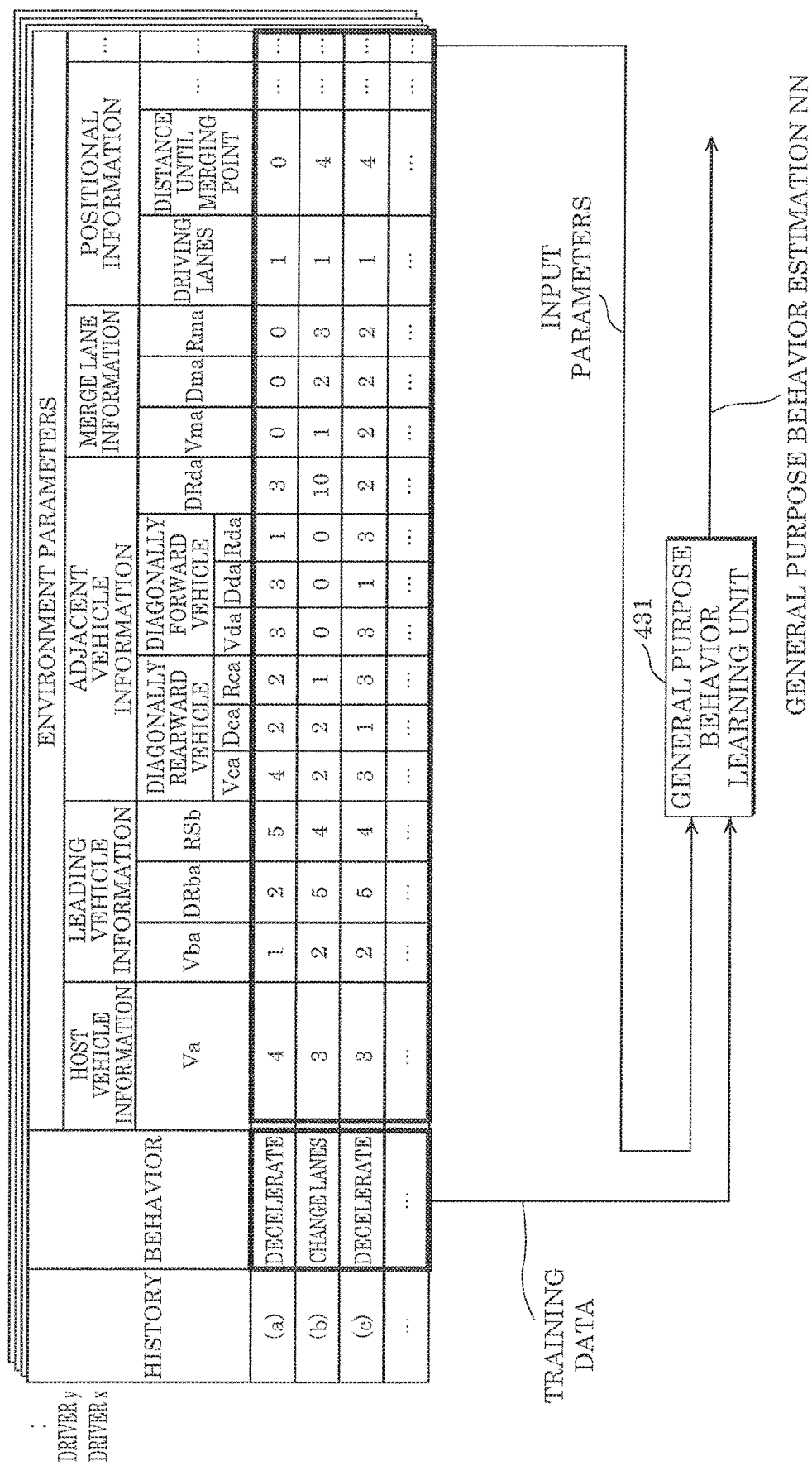
FIG. 28 is for illustrating how a general purpose behavior learning unit according to Variation 1 of Embodiment 4 learns.

FIG. 28 is for illustrating how general purpose behavior learning unit 431 learns.

General purpose behavior learning unit 431 obtains an environment parameter set included in the driving environment history for a plurality of drivers as input parameters. General purpose behavior learning unit 431 also obtains behaviors associated with the environment parameter set included in the driving environment history as training data. Then, general purpose behavior learning unit 431 adjusts the neural network based on the input parameters and the training data. In other words, general purpose behavior learning unit 431 inputs the input parameters into the neural network to obtain an output of training data, and adjusts, for example, the weighting in the neural network. With this adjusting, general purpose behavior learning unit 431 causes the neural network to learn the relationships between the input parameters and the training data.

Figure 29A:
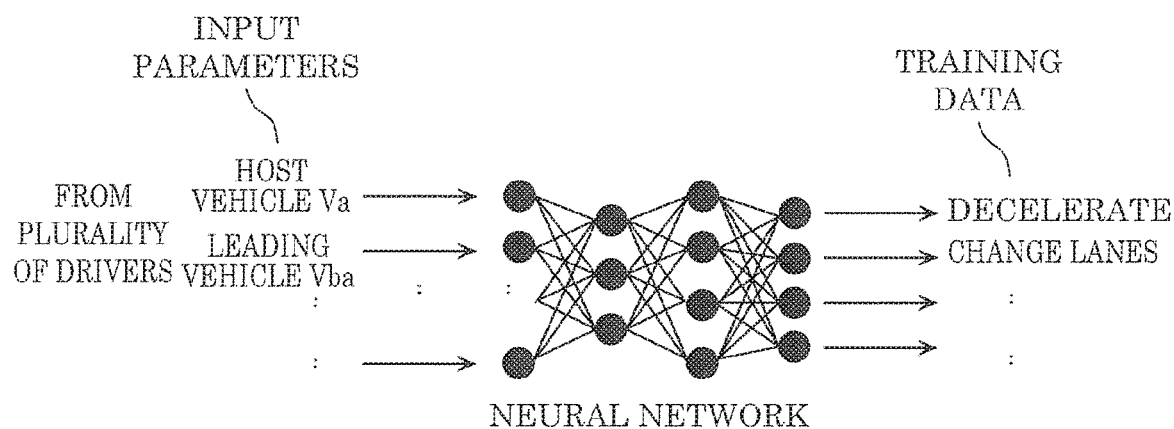
FIG. 29A is for illustrating how a neural network in a general purpose behavior learning unit according to Variation 1 of Embodiment 4 learns.

FIG. 29A is for illustrating how the neural network in general purpose behavior learning unit 431 learns.

General purpose behavior learning unit 431 inputs, into the neural network, a plurality of input parameters included in the driving environment history for a given number of drivers, the parameters including, for example, speed Va of the host vehicles and relative speed Vba of the leading vehicles. Then, general purpose behavior learning unit 431 optimizes the weighting in the neural network so as to match the output from the neural network with the training data associated with the input parameters. This optimization may be performed based on the driving environment history for one driver and may also be performed based on driving environment histories for a plurality of drivers. This builds the general purpose behavior estimation NN.

Figure 29B:
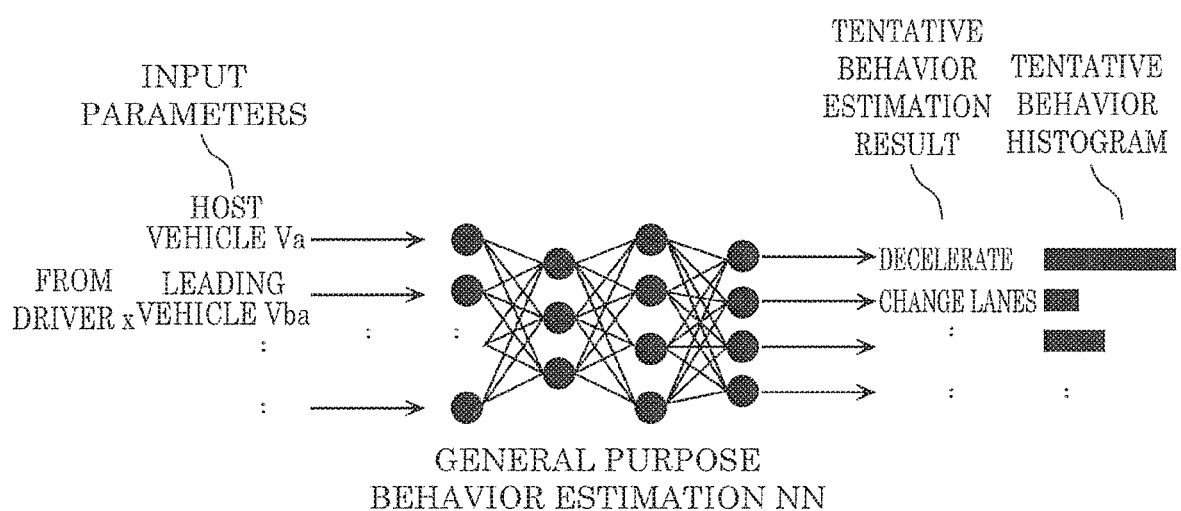
FIG. 29B illustrates behavior estimation using a general purpose behavior estimation NN according to Variation 1 of Embodiment 4.

FIG. 29B illustrates behavior estimation using the general purpose behavior estimation NN.

General purpose behavior estimation unit 432 estimates a tentative behavior using the general purpose behavior estimation NN built by general purpose behavior learning unit 431. In other words, general purpose behavior estimation unit 432 obtains a specific behavior (for example, "decelerate") included in the driving environment history for the specific driver (for example, driver x) as training data, and obtains an environment parameter set associated with that behavior as input parameters. When there is a plurality of environment parameter sets associated with the specific behavior in the driving environment history, general purpose behavior estimation unit 412 obtains, as input parameters, the plurality of environment parameter sets.

General purpose behavior estimation unit 432 then inputs the input parameters into general purpose behavior estimation NN in sequence. With this, general purpose behavior estimation unit 432 obtains, as tentative behavior estimation results for the training data, which is the specific behavior (for example "decelerate"), mutually different estimation results including, for example, "change lanes" in addition to "decelerate".

Histogram generator 433 generates a histogram of the tentative behavior estimation result (tentative behavior histogram) for the training data, which is the specific behavior (for example, "decelerate"). This tentative behavior histogram indicates a cumulative value of the tentative behavior estimation result obtained as the output from the general purpose behavior estimation NN.

Figure 30:
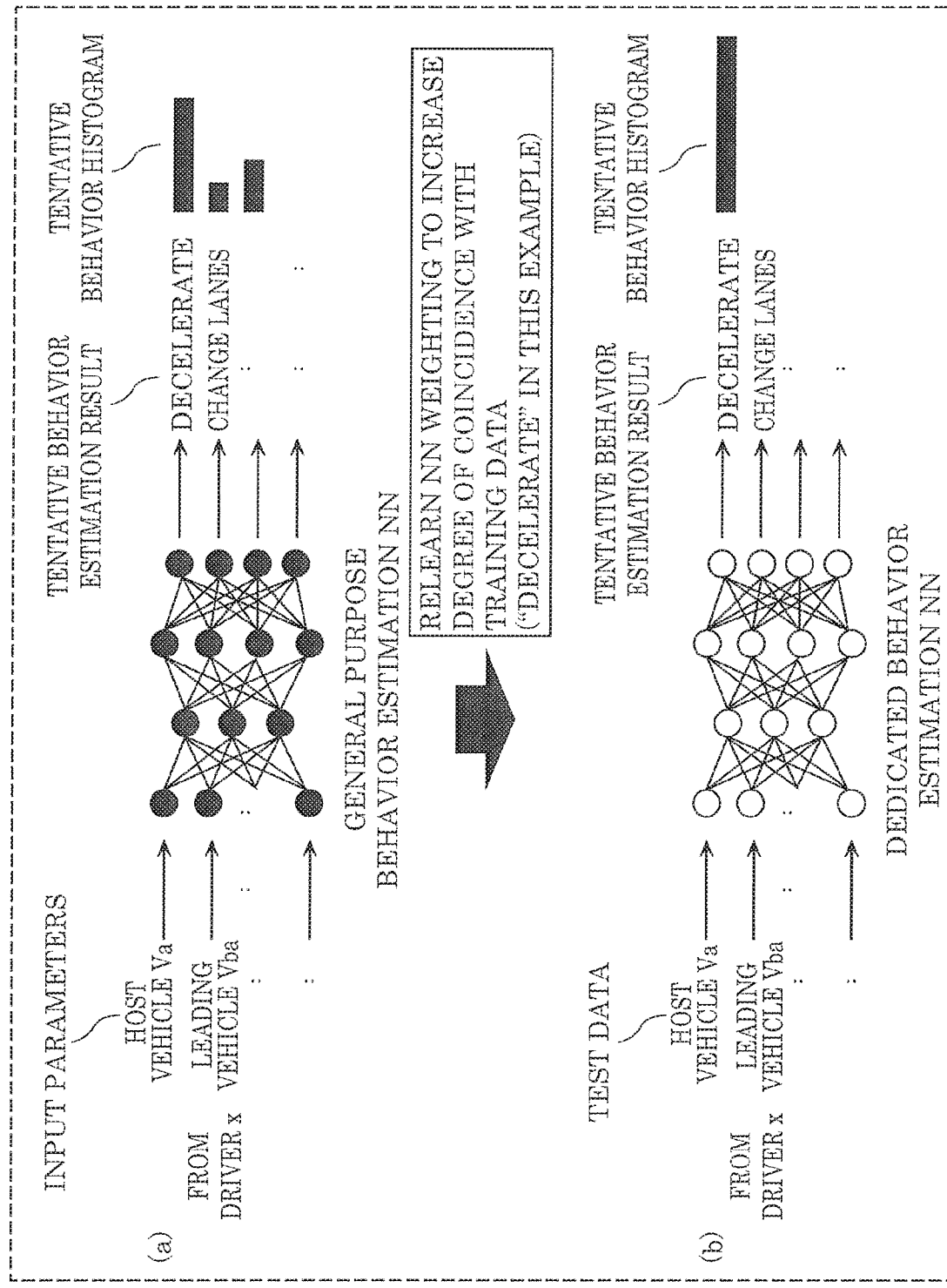
FIG. 30 illustrates a method used to build a dedicated behavior estimation NN according to Variation 1 of Embodiment 4.

FIG. 30 illustrates a method used to build the dedicated behavior estimation NN.

After the tentative behavior histogram illustrated in (a) in FIG. 30 is generated, dedicated behavior learning unit 434 relearns the weighting in the general purpose behavior estimation NN so as to increase the degree of coincidence between the general purpose behavior estimation NN output and the training data (for example, "decelerate"). With this, as illustrated in (b) in FIG. 30, dedicated behavior learning unit 434 builds a dedicated behavior estimation NN whose output is an estimation result for only a behavior in the training data (for example, "decelerate"). This relearning can be performed for a single unit of training data, and can also be performed for a plurality of units of training data. In other words, dedicated behavior learning unit 434 builds a dedicated neural network for a specific driver by transfer learning.

Figure 31:
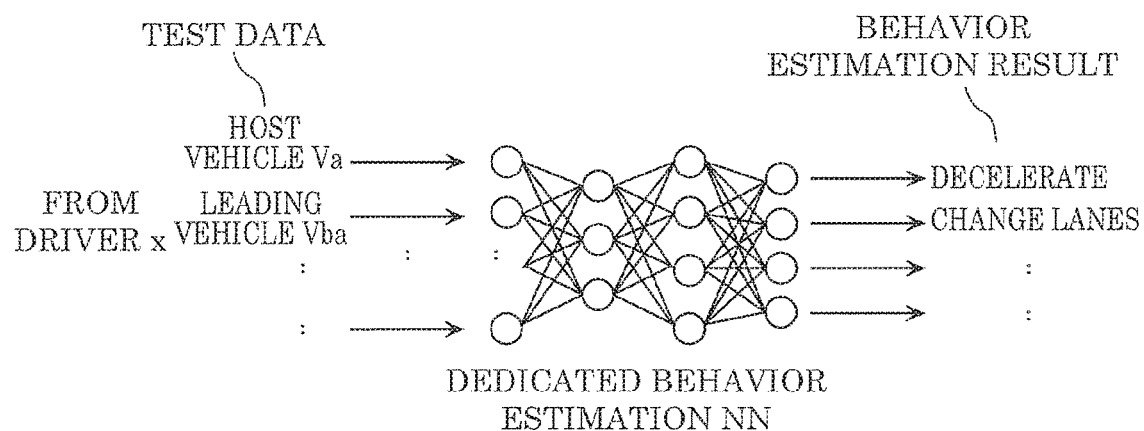
FIG. 31 illustrates behavior estimation using a dedicated behavior estimation NN according to Variation 1 of Embodiment 4.

FIG. 31 illustrates behavior estimation using the dedicated behavior estimation NN.

Dedicated behavior estimation unit 435 obtains an environment parameter set at the current time for driver x as test data, and inputs the test data into the dedicated behavior estimation NN. Note that the environment parameters included in the test data are, for example, speed Va of the host vehicle and relative speed Vba of the leading vehicle, and correspond to the environment parameters used as the input parameters. With this, dedicated behavior estimation unit 435 obtains, as an output from the dedicated behavior estimation NN, a behavior estimation result indicating, for example, "decelerate".

In this way, the information processing system according to this embodiment includes general purpose behavior learning unit 431, dedicated behavior learning unit 434, general purpose behavior estimation unit 432, dedicated behavior estimation unit 435, and histogram generator 433. General purpose behavior learning unit 431 causes the neural network to learn relationships between the surroundings of vehicle 1 detected by detector 6 and a behavior of vehicle 1 implemented after the surroundings of vehicle 1 were detected, for each of the plurality of drivers. General purpose behavior estimation unit 432 estimates a tentative behavior of vehicle 1 for a specific driver by inputting, into the neural network that was caused to learn by general purpose behavior learning unit 431, the surroundings of vehicle 1 detected by detector 6 for the specific driver. Histogram generator 433 generates a histogram of an estimate result of the tentative behavior estimated by the general purpose behavior estimation unit 432. Dedicated behavior learning unit 434 builds a dedicated neural network for the specific driver by transfer learning which causes the learned neural network to relearn using the surroundings of vehicle 1 detected by detector 6 for the specific driver and a behavior of vehicle 1 implemented after the surroundings of vehicle 1 were detected. Here, dedicated behavior learning unit 434 builds the dedicated neural network by transfer learning which includes referring to the generated histogram. Dedicated behavior estimation unit 435 estimates a behavior of vehicle 1 for the specific driver using this dedicated neural network.

With this, even when there are few behaviors included in the driving environment history for a specific driver and few feature amount sets, since the driving environment histories for a plurality of drivers are used, it is possible to appropriately estimate a behavior of vehicle 1 for the specific driver.

(Variation 2)

In this variation, an estimate behavior is evaluated, and the evaluation result is used in the relearning, and switching for either outputting or not outputting the estimated behavior to information obtainer 91 described above is performed based on the evaluation result.

Figure 32:
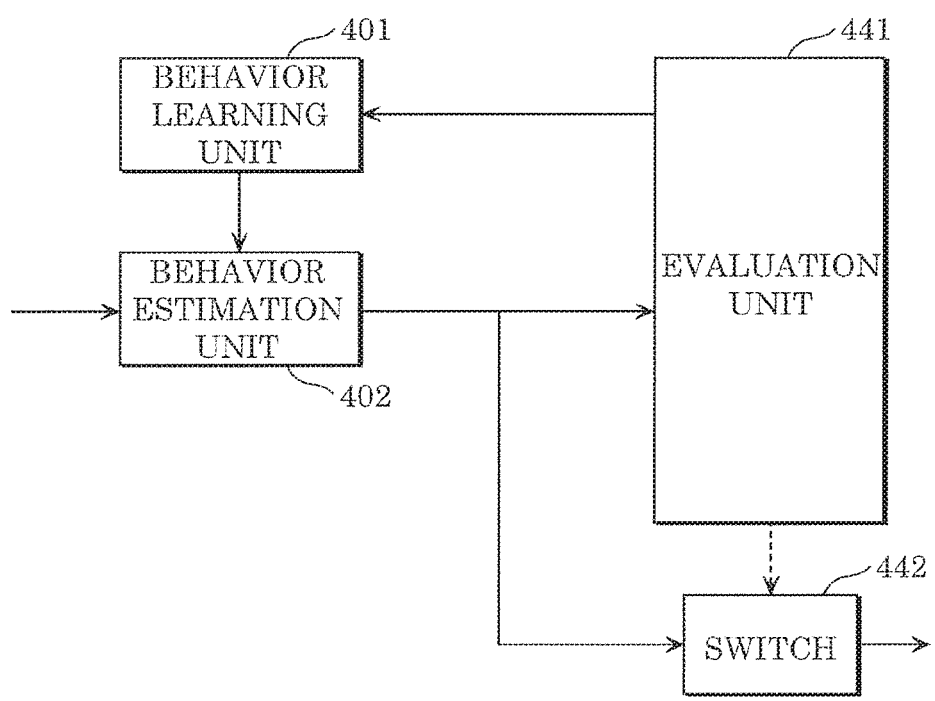
FIG. 32 is a block diagram illustrating one example of a functional configuration relating to behavior estimation by a vehicle controller according to Variation 2 of Embodiment 4.

FIG. 32 is a block diagram illustrating one example of a functional configuration relating to behavior estimation by vehicle controller 7 according to this variation.

Vehicle controller 7 includes behavior learning unit 401, behavior estimation unit 402, evaluation unit 441, and switch 442. Note that although not illustrated in FIG. 32, vehicle controller 7 includes behavior estimation result receiver 403, just like in Embodiment 4.

Behavior estimation unit 402 outputs the behavior estimation result for vehicle 1, just as in Embodiment 4.

Evaluation unit 441 calculates an amount of change between the current behavior of vehicle 1 and the behavior estimation result output from behavior estimation unit 402. Evaluation unit 441 further compares the amount of change with a threshold, and when the amount of change exceeds the threshold, that is to say, when the behavior of vehicle 1 changes abruptly, evaluation unit 441 voids the behavior estimation result. In contrast, when the amount of change is less than or equal to the threshold, that is to say, when the behavior of vehicle 1 changes gently, evaluation unit 441 validates the behavior estimation result. Then, evaluation unit 441 outputs, to switch 442 and behavior learning unit 401, a control signal indicating whether the behavior estimation result is valid or not.

When the control signal indicates valid, switch 442 outputs, to behavior estimation result receiver 403, the behavior estimation result output by behavior estimation unit 402. Conversely, when the control signal indicates void, switch 442 prohibits the output of the behavior estimation result to behavior estimation result receiver 403.

When the control signal indicates void, behavior learning unit 401 causes behavior estimation NN to relearn so as to not output the behavior estimation result from the test data corresponding to the behavior estimation result.

Figure 33:
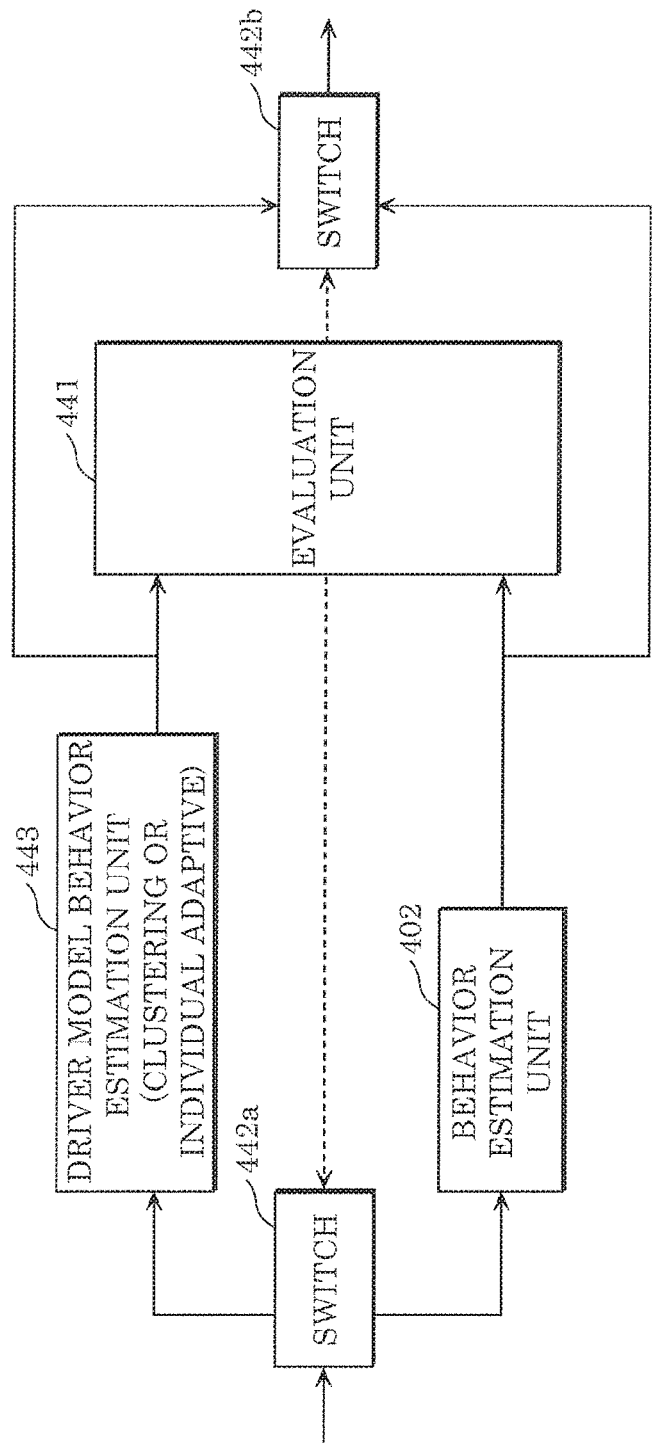
FIG. 33 is a block diagram illustrating one example of a functional configuration relating to behavior estimation by a vehicle controller according to Variation 2 of Embodiment 4.

FIG. 33 is a block diagram illustrating another example of a functional configuration relating to behavior estimation by vehicle controller 7 according to this variation.

Vehicle controller 7 includes driver model behavior estimation unit 443, behavior estimation unit 402, evaluation unit 441, switch 442a, and switch 442b. Note that although not illustrated in FIG. 33, vehicle controller 7 includes behavior learning unit 401 and behavior estimation result receiver 403, just like in Embodiment 4.

Switch 442a obtains data to be used in the behavior estimation, such as a driving environment, a feature amount indicating a driving characteristic of the driver, or an environment parameter, and switches output of that data to either driver model behavior estimation unit 443 or behavior estimation unit 402.

Driver model behavior estimation unit 443 receives data on, for example, the driving environment via switch 442a, and estimates a behavior of vehicle 1 using that data and a clustering or individual adaptive driver model, to be described in Embodiment 7. This method of behavior estimation is as indicated in Embodiment 7.

Behavior estimation unit 402 receives data, such as a feature amount, via switch 442a, and estimates a behavior of vehicle 1 using this data and the behavior estimation NN. This method of behavior estimation is as indicated in Embodiment 4.

As described above, evaluation unit 441 determines whether the behavior estimation result output from behavior estimation unit 402 is valid or not, and outputs a control signal indicating the determination result to switches 442a and 442b.

Depending on the control signal from evaluation unit 441, switch 442b switches the behavior estimation result output from behavior estimation result receiver 403 to either the behavior estimation result from driver model behavior estimation unit 443 or the behavior estimation result from behavior estimation unit 402. In other words, when the control signal indicates that the behavior estimation result by behavior estimation unit 402 is valid, switch 442b outputs the behavior estimation result by behavior estimation unit 402 to behavior estimation result receiver 403. In contrast, when the control signal indicates that the behavior estimation result by behavior estimation unit 402 is void, switch 442b outputs the behavior estimation result by driver model behavior estimation unit 443 to behavior estimation result receiver 403.

In this way, the information processing system according to this variation further includes evaluation unit 441 that determines whether the behavior estimated by behavior estimation unit 402 is valid or not, and when determined to be valid, causes information obtainer 91 to obtain the estimated behavior. In other words, evaluation unit 441 outputs the estimated behavior when evaluation unit 441 determines the behavior to be valid.

This makes it possible to prevent an inappropriate behavior from being notified by notifier 92.

Note that although evaluation unit 441 is exemplified as determining the validity of the behavior estimation result by behavior estimation unit 402 based on an amount of change between the current behavior of vehicle 1 and the behavior estimation result output from behavior estimation unit 402, the validity may be determined based on some other criterion. For example, when "change lanes" is estimated in a situation in which lanes cannot be changed, evaluation unit 441 may void the behavior estimation result of "change lanes".

Moreover, in the above example, evaluation unit 441 evaluates the behavior estimation result by behavior estimation unit 402, but evaluation unit 441 may evaluate the behavior estimation results by behavior estimation unit 422, dedicated behavior estimation unit 415, or dedicated behavior estimation unit 435. Alternatively, evaluation unit 441 may evaluate the behavior estimation result by driver model behavior estimation unit 443. Moreover, evaluation unit 441 may evaluate both the behavior estimation result by the driver model behavior estimation unit 443 and the behavior estimation result by behavior estimation unit 402. In such cases, evaluation unit 441 outputs a control signal indicating the behavior estimation result determined to be valid to switch 442b. With this, the behavior estimation result determined to be valid is output to information obtainer 91 via switch 442b and behavior estimation result receiver 403.

Moreover, when switch 442b receives the control signal, switch 442b may sort the data that is input to driver model behavior estimation unit 443 and behavior estimation unit 402 in accordance with the control signal. In these cases, switch 442b sorts the data such that no data is input to the behavior estimation unit that output a behavior estimation result determined to be invalid, as indicated by the control signal.

Embodiment 5

Just like in Embodiment 4, the vehicle according to this embodiment estimates a behavior of the vehicle using a neural network (NN), but is characterized in that the vehicle evaluates the estimated behavior based on an input from the driver and incorporates that evaluation result into the relearning.

Figure 34:
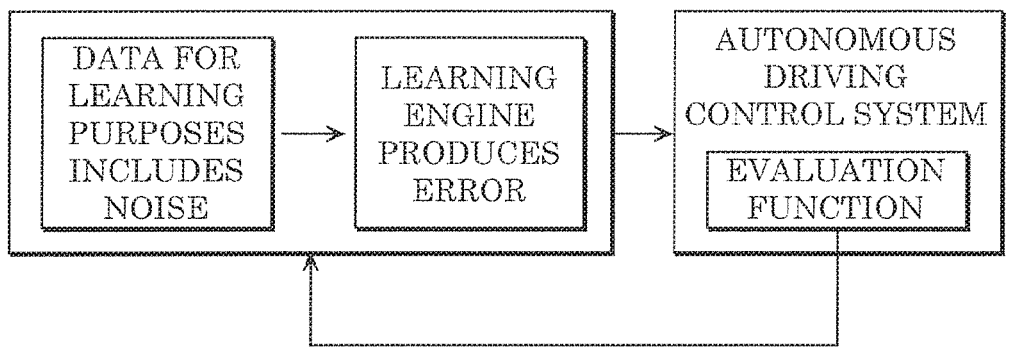
FIG. 34 illustrates a design concept for the information processing system according to Embodiment 5.

FIG. 34 illustrates a design concept for the information processing system according to this embodiment.

In machine learning, currently, it is extremely difficult obtain 100% correct data for leaning purposes that does not including any miscalculation. Moreover, collecting a large amount of 100% correct data in the order of tens or hundreds of thousands is extremely difficult.

Accordingly, data for learning purposes includes noise, and this noise causes the learning engine to produce errors. In other words, it is not realistic to produce mechanical learning that is 100% perfect.

In light of this, the autonomous driving control system according to this embodiment includes an evaluation function dependent on application purpose (i.e., autonomous driving), and corrects learned data so as to maximize the evaluation function or corrects the learning method used in the learning engine.

Note that the autonomous driving control system according to this embodiment is a system that includes each element, such as behavior learning unit 401 and behavior estimation unit 402 described in Embodiment 4, that causes behavior learning and estimates behavior based on the result of the learning. Moreover, the information processing system according to this embodiment includes such an autonomous driving control system, as well as information notification device 9 and touch panel 10 illustrated in FIG. 13.

Figure 35:
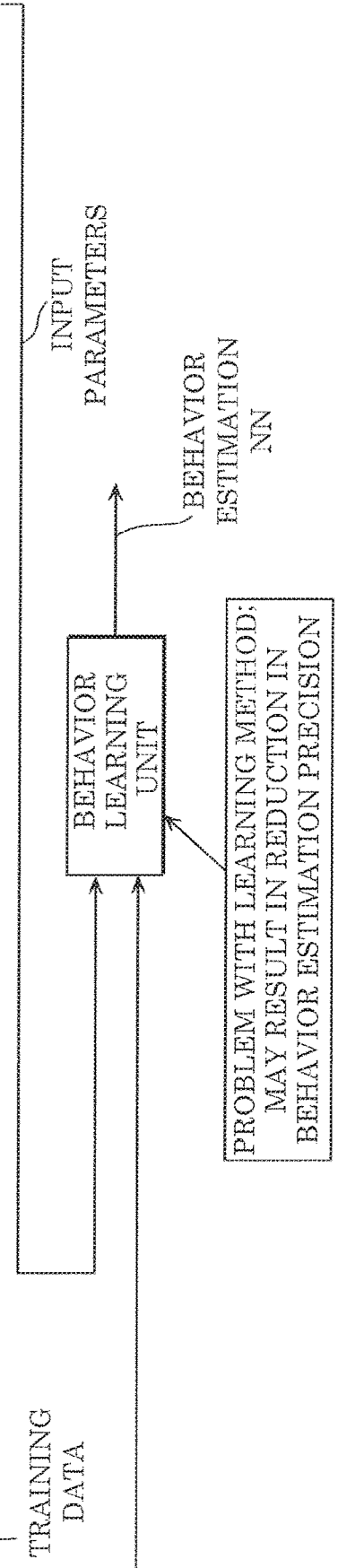
FIG. 35 is for illustrating the data for learning purposes and an error in an estimation result by a learning engine according to Embodiment 5.

FIG. 35 is for illustrating the data for learning purposes described above and an error in the estimation result by the learning engine. Note that in FIG. 35, in order to illustrate this error, the environment parameters or environment parameter set indicated in, for example, FIG. 24 and FIG. 25, are illustrated as one example of the data for learning purposes. Moreover, these environment parameters are surroundings of vehicle 1 detected by detector 6 described above.

For example, as illustrated in FIG. 35, when the data processed by the behavior learning unit is significantly large, it is extremely difficult to inspect the validity of the data one by one. In other words, there is a chance that the data generated by detector 6 includes an error. More specifically, even when detector 6 detects an inter-vehicle distance DRba between the leading vehicle and the host vehicle of "5", this detection may be an error, and the inter-vehicle distance DRba may actually be "4." Moreover, there are cases when there is a problem with the learning method used in the learning engine, which is the behavior learning unit, which leads to a reduction in the precision of the behavior estimation.

The autonomous driving control system according to this embodiment is capable of inhibiting a reduction in the precision of the behavior estimation even when there is an error in the data generated by detector 6 or there is a problem with the learning method. The configuration and processing operations of such an autonomous driving control system will be described hereinafter in detail.

Figure 36:
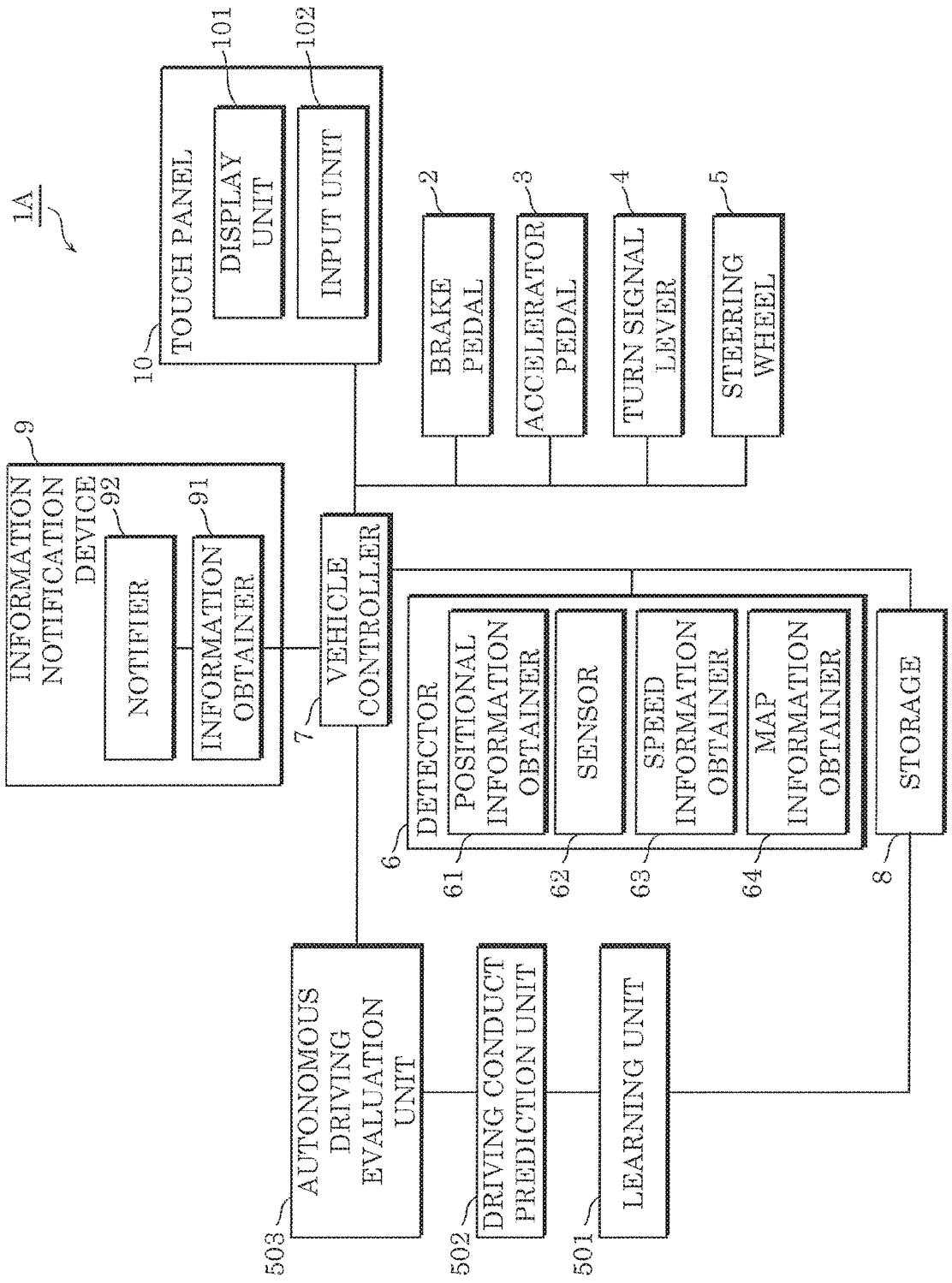
FIG. 36 illustrates a system configuration in a vehicle according to Embodiment 5.

FIG. 36 illustrates a system configuration in the vehicle according to this embodiment.

Just like vehicle 1 according to Embodiment 2 illustrated in FIG. 13, vehicle 1A includes brake pedal 2, accelerator pedal 3, turn signal lever 4, steering wheel 5, detector 6, vehicle controller 7, storage 8, information notification device 9, and touch panel 10. Vehicle 1A further includes learning unit 501, driving conduct prediction unit 502, and autonomous driving evaluation unit 503. The autonomous driving control system according to this embodiment includes learning unit 501, driving conduct prediction unit 502, and autonomous driving evaluation unit 503, and may include other elements included in vehicle 1A. Note that in this embodiment, description of common points with other embodiments will be omitted or simplified, and the description will focus on details regarding the points of difference with other embodiments.

Vehicle controller 7 determines the driving environment based on the driving state and the surroundings of vehicle 1A. More specifically, vehicle controller 7 obtains the driving state from brake pedal 2, accelerator pedal 3, turn signal lever 4, and steering wheel 5. Moreover, vehicle controller 7 obtains the surroundings (environment parameter, etc.) from detector 6. Vehicle controller 7 further stores the obtained driving state and surroundings as a driving environment history in storage 8.

Learning unit 501 learns the behaviors of vehicle 1A. Driving conduct prediction unit 502 estimates a behavior of vehicle 1A dependent on the surroundings, using the result of the learning. Vehicle controller 7 displays the behavior estimated as an estimated behavior on display unit 101 of touch panel 10. Here, vehicle controller 7 displays, as a behavior candidate, at least one behavior other than the estimated behavior on display unit 101.

Input unit 102 of touch panel 10 receives a behavior of vehicle 1A input by the driver. In other words, when any one of the at least one behavior candidate displayed on display unit 101 is selected by the driver, input unit 102 receives, as an input behavior, the behavior candidate selected by the driver.

Here, an input behavior received by input unit 102 of touch panel 10 is an evaluation result by the driver of an estimated behavior (driving conduct) displayed on display unit 101. When the driver accepts that the estimated behavior will be implemented by vehicle 1A, input unit 102 ceases accepting input behaviors. However, when the driver desires vehicle 1A to implement a behavior different from the estimated behavior, rather than the estimated behavior, input unit 102 accepts, as an input behavior, that behavior (behavior candidate). Acceptance of this input behavior means that the behavior estimation result (prediction result) by driving conduct prediction unit 502 was incorrect.

Accordingly, autonomous driving evaluation unit 503 according to this embodiment corrects the labeling of the behavior of the environment parameter used in the behavior estimation, and causes learning unit 501 to relearn. Alternatively autonomous driving evaluation unit 503 changes the prediction method used by driving conduct prediction unit 502.

Figure 37:
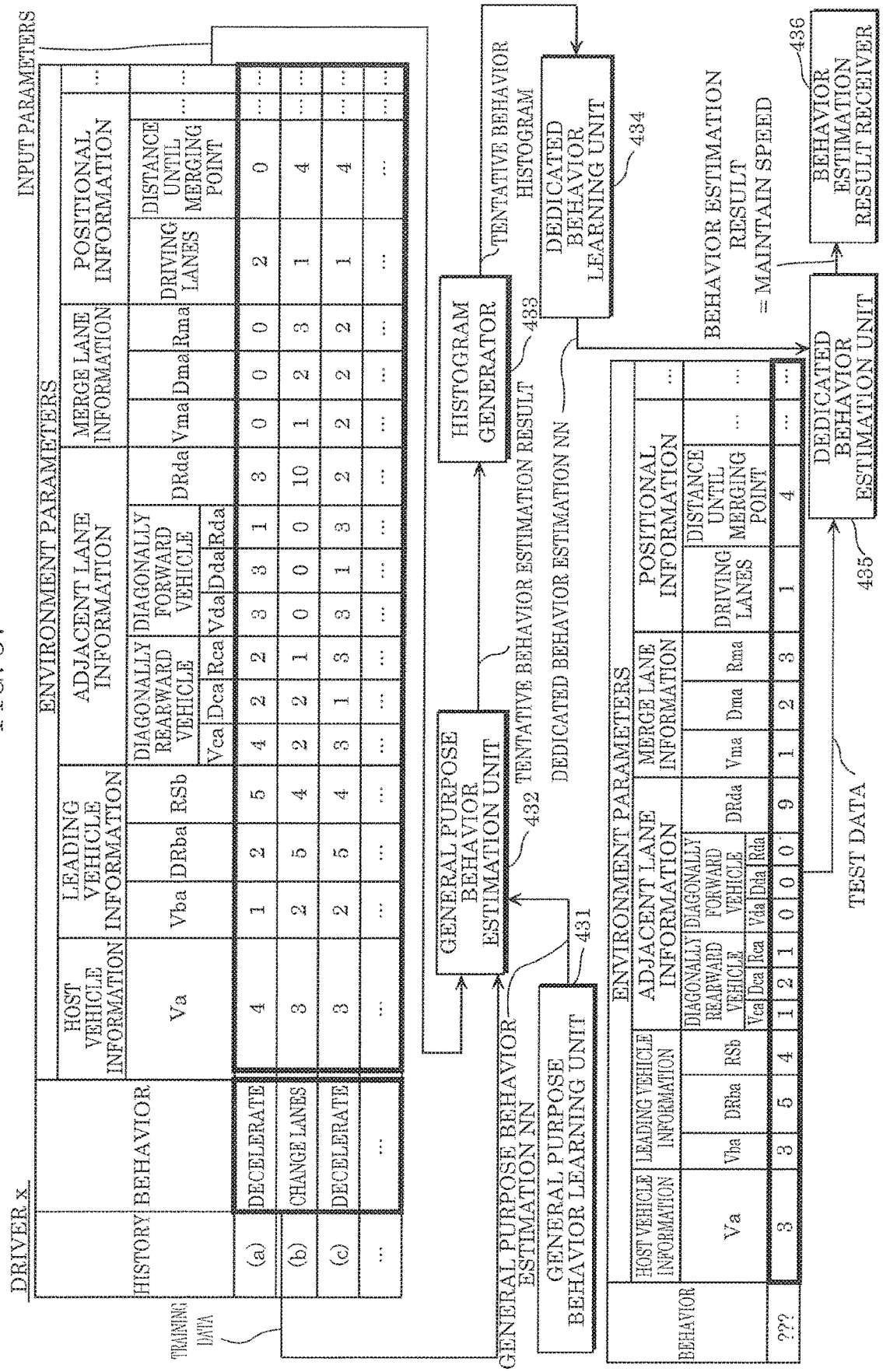
FIG. 37 is a block diagram illustrating a functional configuration of an autonomous driving control system according to Embodiment 5.

FIG. 37 is a block diagram illustrating a functional configuration of the autonomous driving control system according to this embodiment. Note that illustration of autonomous driving evaluation unit 503 is omitted in FIG. 37.

Just like in Embodiment 4, the autonomous driving control system according to this embodiment includes general purpose behavior learning unit 431, general purpose behavior estimation unit 432, histogram generator 433, dedicated behavior learning unit 434, dedicated behavior estimation unit 435, and behavior estimation result receiver 436. Note that learning unit 501 illustrated in FIG. 36 includes general purpose behavior learning unit 431, histogram generator 433, and dedicated behavior learning unit 434, and driving conduct prediction unit 502 includes general purpose behavior estimation unit 432 and dedicated behavior estimation unit 435.

Here, for example, dedicated behavior learning unit 434 estimates "maintain speed" as the behavior estimation result (estimated behavior).

Figure 38:
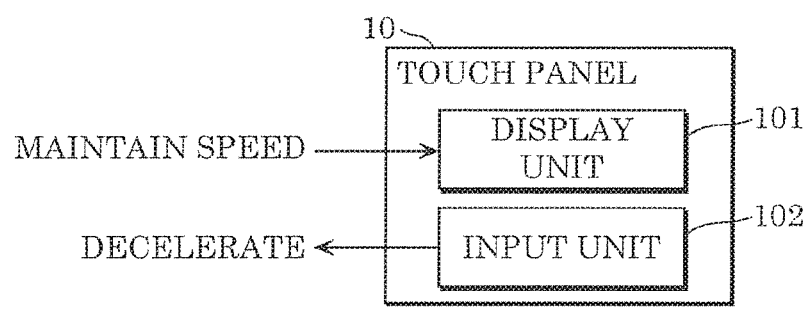
FIG. 38 illustrates one example of a display displayed by a touch panel and an input behavior according to Embodiment 5.

FIG. 38 illustrates one example of a display displayed by touch panel 10 and an input behavior.

As illustrated in FIG. 37, when "maintain speed" is estimated as the behavior estimation result, display unit 101 of touch panel 10 displays "maintain speed" as the estimated behavior (behavior estimation result) and displays at least one behavior candidate other than the estimated behavior. Here, the driver, for example, does not desire vehicle 1A to implement the displayed estimated behavior, and by operating input unit 102, selects, as an input behavior, "decelerate", which is one behavior candidate among the at least one behavior candidate displayed along with the estimated behavior. With this, input unit 102 accepts "decelerate" as an input behavior.

As can be seen, the input behavior of "decelerate" is different from the estimated behavior of "maintain speed". In other words, acceptance of this input behavior of "decelerate" means that the behavior estimation result of "maintain speed" by driving conduct prediction unit 502 was incorrect.

When the driver instructs "decelerate" as an input behavior, which is different than the estimated behavior, the autonomous driving control system according to this embodiment declares the input behavior of "decelerate" as a restraint condition for fine tuning the dedicated behavior estimation NN by dedicated behavior learning unit 434.

Figure 39:
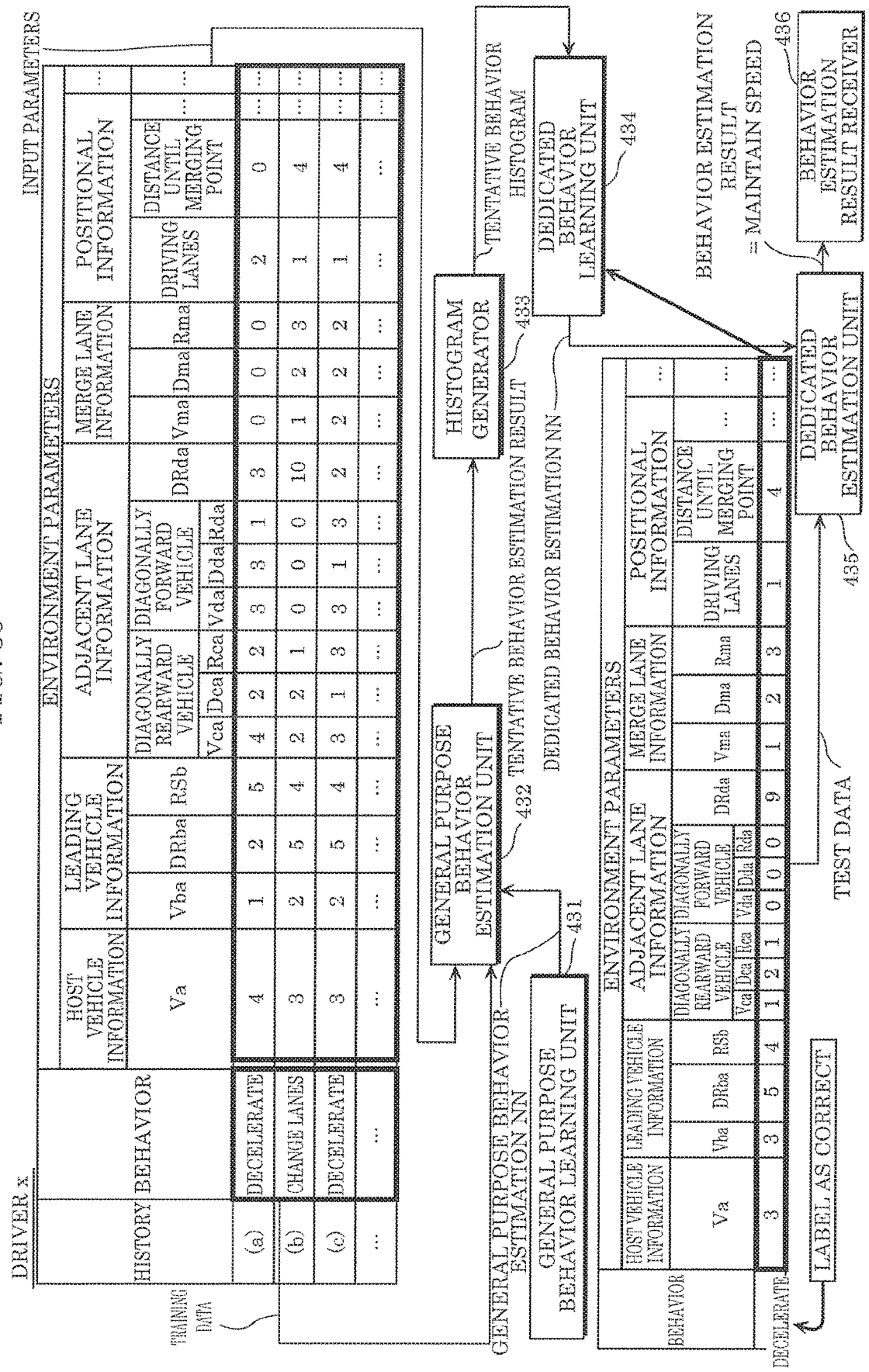
FIG. 39 is for illustrating fine tuning according to Embodiment 5.

FIG. 39 is for illustrating the fine tuning according to this embodiment.

In the fine tuning, the input behavior of "decelerate" is labeled as correct relative to the environment parameters, which are the test data used in the estimation of the above-described estimated behavior of "maintain speed". In other words, dedicated behavior learning unit 434 causes the general purpose behavior estimation NN to relearn the weighting using the environment parameters used in the estimation of the estimated behavior of "maintain speed" as input parameters and using the input behavior of "decelerate" as the training data corresponding to the input parameters. This relearning builds and fine tunes the dedicated behavior estimation NN. Note just like in Embodiment 4, in this relearning as well, based on the tentative behavior histogram, the weighting in the general purpose behavior estimation NN is relearned so as to increase the degree of coincidence between the general purpose behavior estimation NN output and the training data.

In this way, the input behavior of "decelerate" is labeled as correct and applied in the fine tuning by dedicated behavior learning unit 434.

Figure 40:
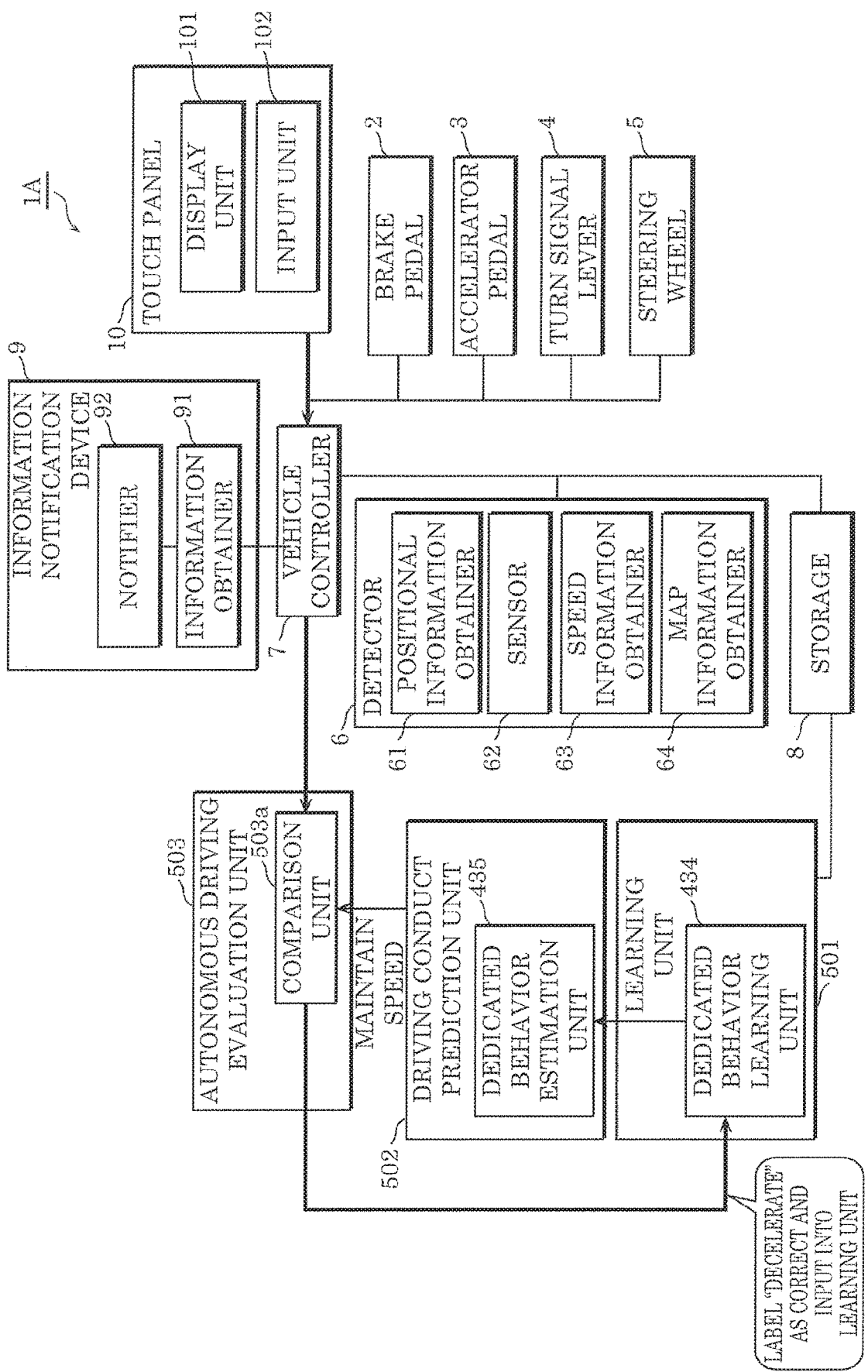
FIG. 40 illustrates a system configuration in a vehicle according to Embodiment 5 in detail.

FIG. 40 illustrates a system configuration in vehicle 1A according to this embodiment in detail.

Autonomous driving evaluation unit 503 includes comparison unit 503a. Comparison unit 503a compares the behavior estimated by dedicated behavior estimation unit 435 in driving conduct prediction unit 502 (i.e., the estimated behavior described above) and the input behavior received by input unit 102. For example, comparison unit 503a compares the estimated behavior of "maintain speed" and the input behavior of "decelerate". Note that the input behavior is notified to comparison unit 503a of autonomous driving evaluation unit 503 from input unit 102 via vehicle controller 7.

When, as a result of the comparison, comparison unit 503a determines that the estimated behavior and the input behavior are different, comparison unit 503a inputs, into dedicated behavior learning unit 434 of learning unit 501, the input behavior (for example, "decelerate") labeled as correct. This input prompts the fine tuning of the dedicated behavior estimation NN by dedicated behavior learning unit 434.

Figure 41:
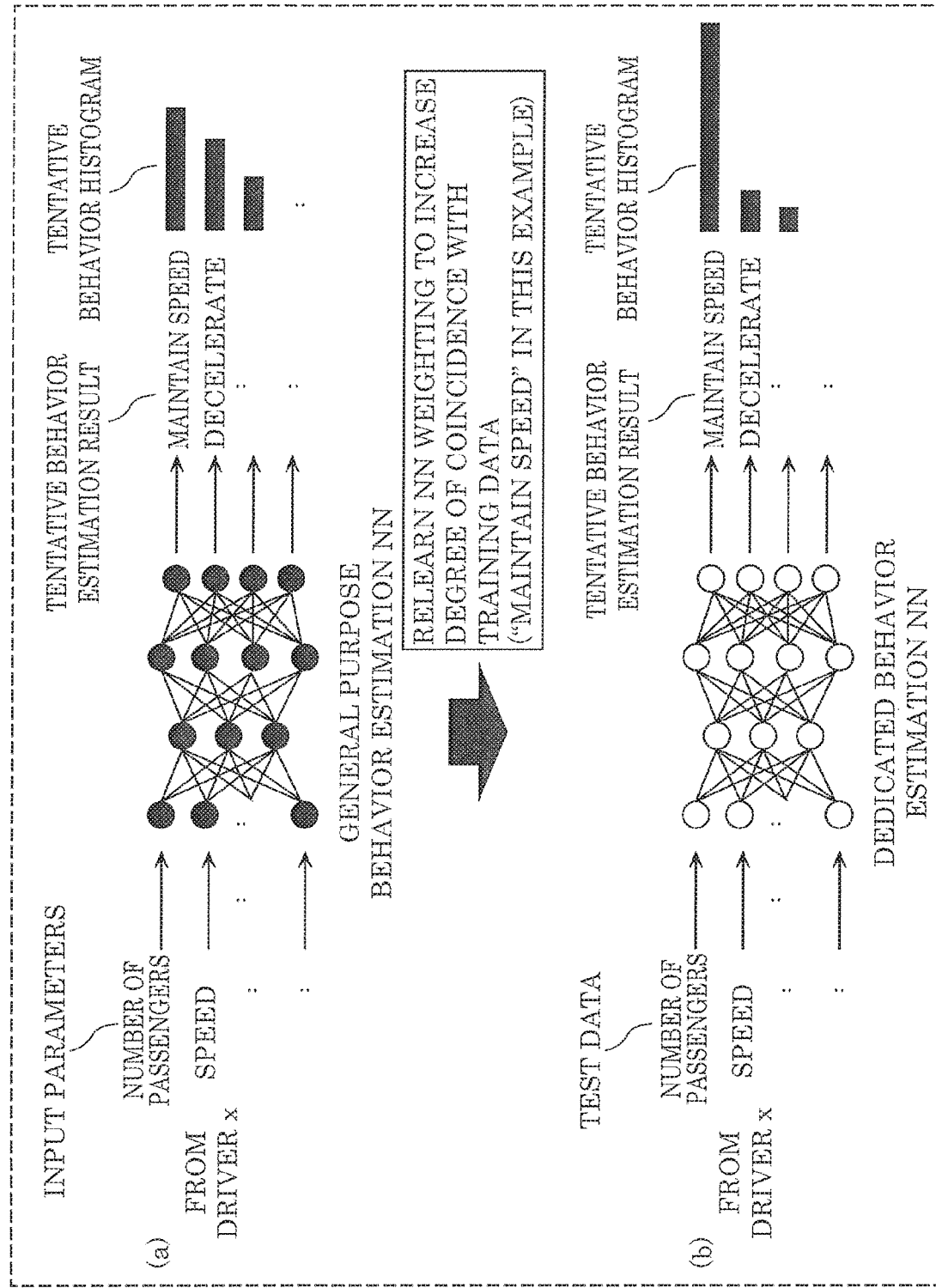
FIG. 41 illustrates a method used to build a dedicated behavior estimation NN according to Embodiment 5.

FIG. 41 illustrates a method used to build the dedicated behavior estimation NN.

Just like in Embodiment 4, after the tentative behavior histogram illustrated in (a) in FIG. 41 is generated, dedicated behavior learning unit 434 relearns the weighting in the general purpose behavior estimation NN so as to increase the degree of coincidence between the general purpose behavior estimation NN output and the training data (for example, "maintain speed"). With this, as illustrated in (b) in FIG. 41, dedicated behavior learning unit 434 builds a dedicated behavior estimation NN whose output is an estimation result for only a behavior in the training data (for example, "maintain speed"). This relearning can be performed for a single unit of training data, and can also be performed for a plurality of units of training data. In other words, dedicated behavior learning unit 434 builds a dedicated neural network for a specific driver by transfer learning.

Figure 42:
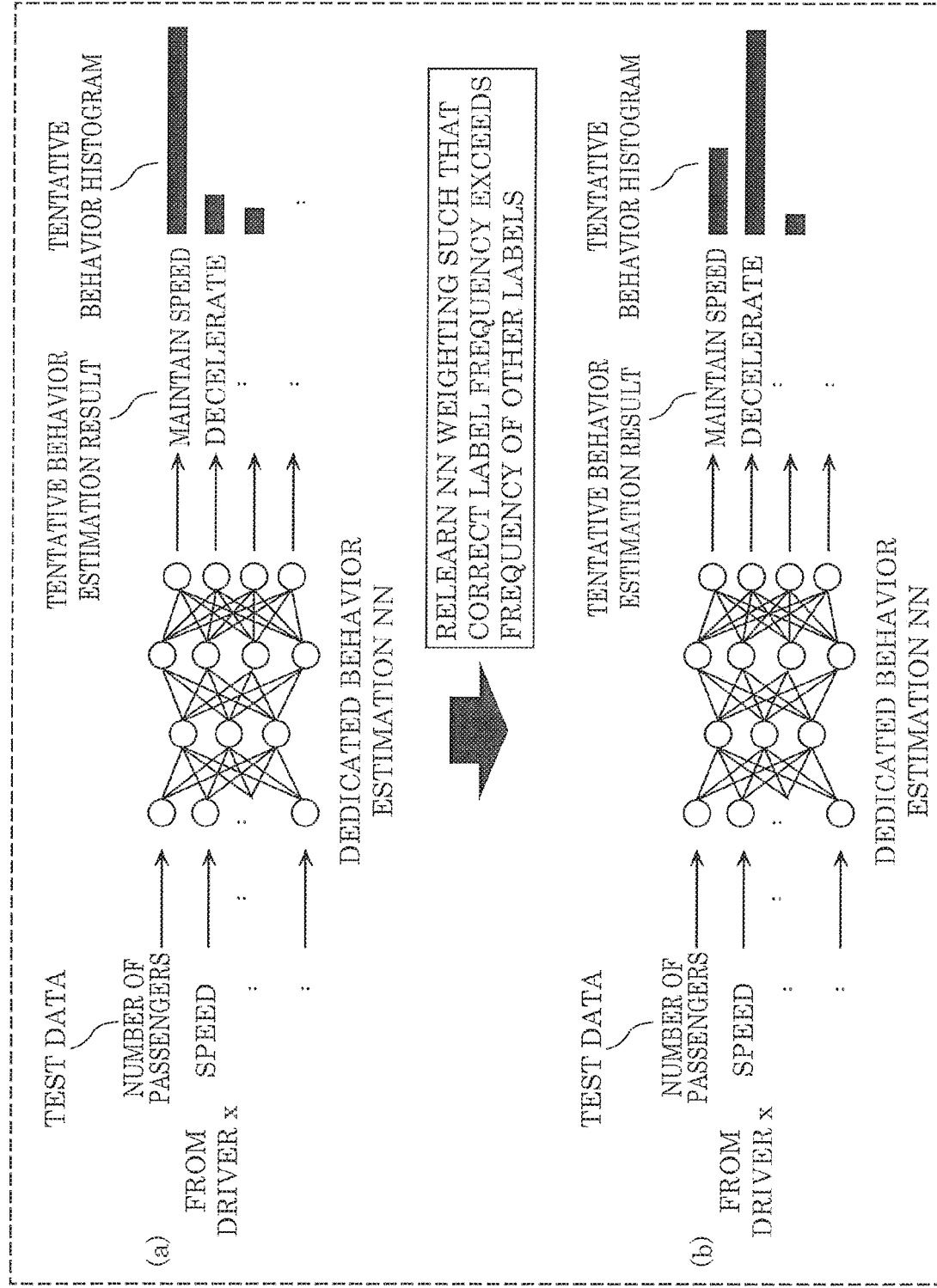
FIG. 42 illustrates relearning based on an input behavior of a dedicated behavior estimation NN according to Embodiment 5.

FIG. 42 illustrates relearning based on the input behavior of the dedicated behavior estimation NN.

As illustrated in (a) in FIG. 42, dedicated behavior learning unit 434 builds a dedicated behavior estimation NN, which is a dedicated neural network for a specific driver by transfer learning. The estimation result using a dedicated behavior estimation NN built in this way is an estimated behavior of "maintain speed", which is different from the input behavior of "decelerate" received by input unit 102. In other words, the estimated behavior of "maintain speed" was incorrect.

Accordingly, dedicated behavior learning unit 434 associates the correct label of "decelerate" input by comparison unit 503a with the environment parameter set, which is the test data used in the estimation of the estimated behavior of "maintain speed", and adds the association to the driving environment history. Dedicated behavior learning unit 434 then uses a plurality of environment parameter sets associated with the behavior "decelerate" labeled as correct in the driving environment history to which the above association has been added to cause the general purpose behavior estimation NN to relearn the weighting. In other words, dedicated behavior learning unit 434 causes the general purpose behavior estimation NN to relearn the weighting so as to cause the frequency (cumulative value) of the correct labels to exceed the frequency (cumulative value) of other labels (behaviors). As a result, the dedicated behavior estimation NN is updated, and a dedicated behavior estimation NN with increased estimation precision is built.

In this way, the information processing system according to this embodiment includes input unit 102 that receives a behavior of vehicle 1A input by a specific driver, and autonomous driving evaluation unit 503 that evaluates a behavior of vehicle 1A estimated by driving conduct prediction unit 502 based on the behavior of vehicle 1A received by input unit 102. When autonomous driving evaluation unit 503 evaluates that there is an error in the behavior of vehicle 1A estimated by driving conduct prediction unit 502, autonomous driving evaluation unit 503 causes learning unit 501, which is the behavior learning unit, to cause the neural network to relearn using the behavior of vehicle 1A received by input unit 102 and environment parameters, which are the surroundings of vehicle 1A detected by detector 6 at the time of estimation of the behavior of vehicle 1A.

With this, the prediction precision of the driving conduct, that is to say, the estimation precision of the behavior of vehicle 1A can be increased even if there is an error in the surroundings detected by detector 6.

Embodiment 6

Just like in Embodiment 4, the vehicle according to this embodiment estimates a behavior of the vehicle using a dedicated behavior estimation NN, but is characterized in that the dedicated behavior estimation NN to be used is switched depending on the driving scene of the vehicle.

In this embodiment, when only a small amount of data for learning purposes can be collected, transfer learning is used to derive transfer target knowledge from big-data transfer source knowledge. Accordingly, a plurality of transfer target knowledges are generated for each small data constellation for learning purposes set applied to each transfer target. For example, knowledge for urban environments (environments in which there are a large number of pedestrians, such as at the Shibuya crossing), and knowledge for rural environments (environments in which there are very few pedestrians) can be generated. In other example, knowledge for sunny weather scenes and knowledge for rainy weather scenes can be generated. In yet other example, knowledge for congested traffic scenes and knowledge for uncongested, smooth traffic scenes can be generated. Note that each of these "knowledges" corresponds to the dedicated behavior estimation NN described above.

However, when there is a plurality of generated transfer target knowledges, there is a need to select the knowledge to be used in behavior estimation.

Accordingly, in the autonomous driving control system according to this embodiment, the driving scene of the vehicle, such as the driving environment, weather, congested traffic condition, etc., is used as a knowledge selection switch. Note that in this embodiment, description of common points with other embodiments will be omitted or simplified, and the description will focus on details regarding the points of difference with other embodiments.

Figure 43:
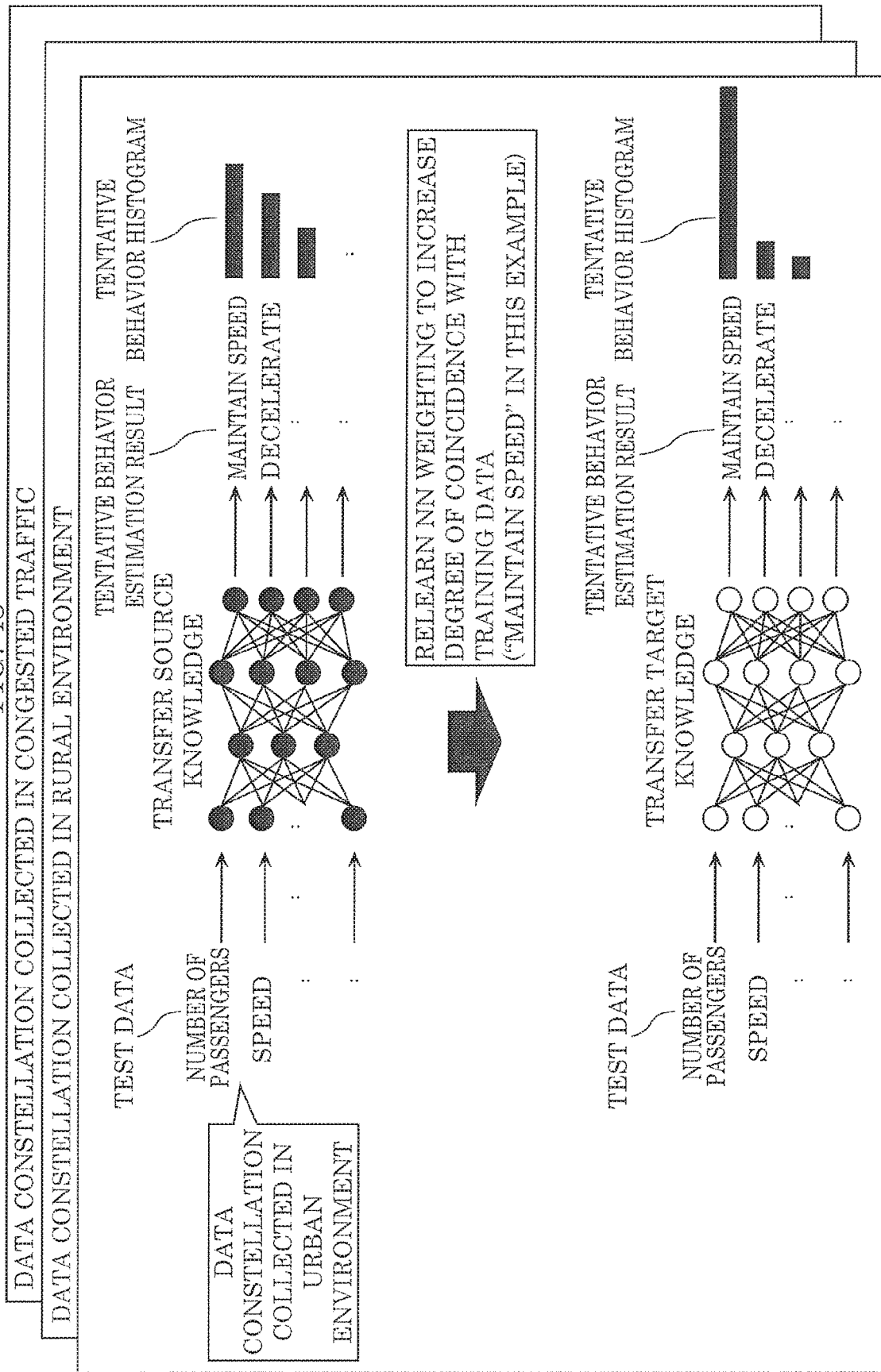
FIG. 43 illustrates a plurality of knowledges (NNs) according to Embodiment 6.

FIG. 43 illustrates a plurality of knowledges (NNs) according to this embodiment.

The autonomous driving control system according to this embodiment builds an urban transfer target knowledge (dedicated behavior estimation NN) from a transfer source knowledge (general purpose behavior estimation NN) via transfer learning using a driving environment history (data constellation) of when the vehicle was driving in an urban environment. Similarly, the autonomous driving control system builds a rural transfer target knowledge (dedicated behavior estimation NN) via transfer leaning using a driving environment history (data constellation) of when the vehicle was driving in a rural environment. Moreover the autonomous driving control system builds a congested traffic transfer target knowledge (dedicated behavior estimation NN) via transfer leaning using a driving environment history (data constellation) of when the vehicle was driving in congested traffic.

Figure 44:
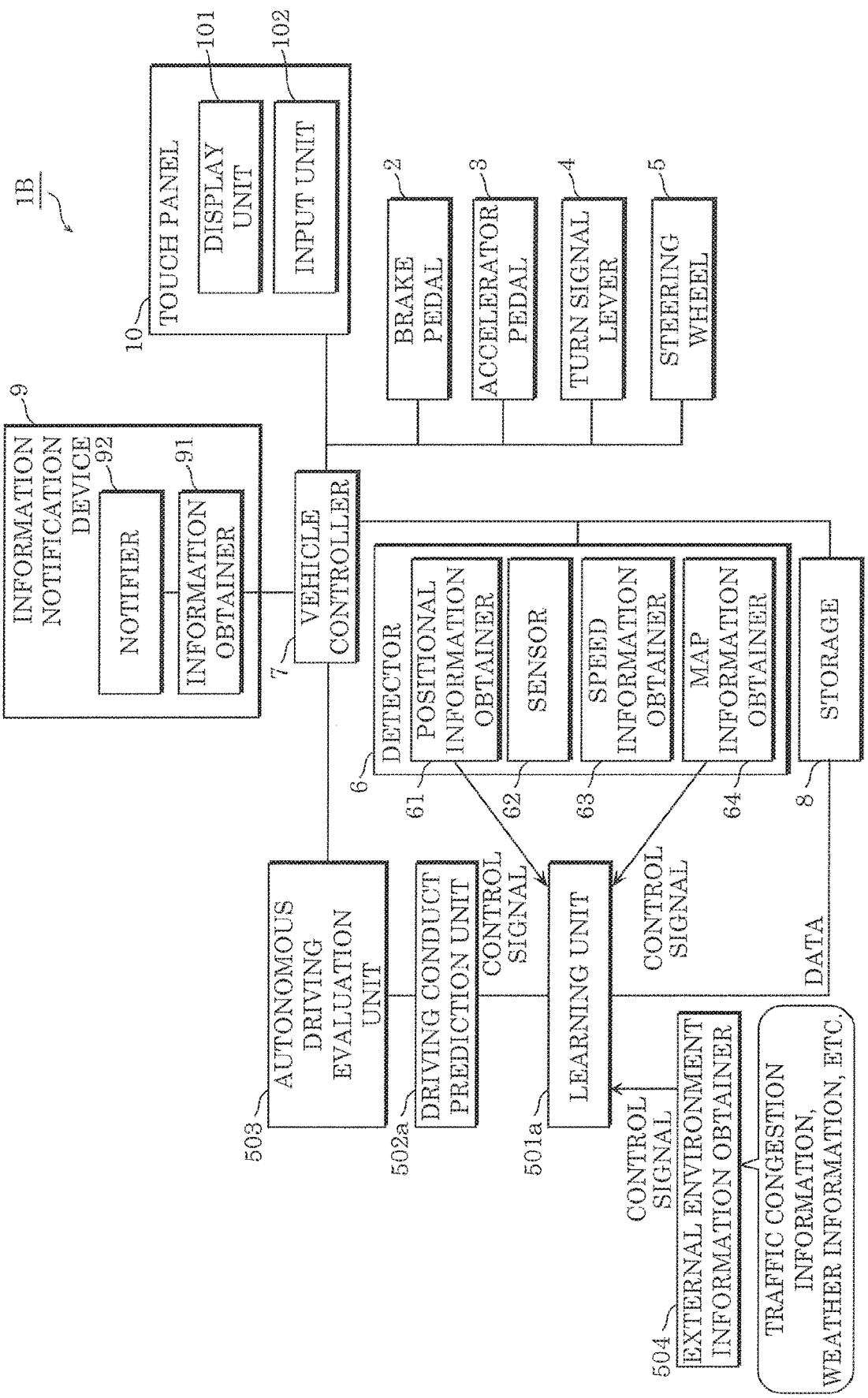
FIG. 44 illustrates a system configuration in a vehicle according to Embodiment 6.

FIG. 44 illustrates a system configuration in the vehicle according to this embodiment.

Just like vehicle 1A according to Embodiment 5 illustrated in FIG. 36, vehicle 1B includes brake pedal 2, accelerator pedal 3, turn signal lever 4, steering wheel 5, detector 6, vehicle controller 7, storage 8, information notification device 9, touch panel 10, and autonomous driving evaluation unit 503. Vehicle 1B further includes external environment information obtainer 504, and includes learning unit 501a and driving conduct prediction unit 502a in place of learning unit 501 and driving conduct prediction unit 502, respectively. The autonomous driving control system according to this embodiment includes learning unit 501a, driving conduct prediction unit 502a, and autonomous driving evaluation unit 503, and may include other elements included in vehicle 1B. Moreover, the information processing system according to this embodiment includes such an autonomous driving control system, as well as information notification device 9.

External environment information obtainer 504 obtains traffic congestion information via, for example Vehicle Information and Communication System (VICS®), and further obtains weather information via, for example, communications via the internet. Note that the traffic congestion information and the weather information will hereinafter be collectively referred to as external environment information.

Learning unit 501a includes the same functions of learning unit 501 according to Embodiment 4, and also identifies a dedicated behavior estimation NN corresponding to the scene in which vehicle 1B is driving as dedicated knowledge. More specifically, learning unit 501a identifies the scene based on positional information obtained by positional information obtainer 61, map information obtained by map information obtainer 64, and traffic congestion information obtained by external environment information obtainer 504. Learning unit 501a then selects a dedicated behavior estimation NN, which is a dedicated knowledge associated with the identified scene, from among a plurality of dedicated knowledges, and outputs the selected dedicated behavior estimation NN to driving conduct prediction unit 502a.

In this way, learning unit 501a obtains positional information, map information, and external environment information from positional information obtainer 61, map information obtainer 64, and external environment information obtainer 504, respectively, as control signals for switching between dedicated knowledges.

Driving conduct prediction unit 502a includes the same features as driving conduct prediction unit 502 according to Embodiment 4, and additionally obtains the dedicated behavior estimation NN output from learning unit 501a. Moreover, driving conduct prediction unit 502a implements behavior estimation (i.e., predicts driving conduct) using the obtained dedicated behavior estimation NN.

Figure 45:
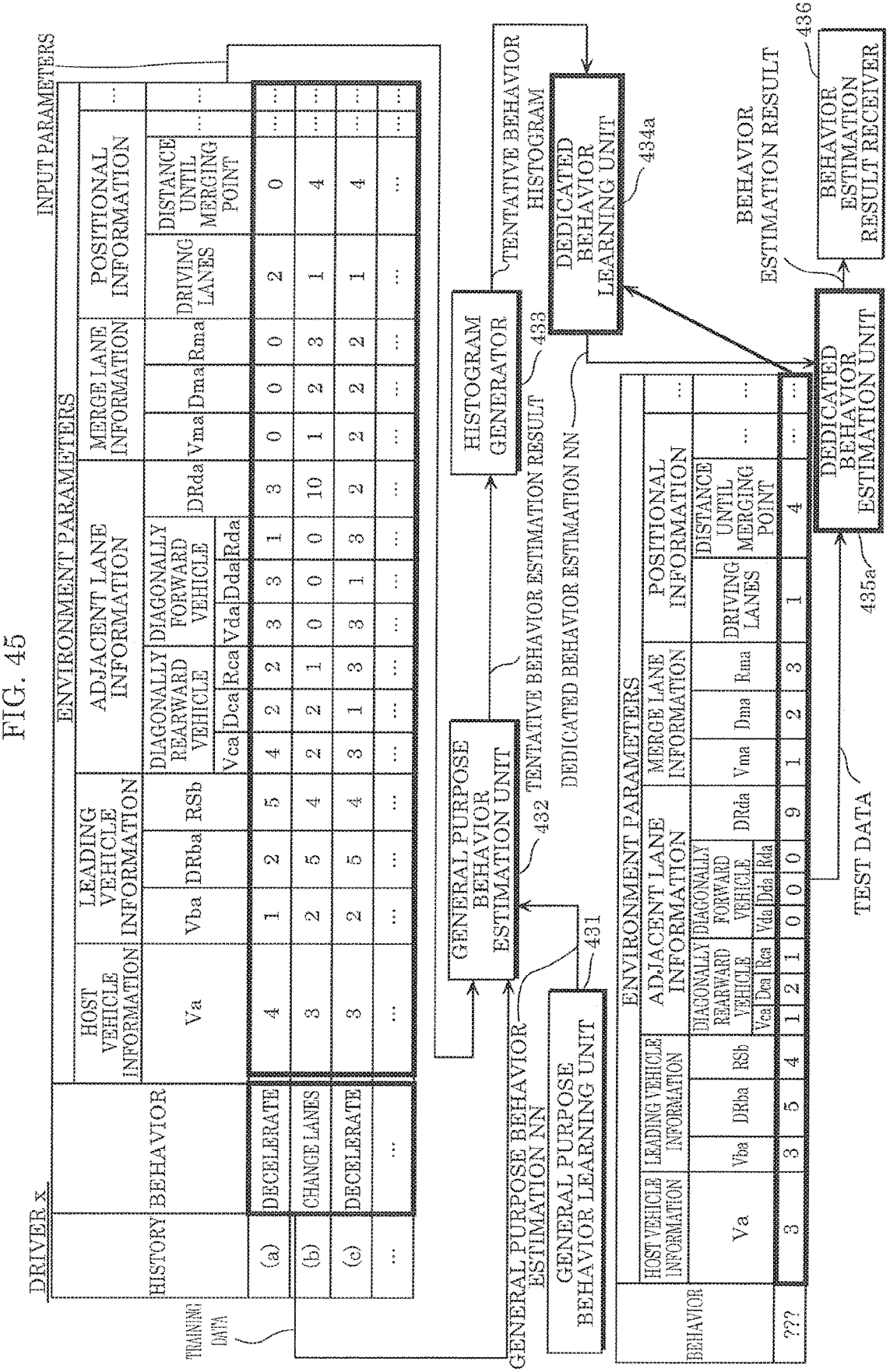
FIG. 45 is a block diagram illustrating a functional configuration of an autonomous driving control system according to Embodiment 6.

FIG. 45 is a block diagram illustrating a functional configuration of the autonomous driving control system according to this embodiment. Note that illustration of autonomous driving evaluation unit 503 is omitted in FIG. 45.

Just like in Embodiment 5, the autonomous driving control system according to this embodiment includes general purpose behavior learning unit 431, general purpose behavior estimation unit 432, histogram generator 433, and behavior estimation result receiver 436. Moreover, the autonomous driving control system according to this embodiment includes dedicated behavior learning unit 434a and dedicated behavior estimation unit 435a in place of dedicated behavior learning unit 434 and dedicated behavior estimation unit 435 in Embodiment 5, respectively. Note that learning unit 501a illustrated in FIG. 45 includes general purpose behavior learning unit 431, histogram generator 433, and dedicated behavior learning unit 434a, and driving conduct prediction unit 502a includes general purpose behavior estimation unit 432 and dedicated behavior estimation unit 435a.

When learning, dedicated behavior learning unit 434a builds a dedicated behavior estimation NN corresponding to a particular scene using an environment parameter set and behavior obtained in that particular scene from the driving environment history of a specific driver, and does this for each scene. When estimating behavior, upon receiving the above-described control signal, dedicated behavior learning unit 434a identifies a scene in accordance with the control signal, and selects a dedicated behavior estimation NN corresponding to that scene. Dedicated behavior learning unit 434a then outputs the selected dedicated behavior estimation NN to dedicated behavior estimation unit 435a.

Upon obtaining the selected dedicated behavior estimation NN from dedicated behavior learning unit 434a, dedicated behavior estimation unit 435a estimates a behavior of vehicle 1B corresponding to the test data using the selected dedicated behavior estimation NN.

Figure 46:
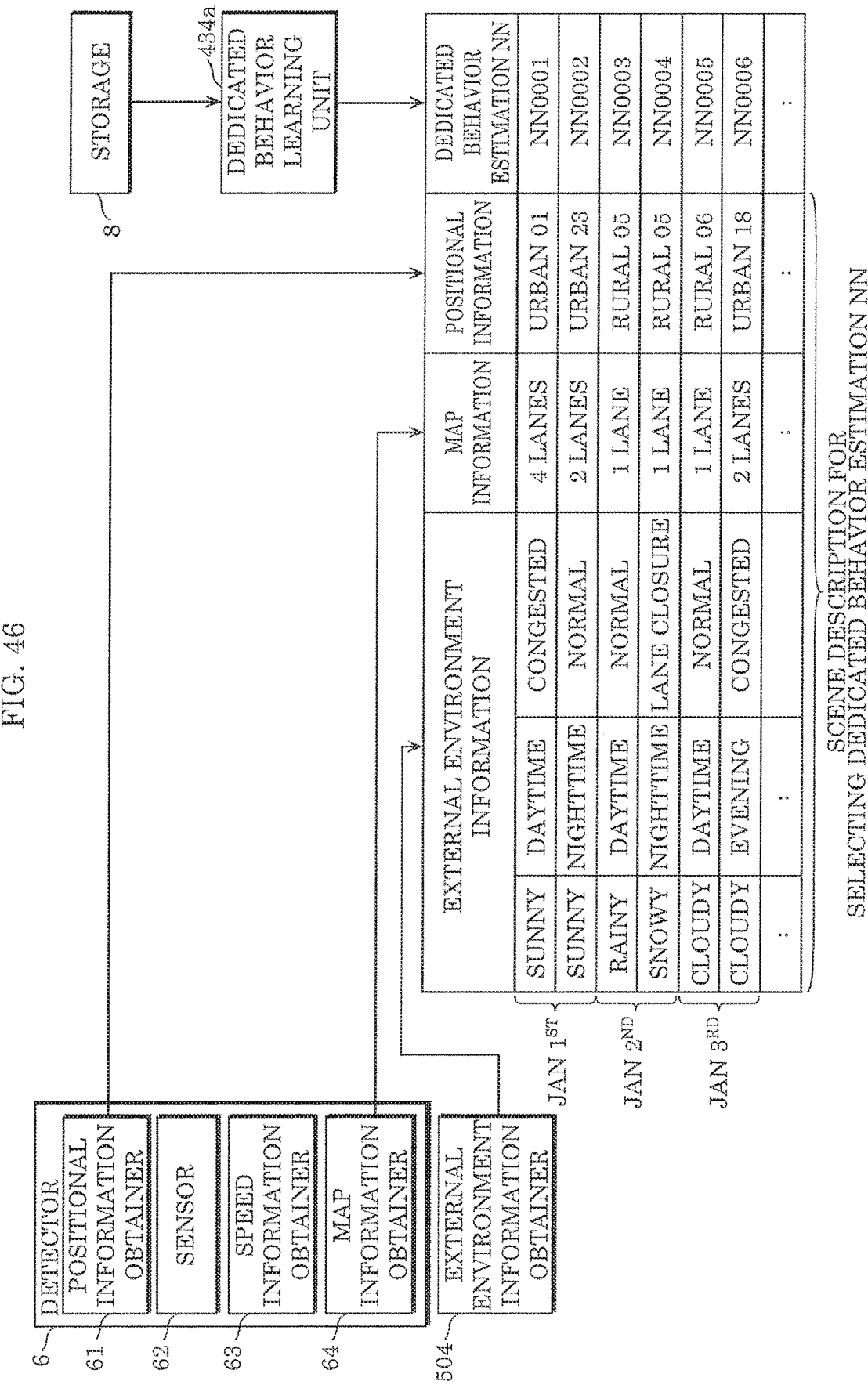
FIG. 46 is for illustrating how a dedicated behavior learning unit according to Embodiment 6 learns.

FIG. 46 is for illustrating how dedicated behavior learning unit 434a according to this embodiment learns.

Since a large amount of data is used in machine learning, it typically takes quit a long time to update a NN (neural network). Moreover, machine learning requires the computational power of a computer.

Therefore, general purpose behavior learning unit 431 typically transfers driving environment histories accumulated in storage 8 when driving to a server upon completion of the driving (for example, upon returning home), and obtains driving environment histories for other drivers transferred from the server, and updates the general purpose behavior estimation NN. On the other hand, dedicated behavior learning unit 434a obtains the updated general purpose behavior estimation NN and builds the dedicated behavior estimation NN from that general purpose behavior estimation NN. This sort of building updates an already built dedicated behavior estimation NN or adds a newly built dedicated behavior estimation NN.

Moreover, with this sort of building, dedicated behavior learning unit 434a updates or generates a dedicated behavior estimation NN corresponding to each scene. Here, the scene is indicated by previously obtained external environment information, map information, and positional information. For example, the scene indicates, via the above-described information obtained on January 1st, "sunny, daytime, congested, 4 lanes, and urban 01". In other words, in this scene, in the location in which vehicle 1B is driving, the weather is sunny, the time of day is daytime, the traffic condition is congested, the road is a four lane road, and the regional environment is urban environment 01. Dedicated behavior learning unit 434a updates or generates the dedicated behavior estimation NN "NN0001" for such a scene. In other words, using only the driving environment history corresponding to that scene, dedicated behavior learning unit 434a updates or generates dedicated behavior estimation NN "NN0001" corresponding that scene. Further, dedicated behavior learning unit 434a builds or generates a dedicated behavior estimation NN for each of the other scenes (for example, dedicated behavior estimation NN "NN0002").

Figure 47:
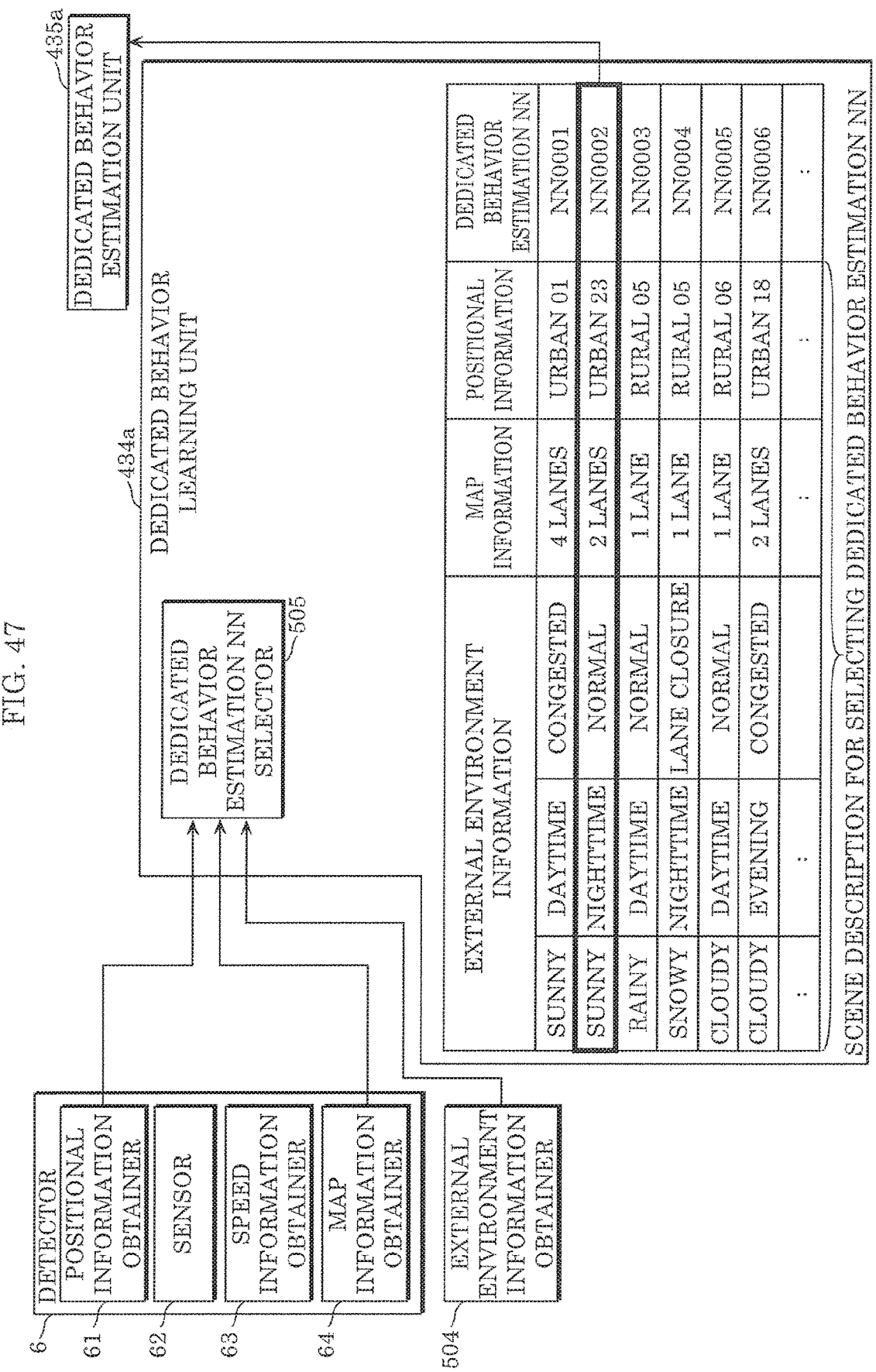
FIG. 47 is for illustrating selection of a dedicated behavior estimation NN by a dedicated behavior learning unit according to Embodiment 6.

FIG. 47 is for illustrating the selection of a dedicated behavior estimation NN by dedicated behavior learning unit 434a according to this embodiment.

Dedicated behavior learning unit 434a includes dedicated behavior estimation NN selector 505. When vehicle 1B is driving, dedicated behavior estimation NN selector 505 receives, as control signals, positional information, map information, and external environment information from positional information obtainer 61, map information obtainer 64, and external environment information obtainer 504, respectively. Then, dedicated behavior estimation NN selector 505 identifies the scene indicated in the received control signals. Dedicated behavior estimation NN selector 505 selects a dedicated behavior estimation NN corresponding to the identified scene. For example, when the identified scene is "sunny, nighttime, normal, 2 lanes, and urban 23", dedicated behavior estimation NN selector 505 selects, from among a plurality of dedicated behavior estimation NNs, dedicated behavior estimation NN "NN0002" corresponding to that scene. Dedicated behavior learning unit 434a then outputs the selected dedicated behavior estimation NN "NN0002" to dedicated behavior estimation unit 435a. With this, using the dedicated behavior estimation NN "NN0002", dedicated behavior estimation unit 435a estimates a behavior of vehicle 1B, that is to say, predicts the driving conduct of vehicle 1B.

In this way in this embodiment, for each scene in which vehicle 1B drives, dedicated behavior learning unit 434a builds a dedicated neural network for a specific driver that is in accordance with the scene. Further, dedicated behavior learning unit 434a selects, from among a plurality of dedicated neural network, a dedicated neural network that is in accordance with the current scene in which vehicle 1B is currently driving, and using the selected dedicated neural network, estimates a behavior of vehicle 1B for the specific driver.

With this, an appropriate neural network can be selected for each scene, and the behavior estimation precision of vehicle 1B in each scene, that is to say, the driving conduct prediction precision, can be improved.

Summary of Embodiments 4-6

FIG. 48A illustrates a configuration of an information processing system according to one aspect of the present invention.

Information processing system 1000 includes detector 1001, behavior learning unit 1002, and behavior estimation unit 1003.

Detector 1001 is, for example, detector 6 according to Embodiments 1 to 3, and detects a vehicle environment state, which is at least one of surroundings of vehicle 1 or a driving state of vehicle 1. Behavior learning unit 1002 is behavior learning unit 401 or 421 according to Embodiments 4 to 6. Behavior learning unit 1002 causes a neural network to learn a relationship between the vehicle environment state detected by detector 1001 and a behavior of vehicle 1 implemented after the vehicle environment state.

Behavior estimation unit 1003 is behavior estimation unit 402 or 422 according to Embodiments 4 to 6. Behavior estimation unit 1003 estimates a behavior of vehicle 1 by inputting, into the learned neural network, the current vehicle environment state detected by detector 1001.

Information processing system 1000 may further include a notifier that notifies the driver of the behavior estimated by behavior estimation unit 1003, before implementing the behavior. This notifier is, for example, notifier 92 according to Embodiments 1 to 3.

With this, since the estimated behavior is notified, the driver can easily comprehend what sort of behavior is going to be implemented before it is implemented, which relieves any concern the driver may have.

Note that the vehicle may omit one or all of detector 1001, behavior learning unit 1002, and behavior estimation unit 1003, and instead may be provided external to the vehicle. Among these elements included in information processing system 1000, when a portion of the elements is included in the vehicle and the remaining portion is included external to the vehicle, the elements in and out of the vehicle perform their processes by, for example, communicating over a network such as the internet.

FIG. 48B is a flow chart of an information processing method according to one aspect of the present invention.

This information processing method includes steps S1001, S1002, and S1003.

In step S1001 a vehicle environment state is detected, which is at least one of surroundings of vehicle 1 or a driving state of vehicle 1. In step S1002, a neural network is caused to learn a relationship between the detected vehicle environment state and a behavior of vehicle 1 implemented after the vehicle environment state. In step S1003, a behavior of vehicle 1 is estimated by inputting, into the learned neural network, the detected current vehicle environment state.

With this, since a behavior of vehicle 1 is estimated using a neural network, the behavior (i.e., the driving conduct) of vehicle 1 can be appropriately estimated.

Embodiment 7

In Embodiments 1 to 3 described above, methods of determining which of a plurality of behavior candidates implementable by vehicle 1 is the most appropriate behavior were described. Moreover, in Embodiments 4 to 6, methods for determining the most appropriate behavior which used as neural network were described. In this embodiment, a method of determining the most appropriate behavior using a driver model built by preliminary learning will be described.

Here, a method of building a driver model will be described. A driver model is modeling of the tendency of a driver to perform an operation in each driving environment based on, for example, information of the frequency of the behavior. The driver model is built by aggregating a plurality of driver driving environment histories.

A driver driving environment history is, for example, a history in which the frequency of the behavior actually selected by the driver among the plurality of behavior candidates corresponding to the driving environments is aggregated for each behavior candidate.

FIG. 49 illustrates one example of a driving environment history. In FIG. 49, in a driving environment of "nearing a merging region", it is shown that the behavior candidates of "decelerate", "accelerate", and "change lanes" were selected 3 times, 1 time, and 5 times, respectively by driver x. Moreover, in FIG. 49, in a driving environment of "a slow vehicle ahead", it is shown that the behavior candidates of "follow", "overtake", and "change lanes" were selected 2 times, 2 times, and 1 time, respectively by driver x. The same types of statistics are also shown for driver y.

The driver driving environment history may include an aggregation of behaviors selected while autonomous driving, and may include an aggregation of behaviors implemented while the driver was manually driving. This makes it possible to collect a driving environment history in accordance with the driving state, i.e., where the vehicle was being autonomously or manually driven.

Driver models include clustering driver models in which driving environment histories for a plurality of drivers are clustered and built, and individual adaptive driver models in which a driver model for a specific driver (for example, driver x) is built from a plurality of driving environment histories that are similar to the driving environment history of driver x.

First, the clustering driver model will be described. The building method of the clustering driver model includes preliminarily aggregating driving environment histories for a plurality of drivers, as illustrated in FIG. 49. Then, a plurality of drivers whose driving environment histories have a high degree of similarity, that is to say, a plurality of drivers who have similar driving operation tendencies, are grouped to build the driver model.

FIG. 50 illustrates a method of building a clustering driver model. In FIG. 50, driving environment histories for drivers a through f are shown in a chart. From the driving environment histories for drivers a through a, model A is built from the driving environment histories for drivers a through c, and model B is built from the driving environment histories for drivers d through f.

The degree of similarity in driving environment histories may be treated as a frequency distribution of the frequencies (values) in the driving environment histories for driver a and driver b, and a correlation value for both frequency distributions may be calculated, and the calculated correlation value may be used as the degree of similarity. In such cases, for example, when the correlation value calculated from the driving environment histories for driver a and driver b exceeds a predetermined value, the driving environment histories for driver a and driver b are grouped together.

Note that the calculation of the degree of similarity is not limited to this example. For example, in each driving environment history for driver a and driver b, the degree of similarity may be calculated based on the number of behaviors having the highest frequency that match.

Then the clustering driver model is built by calculating an average for each frequency in the driving environment histories of the drivers in the same group, for each group.

FIG. 51 illustrates one example of a built clustering driver model. In the driving environment histories of the drivers in each group in FIG. 50, the average of each frequency is calculated to calculate a driving environment history average frequency for the group. In this way, the clustering driver model is built using an average frequency for a behavior defined per driving environment.

Note that the driver model may be built using only the highest frequency from among the calculated average frequencies. FIG. 52 illustrates one example of another built clustering driver model. As illustrated in FIG. 52, the most frequency behavior is selected per driving environment, and the driver model is built using the selected behavior.

Here, a usage method of the built clustering driver model will be described by giving an example.

The driver model illustrated in FIG. 51 is stored in storage 8 in vehicle 1 in advance. Moreover, vehicle controller 7 stores in advance in storage 8 the driving environment history for when driver y previously drove the vehicle. Note that driver y is identified using, for example, a camera (not illustrated in the drawings) installed in the cabin of the vehicle.

Vehicle controller 7 then calculates a degree of similarity between the driving environment history for driver y and each model driving environment history in the driver model, and determines which model is the most appropriate for driver y. For example, in the case of the driving environment history for driver y illustrated in FIG. 49 and the driver model illustrated in FIG. 51, vehicle controller 7 determines that model B is most appropriate for driver y.

During autonomous driving, in each driving environment in model B, vehicle controller 7 determines that the most frequent behavior is the most appropriate behavior for driver y, that is to say, is the primary behavior.

In this way, by building, in advance, a driver model from driving environment histories of a plurality of drivers, the driver can be notified of an even more appropriate behavior.

For example, as illustrated in FIG. 49, even when the frequency of a behavior for the driving environment "a slow vehicle ahead" in the driving environment history for driver y is 0, that is to say, even when the driver has never selected a behavior of "follow", "overtake", or "change lanes" in the driving environment "a slow vehicle ahead", vehicle controller 7 can determine "follow" as the primary behavior in the driving environment "a slow vehicle ahead", based on model B illustrated in FIG. 51.

Next, an individual adaptive driver model will be described. The building method of the individual adaptive driver model includes preliminarily aggregating driving environment histories for a plurality of drivers, as illustrated in FIG. 49, just like with the clustering driver model. Here, the point of difference with the clustering driver model is that the driver model is built for each driver. Hereinafter, an example will be given in which a driver model is built for driver y.

First, from among the aggregated driving environment histories for the plurality of drivers, a plurality of driver driving environment histories having a high degree of similarity with the driving environment history for driver y are extracted. Then, the driver model for driver y is built from the extracted driving environment histories for the plurality of drivers.

FIG. 53 illustrates a method of building an individual adaptive driver model. Just like in FIG. 50, in FIG. 53, driving environment histories for drivers a through f are shown in a chart. Moreover, in FIG. 53, it is shown that the driver model for driver y is built from the driving environment history for driver y illustrated in FIG. 49, and the driving environment histories for drivers c through e having a high degree of similarity.

The individual adaptive driver model is built by calculating an average for each frequency in the extracted driving environment histories for the drivers.

FIG. 54 illustrates one example of a built individual adaptive driver model. In the driving environment history for driver y illustrated in FIG. 49 and the driving environment histories for drivers c through e illustrated in FIG. 53, an average frequency is calculated for each behavior, in each driving environment. In this way, the individual adaptive driver model for driver y is build using average frequencies for behaviors corresponding to each driving environment.

Here, a usage method of the built individual adaptive driver model will be described by giving an example.

The driver model for driver y illustrated in FIG. 54 is stored in storage 8 in vehicle 1 in advance. Moreover, vehicle controller 7 stores in advance in storage 8 the driving environment history for when driver y previously drove the vehicle. Note that driver y is identified using, for example, a camera (not illustrated in the drawings) installed in the cabin of the vehicle.

During autonomous driving, in each driving environment in the driver model for driver y vehicle controller 7 determines that the most frequent behavior is the most appropriate behavior for driver y, that is to say is the primary behavior.

In this way, by building, in advance, a personal driver model from driving environment histories for a plurality of drivers, the driver can be notified of an even more appropriate behavior.

For example, as illustrated in FIG. 49, even when the frequency of a behavior for the driving environment "a slow vehicle ahead" in the driving environment history for driver y is 0, that is to say even when the driver has never selected a behavior of "follow", "overtake", or "change lanes" in the driving environment "a slow vehicle ahead", vehicle controller 7 can determine "change lanes" as the primary behavior in the driving environment "a slow vehicle ahead", based on the driver model illustrated in FIG. 54.

Next, an example in which driving characteristics (driving habits) of the driver are obtained and autonomous driving is implemented in accordance with the preferences of the driver. Generally, the actual movements (for example, the acceleration extent, deceleration extent, or steering wheel input amount) made to implement one behavior (for example, to change lanes) differs from driver to driver. Accordingly, by implementing autonomous driving in accordance with the preferences of the driver, the driver can have a more pleasant driving experience.

Note that in the following description, an example is given in which driving characteristics of the driver are obtained during manual driving, and the obtained driving characteristics are applied when autonomous driving is implemented, but the present invention is not limited to this example.

Vehicle controller 7 extracts feature amounts indicating driving characteristics of the driver from among driver input information from components in vehicle 1, and stores the feature amount in storage 8. Here, a feature amount is, for example, a feature amount related to speed, a feature amount related to steering, a feature amount related to input timing, a feature amount related to vehicle external detection, or a feature amount related to vehicle internal detection.

The feature amount related to speed includes, for example, the speed of the vehicle, acceleration, and deceleration, and these feature amounts are obtained from, for example, a speed sensor included in the vehicle.

The feature amount related to steering includes, for example, steering angle, angular velocity, and the acceleration of these, and these feature amounts are obtained from, for example, steering wheel 5.

The feature amount related to input timing includes, for example, the input timing of the brake pedal, accelerator, turn signal level, and steering wheel, and these feature amounts are obtained from brake pedal 2, accelerator pedal 3, turn signal lever 4, and steering wheel 5, respectively.

The feature amount related to vehicle external detection includes, for example, inter-vehicle distance, which is the distance between the host vehicle and a vehicle to the front, side, or back of the drier's vehicle, and this feature amount is obtained from sensor 62.

The feature amount related to vehicle internal detection includes personal recognition information indicating who the driver is and who the passengers are, and this feature amount is obtained from, for example, a camera installed inside the cabin of the vehicle.

For example, when the driver manually changes lanes, vehicle controller 7 detects that the driver manually changed lanes. The detection is performed by formulating rules in advance from time series data on lane change inputs, and analyzing time series data on the inputs obtained from, for example, CAN information. In this case, vehicle controller 7 obtains the above-described feature amounts. Vehicle controller 7 stores feature amounts for each driver in storage 8 and builds a driving characteristics model for each driver.

Note that vehicle controller 7 may build the above-described driver model based on the feature amounts for each driver. In other words, vehicle controller 7 extracts a feature amount related to speed, a feature amount related to steering, a feature amount related to input timing, a feature amount related to vehicle external detection, and a feature amount related to vehicle internal detection, and stores them in storage 8. Then, vehicle controller 7 may build a driver model associated with information on frequencies for each input and tendencies of each input by the driver for each driving environment, based on the feature amount stored in storage 8.

FIG. 55 illustrates one example of a driving characteristics model. In FIG. 55, feature amounts for each driver are shown in a chart. Moreover, in FIG. 55, the number of times each behavior was selected in the past is shown for each driver. Although only a portion of the feature amounts are entered in the chart, any or all of the above-described examples of the feature amounts may be entered in the chart.

Next, the feature amounts entered in FIG. 55 will be described in detail. The value for speed indicates the actually speed in steps. The steering wheel, brake, and accelerator values indicate input amounts in steps. These values are obtained by, for example, calculating average values for input amounts for speed, steering wheel, brake, and the accelerator, and expressing these average values in steps.

For example, in FIG. 55, when driver x changes lanes when there are no passengers in the vehicle, the speed level is 8, and the input amount levels for the steering wheel, brake, and accelerator are 4, 6, and 8, respectively.

Upon entering autonomous driving, vehicle controller 7 selects, from the driving characteristics model illustrated in FIG. 55, a driving characteristics model corresponding to the driver, behavior, and passengers, in accordance with who the driver is, what sort of behavior will be implemented, and who the passenger is or passengers are.

Then, vehicle controller 7 causes vehicle 1 to drive at the speed corresponding to the selected driving characteristics model, or controls vehicle 1 based on combinations of the steering wheel, brake, and accelerator input amounts and the timings thereof. This makes it possible to implement autonomous driving in accordance with the preferences of the driver. Note that the information in the driving characteristics model illustrated in FIG. 55 can be notified by notifier 92.

Figure 56:
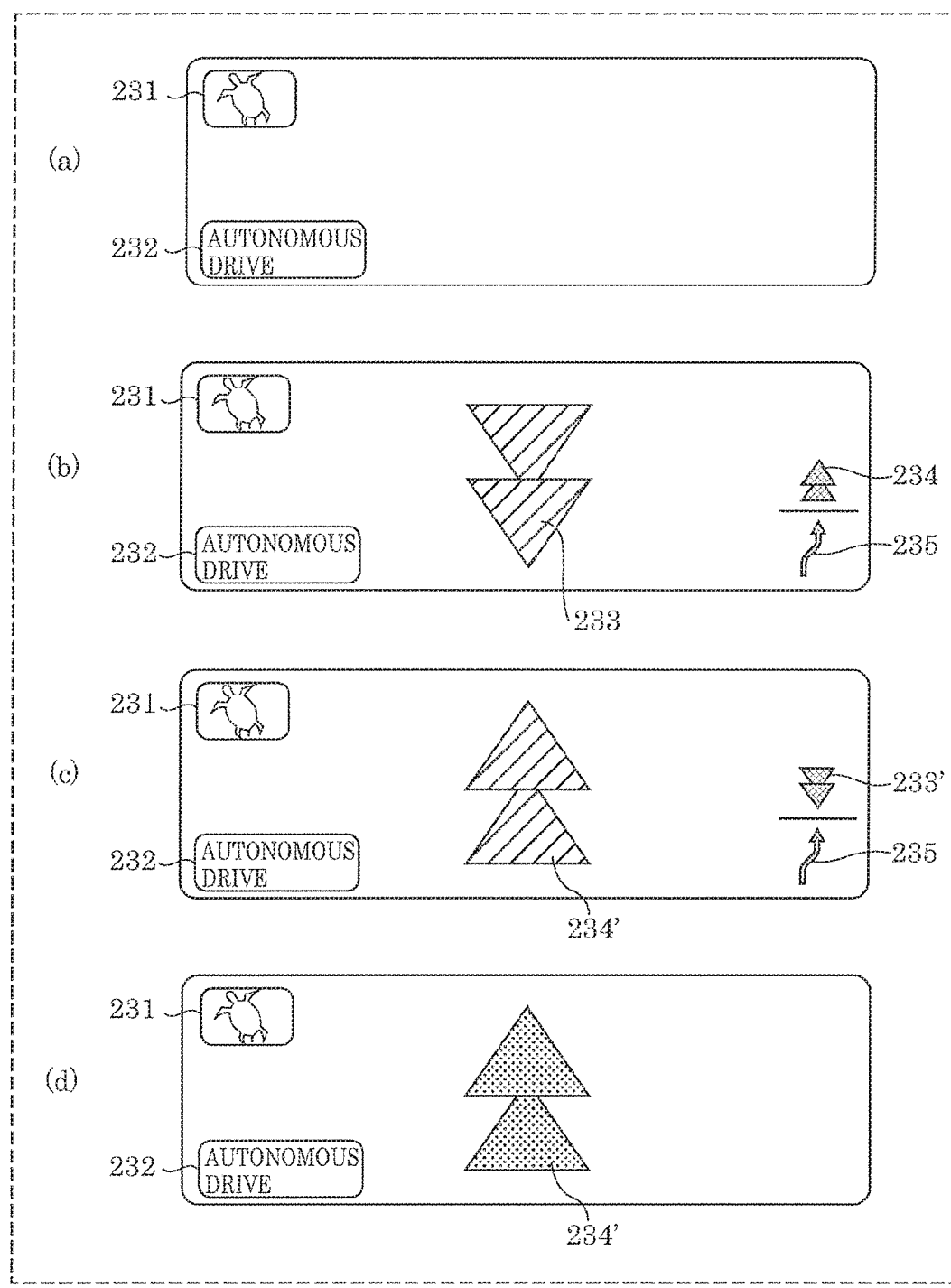
FIG. 56 illustrates screens displayed by a notifier according to Embodiment 7 of the present invention.

FIG. 56 illustrates screens displayed by notifier 92 according to Embodiment 7 of the present invention. The illustrations in FIG. 56 correspond to the first example of a driving environment illustrated in FIG. 5.

In (a) in FIG. 56, a screen displayed by notifier 92 during normal driving in which the changing of lanes and the acceleration or deceleration of the vehicle are unnecessary. In (a) in FIG. 56, symbol 231 indicating that a driving characteristic of the driver is "decelerates often" and symbol 232 indicating that autonomous driving is currently being implemented are displayed.

Vehicle controller 7 determines a driving characteristic of the driver based on, for example, the number of times each behavior was selected in the past as indicated in the driving characteristics model illustrated in FIG. 55. In these cases, vehicle controller 7 causes notifier 92 to display a screen including symbol 231 such as shown in FIG. 56 to a driver that "decelerates" often (i.e., a driver that selected "decelerate" a high number of times) as determined based on the driving characteristics.

Then, when vehicle controller 7 determines that the driving environment is the first example illustrated in FIG. 5, vehicle controller 7 determines that the primary behavior is "decelerate" based on the fact that the driving characteristic of the driver is "decelerates often", and causes notifier 92 to display the screen illustrated in (b) in FIG. 56.

In (b) in FIG. 56, symbol 233 indicating "decelerate", which is the primary behavior, is displayed in a first aspect (for example, in a first color). Moreover, symbol 234 indicating "accelerate", which is a secondary behavior, and symbol 235 indicating "change lanes", which is a secondary behavior, are displayed.

When the driver changes the behavior to "accelerate" using inputs such as those described in Embodiment 1, vehicle controller 7 causes notifier 92 to display the screen illustrated in (c) in FIG. 56.

In (c) in FIG. 56, symbol 234' indicating "accelerate", which is the selected behavior, is displayed in the first aspect. Moreover symbol 233' indicates that symbol 233 displayed as the primary behavior in (b) in FIG. 56 is displayed in place of symbol 234.

Vehicle controller 7 then causes notifier 92 to display the screen illustrated in (a) in FIG. 56, and after the second predetermined period of time has elapsed, subsequently causes notifier 92 to display the screen illustrated in (d) in FIG. 56. Here, in (d) in FIG. 56, symbol 234' selected by the driver as the next behavior and indicating "accelerate" is displayed in a second state.

When vehicle controller 7 determines that the next behavior is "accelerate", vehicle controller 7 reads feature amounts corresponding to the behavior "accelerate" from the driving characteristics model, and causes vehicle 1 to implement the behavior "accelerate" incorporated with the feature amounts.

Figure 57:
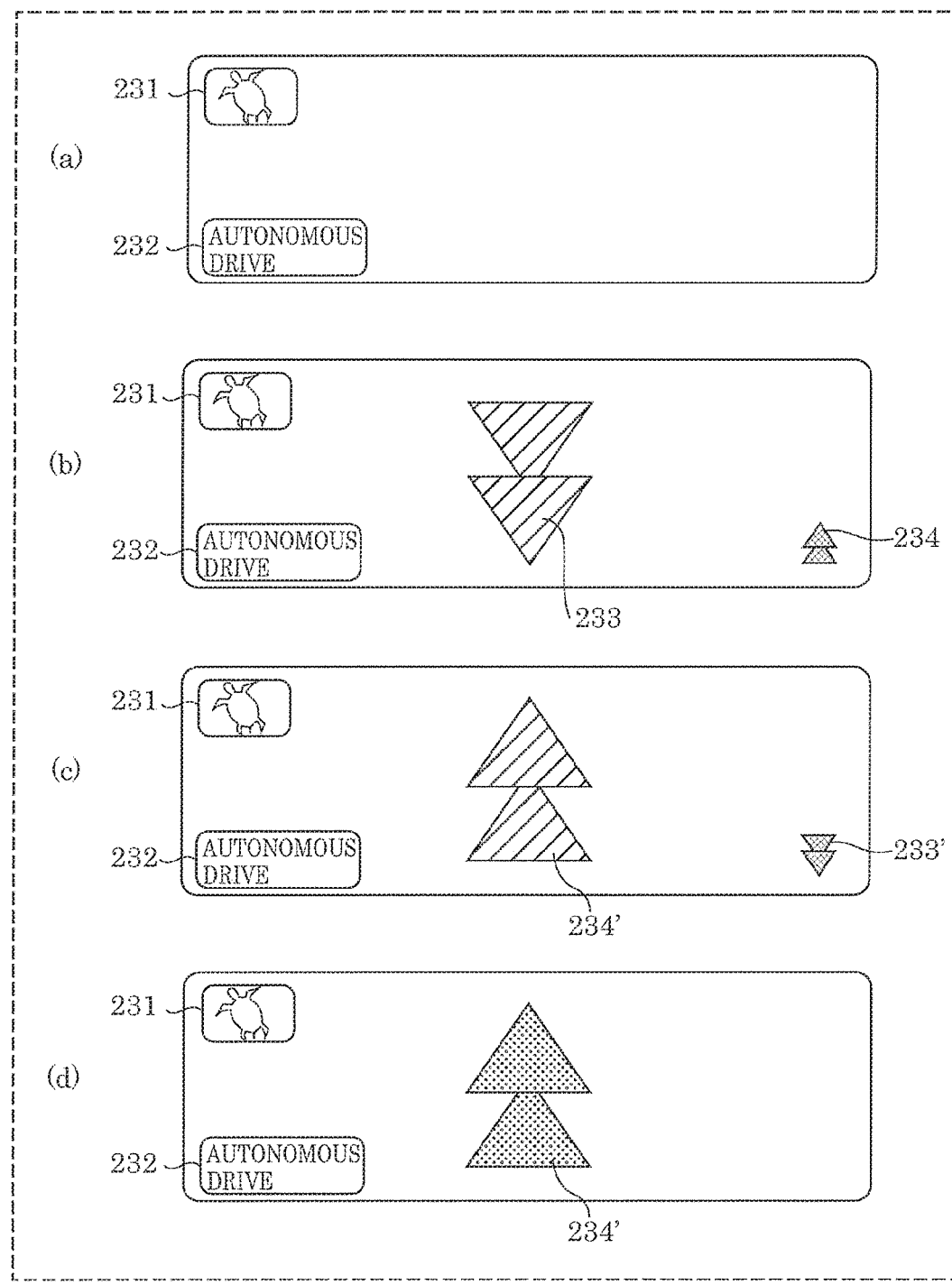
FIG. 57 illustrates screens displayed by a notifier according to Embodiment 7 of the present invention.

FIG. 57 illustrates screens displayed by notifier 92 according to Embodiment 7 of the present invention. The illustrations in FIG. 57 correspond to the second example of a driving environment illustrated in FIG. 7. Note that in FIG. 57, elements that are the same as in FIG. 56 share like reference marks, and detailed description thereof will be omitted. FIG. 57 is the same as FIG. 56 but with symbol 235 indicating "change lanes" removed.

As described before, in the second example (FIG. 7), in contrast to the first example (FIG. 5), since there is a vehicle driving to the right of vehicle 1, vehicle 1 cannot change lanes. Accordingly, in (b) and (c) in FIG. 57, "change lanes" is not displayed. Moreover, in the example illustrated in (c) in FIG. 57, just like in the example illustrated in (c) in FIG. 56, since "accelerate" is selected, vehicle controller 7 reads feature amounts corresponding to the behavior "accelerate" from the driving characteristics model, and causes vehicle 1 to implement the behavior "accelerate" incorporated with the feature amounts, just like in FIG. 56.

Figure 58:
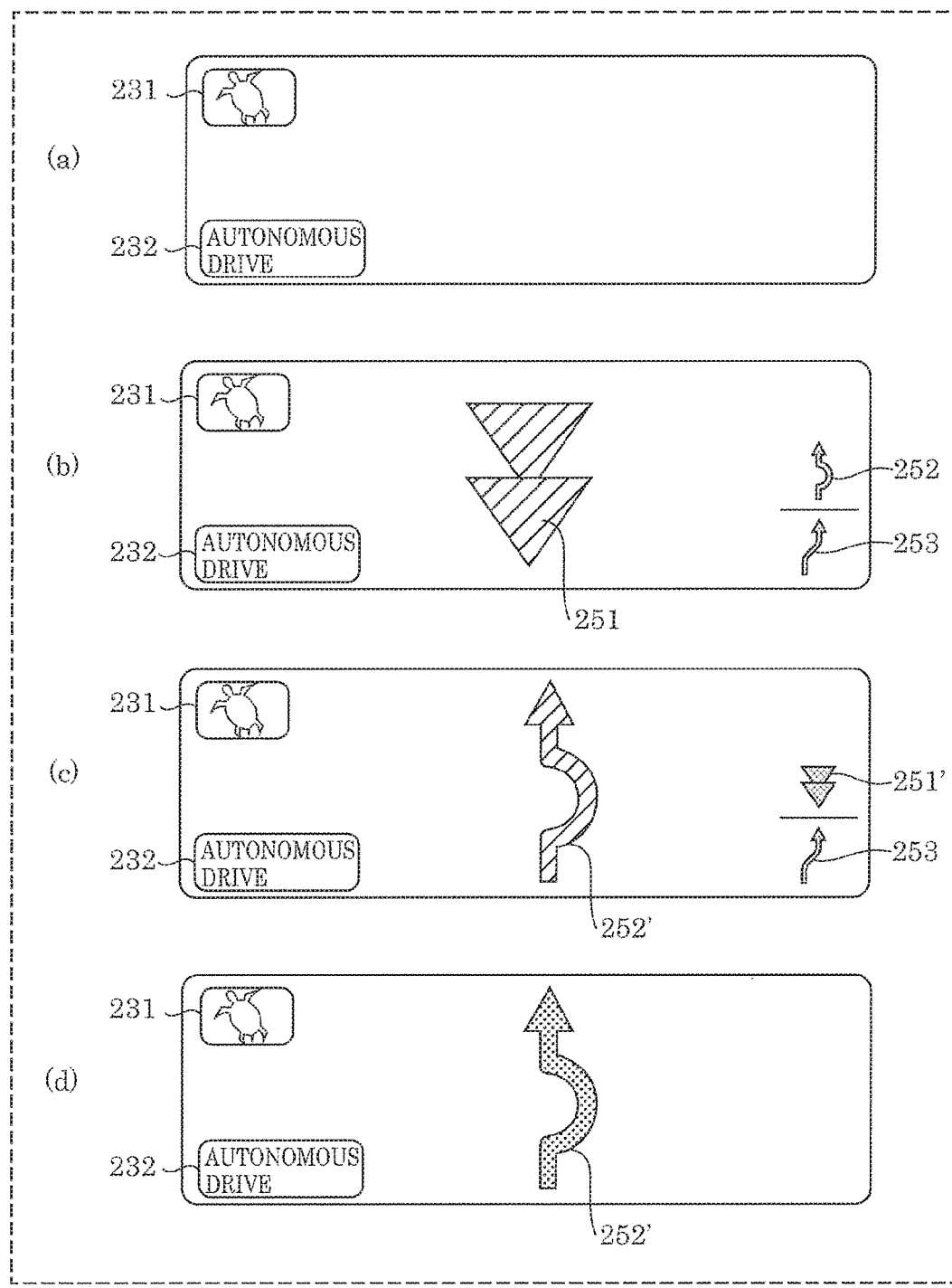
FIG. 58 illustrates screens displayed by a notifier according to Embodiment 7 of the present invention.

FIG. 58 illustrates screens displayed by notifier 92 according to Embodiment 7 of the present invention. The illustrations in FIG. 58 correspond to the third example of a driving environment illustrated in FIG. 8.

(a) in FIG. 58 is the same as (a) in FIG. 56. When vehicle controller 7 determines that the driving environment is the third example illustrated in FIG. 8, vehicle controller 7 determines "decelerate" to be the primary behavior based on the fact that the driving characteristic of the driver is "decelerates often", and causes notifier 92 to display the screen illustrated in (b) in FIG. 58.

In (b) in FIG. 58, symbol 251 indicating "decelerate", which is the primary behavior, is displayed in a first aspect (for example, in a first color). Moreover, symbol 252 indicating "overtake", which is a secondary behavior, and symbol 253 indicating "change lanes", which is a secondary behavior, are displayed.

When the driver changes the behavior to "overtake" using inputs such as those described in Embodiment 1, vehicle controller 7 causes notifier 92 to display the screen illustrated in (c) in FIG. 58.

In (c) in FIG. 58, symbol 252' indicating "overtake", which is the selected behavior, is displayed in the first aspect. Moreover symbol 251' indicates that symbol 251 displayed as the primary behavior in (b) in FIG. 58 is displayed in place of symbol 252.

Vehicle controller 7 then causes notifier 92 to display the screen illustrated in (a) in FIG. 58, and after the second predetermined period of time has elapsed, subsequently causes notifier 92 to display the screen illustrated in (d) in FIG. 58. Here, in (d) in FIG. 58, symbol 252' selected by the driver as the next behavior and indicating "overtake" is displayed in a second state.

When vehicle controller 7 determines that the next behavior is "overtake", vehicle controller 7 reads feature amounts corresponding to the behavior "overtake" from the driving characteristics model, and causes vehicle 1 to implement the behavior "accelerate" incorporated with the feature amounts.

Next, an example of screens displayed when a driving characteristic of the driver is not "decelerates often".

Figure 59:
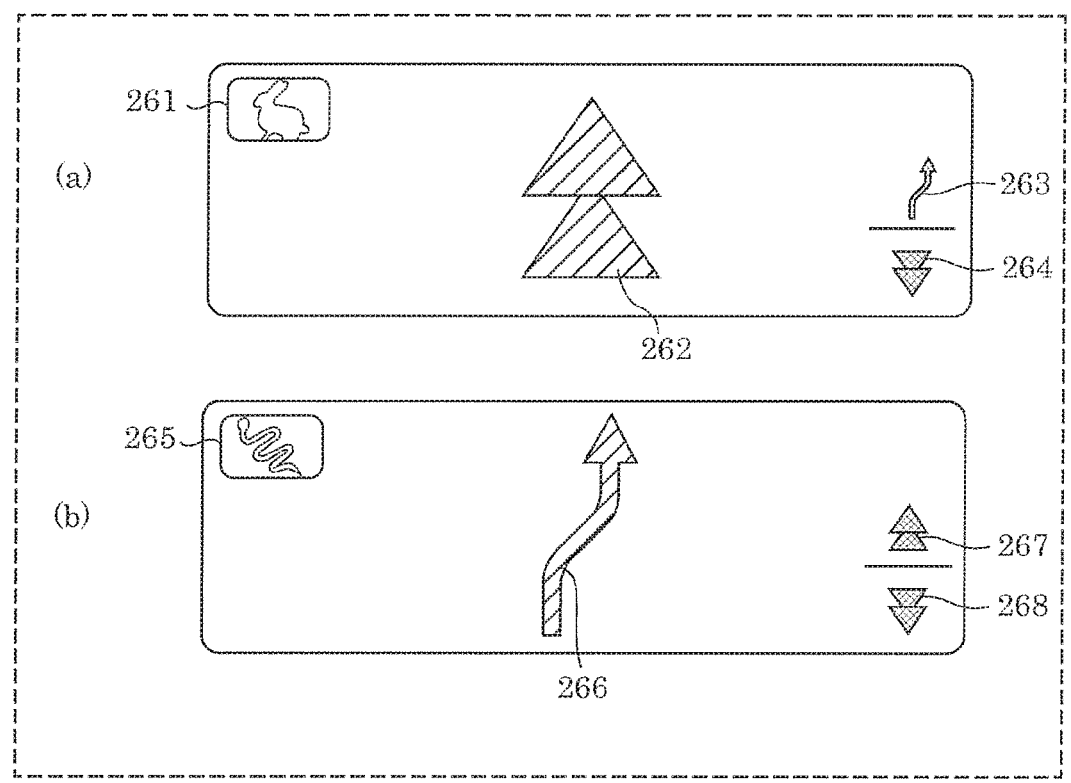
FIG. 59 illustrates screens displayed by a notifier according to Embodiment 7 of the present invention.

FIG. 59 illustrates screens displayed by notifier 92 according to Embodiment 7 of the present invention. The illustrations in FIG. 59 correspond to the first example of a driving environment illustrated in FIG. 5. Note that (a) in FIG. 59 illustrates an example of when a driving characteristic of the driver is "accelerates often", and (b) in FIG. 59 illustrates an example of when a driving characteristic of the driver is "changes lanes often".

In (a) in FIG. 59, symbol 261 indicating that a driving characteristic of the driver is "accelerates often" is displayed. Moreover, symbol 262 indicating "accelerate", which is a primary behavior, is displayed in a first aspect (for example, in a first color). Moreover, symbol 263 indicating "change lanes", which is a secondary behavior, and symbol 264 indicating "decelerate", which is a secondary behavior, are displayed.

Vehicle controller 7 causes notifier 92 to display a screen including symbol 261 such as shown in (a) FIG. 59 to a driver that "accelerates" often (i.e., a driver that selected "accelerate" a high number of times) as determined based on the driving characteristics. Moreover, vehicle controller 7 determines "accelerate" to be the primary behavior based on the fact that the driving characteristic of the driver is "accelerates often", and causes notifier 92 to display the screen illustrated in (a) in FIG. 59.

In (b) in FIG. 59, symbol 265 indicating that a driving characteristic of the driver is "changes lanes often" is displayed. Moreover, symbol 266 indicating "change lanes", which is a primary behavior, is displayed in a first aspect (for example, in a first color). Moreover, symbol 267 indicating "accelerate", which is a secondary behavior, and symbol 268 indicating "decelerate", which is a secondary behavior, are displayed.

For example, vehicle controller 7 causes notifier 92 to display a screen including symbol 265 such as shown in (b) FIG. 59 to a driver that "changes lanes" often (i.e., a driver that selected "change lanes" a high number of times) as determined based on the driving characteristics. Vehicle controller 7 determines "change lanes" to be the primary behavior based on the fact that the driving characteristic of the driver is "changes lanes often", and causes notifier 92 to display the screen illustrated in (b) in FIG. 59.

Hereinbefore, an example using only the driving characteristics model was given, but the driver model may be used in addition to the driving characteristics model, and in FIG. 56, FIG. 58, and FIG. 59, symbol 231 may indicate the type of driver model selected from the input history for the driver. For example, regarding the first example of the driving environment illustrated in FIG. 5, for a driver model that applies to a driver that often selects "decelerate", notifier 92 is caused to display a screen including symbol 231 such as in FIG. 56, and "decelerate" is determined to be the primary behavior. For a driver model that applies to a driver that often selects "accelerate", notifier 92 is caused to display a screen including symbol 261 such as in (a) in FIG. 59, and "accelerate" is determined to be the primary behavior. For a driver model that applies to a driver that often selects "change lanes", notifier 92 is caused to display a screen including symbol 261 such as in (a) in FIG. 59, and "change lanes" is determined to be the primary behavior.

With this embodiment described above, upon determining a future behavior for the vehicle, it is possible to learn the driving environment history of the driver and incorporate the result of the learning into the determination of the future behavior. Moreover, upon the vehicle controller controlling the vehicle, the driving characteristics (driving preferences) of the driver can be learned and this can be applied to the control of the vehicle.

With this, the vehicle can control autonomous driving using timings and input amounts preferred by the driver or passengers, and can inhibit the intervention of unnecessary inputs by the driver during autonomous driving without discrepancy in sensation of when the driver is driving manually.

Note that in the present invention, the functions implemented by vehicle controller 7 may be implemented by a server such as a cloud server. Moreover, storage 8 may be installed in a server such as a cloud server instead of in vehicle 1. Alternatively, storage 8 may store already built driver models and vehicle controller 7 may refer to the driver models stored in storage 8 to determine a behavior.

In this way, in Embodiment 7, vehicle controller 7 is described as obtaining information on a feature amount indicating a driving characteristic of the driver, storing the information on the feature amount in storage 8, and based on information on feature amounts stored in storage 8, building, for each vehicle driving environment, a driver model indicating tendencies of the behaviors of the vehicle selected by the driver using frequencies of each behavior selected.

Moreover, vehicle controller 7 is described as grouping drivers that select similar behaviors together and building a driver model for each vehicle driving environment, for each group.

Moreover, vehicle controller 7 is described as calculating average values of frequencies of behaviors selected by the drivers in each group of drivers that perform similar inputs, and building, for each vehicle driving environment, a driver model indicating tendencies of the behaviors of the vehicle selected by the driver using the calculated average values.

Moreover, vehicle controller 7 is described as building a driver model for each vehicle driving environment based on a vehicle behavior selected by a second driver whose tendencies are similar to tendencies of vehicle behaviors selected by a specific driver, the driver model indicating the tendencies of the vehicle behavior selected by the above-described specific driver using frequencies of each behavior selected.

With this, vehicle controller 7 can build an appropriate driver model from the driving tendencies of the driver, and based on the built driver model, can implement autonomous driving that is even more appropriate for the driver.
(Driver Model Variation)

Note that the driver model described above is modeling of the tendency of a driver to perform an input (behavior) in each driving environment based on, for example, information on the frequency of each input, but the present invention is not limited to this example.

For example, the driver model may be built based on a driving environment history that associates environment parameters indicating past a driving environment (i.e., situation) with an input (behavior) actually selected by the driver in the driving environment. By incorporating the environment parameters into the driver model, the detection and classification of a driving environment can be performed separately, and a selection can be made without having to input (store) the result of the classification into the driver model. More specifically, the differences between the driving environments illustrated in FIG. 56 and FIG. 57 are obtained as environment parameters, and by directly inputting (storing) them into the driver model, "accelerate", "decelerate", and "change lanes" become selections in FIG. 56, and "accelerate" and "decelerate" become selections in FIG. 57. Hereinafter, an example will be given in which such a driver model is built. Note that the driver model described below may also be called a "situation database".

Here, the driving environment history for building the driver model according to this variation will be described. FIG. 60 illustrates one example of a driving environment history. In the driving environment history illustrated in FIG. 60, environment parameters indicating driving environments in which the vehicle driven by driver x has driven in the past are associated with inputs (behaviors) actually selected by the driver in the associated driving environment.

Each set of environment parameters (a) through (c) in the driving environment history illustrated in FIG. 60 indicate, for example, a driving environment corresponding to when vehicle behaviors are presented to the driver such as in (b) in FIG. 8, (b) in FIG. 5, and (b) in FIG. 7, respectively. These environment parameters in the driving environment history are obtained from detected information and infrastructure information.

Detected information is information detected by, for example, a sensor or radar included in the vehicle. Infrastructure information is, for example, GPS information, map information, or information obtained by Vehicle Information and Communication System.

For example, the environment parameters in the driving environment history illustrated in FIG. 60 include: "host vehicle information"; "leading vehicle information" indicating information on the vehicle driving in front of and in the same lane as host vehicle a; "adjacent lane information" indicating information on a lane adjacent to the lane in which the host vehicle is driving; "merge lane information" indicating information on a merge lane when there is a merge lane in the location where the host vehicle e is driving; and "positional information" indicating information on the location of the host vehicle and the surroundings of that location. The environmental parameters may also include information on a vehicle behind the host vehicle. In such cases, the relative speeds of the rear vehicle and the host vehicle, distance between the fronts of the vehicles, and the rate of change in the distance between the fronts of the vehicles may be used. The environmental parameters may also include information on the presence of a vehicle.

For example, "host vehicle information" includes information on the speed Va of the host vehicle. "Leading vehicle information" includes information on the relative speed Vba of the leading vehicle b to the host vehicle, information on the inter-vehicle distance DRba between the leading vehicle and the host vehicle, and information on the rate of change RSb in the size of the leading vehicle.

Here, the speed Va of the host vehicle is detected by a speed sensor included in the host vehicle. The relative speed Vba and the inter-vehicle distance DRba are detected by, for example, a sensor or radar. The rate of change RSb in size is calculated as $RSb=-Vba/DRba$.

"Adjacent lane information" includes information on diagonally rearward vehicle c driving in an adjacent lane and behind the host vehicle, information on diagonally forward vehicle d driving in an adjacent lane and in front of the host vehicle, and information on the residual adjacent lane length DRda of the host vehicle.

The information on the diagonally rearward vehicle includes the relative speed Vca of the diagonally rearward vehicle relative to the host vehicle, the distance Dca between the fronts of the diagonally rearward vehicle and the host vehicle, and the rate of change Rca in the distance between the fronts of the vehicles. The distance Dca between the fronts of the diagonally rearward vehicle and the host vehicle is the distance between the nose (front) of the host vehicle measured in a direction along the direction of travel of the host vehicle (and the diagonally rearward vehicle) and the nose (front) of the diagonally rearward vehicle. Note that the distance between the fronts of the vehicles may be calculated from the inter-vehicle distance and the vehicle lengths. Moreover, the inter-vehicle distance may be used instead of the distance between the fronts of the vehicles.

Here, the relative speed Vca and the distance Dca between the fronts of the vehicles are detected by for example, a sensor or radar. The rate of change Rca in the distance between the fronts of the vehicles is calculated as $Rca=Vca/Dca$.

The information on the diagonally forward vehicle includes the relative speed Vda of the diagonally forward vehicle relative to the host vehicle, the distance Dda between the fronts of the diagonally forward vehicle and the host vehicle, and the rate of change Rda in the distance between the fronts of the vehicles. The distance Dda between the fronts of the diagonally forward vehicle and the host vehicle is the distance between the nose (front) of the host vehicle measured in a direction along the direction of travel of the host vehicle (and the diagonally forward vehicle) and the nose (front) of the diagonally forward vehicle.

The relative speed Vda and the distance Dda between the fronts of the vehicles are detected by, for example, a sensor or radar. The rate of change Rda in the distance between the fronts of the vehicles is calculated as $Rda=Vda/Dda$.

The residual adjacent lane length DRda for the host vehicle is a parameter indicating the probability that the host vehicle will change lanes to an adjacent lane. More specifically, when the distance between the nose (front) of the host vehicle measured in a direction along the direction of travel of the host vehicle (and the diagonally forward vehicle) and the rear of the diagonally forward vehicle is longer than the inter-vehicle distance DRba between the leading vehicle and the host vehicle, the residual adjacent lane length DRda for the host vehicle is the distance between the nose (front) of the host vehicle and the rear of the diagonally forward vehicle, and when the distance between the nose (front) of the host vehicle and the rear of the diagonally forward vehicle is less than DRba, the DRda is DRba. The residual adjacent lane length DRda for the host vehicle is detected by, for example, a sensor or radar.

"Merge lane information" includes information on the relative speed Vma of a margining vehicle relative to the host vehicle, information on the distance Dma between the fronts of the merging vehicle and the host vehicle, information on the rate of change Rma in the distance between the fronts of the vehicles. Here, the distance Dma between the fronts of the merging vehicle and the host vehicle is the distance between the nose (front) of the host vehicle measured in a direction along the direction of travel of the host vehicle (and the merging vehicle) and the nose (front) of the merging vehicle.

The relative speed Vma and the distance Dma between the fronts of the vehicles are detected by, for example, a sensor or radar. The rate of change Rma in the distance between the fronts of the vehicles is calculated as Rma=Vma/Dma.

In the driving environment history example illustrated in FIG. 60, values indicating the speed, distance, and rate of change described above are classified into one of a plurality of levels, and values indicating the levels into which the values are classified are stored in the driving environment history. Note that the values indicating the speed, distance, and rate of change may be stored as-is without being classified into levels.

The positional information includes information such as "host vehicle positional information", "number of driving lanes", "lane in which host vehicle is driving", "distance until start/end of merging section", "distance until start/end of divergence", "distance until start/end of construction section", "distance until start/end of section where lane ends", and "distance until scene of accident". In FIG. 60, "lane in which host vehicle is driving" (indicated as "driving lane" in FIG. 60) and "distance until start/end of merging section" are given as positional information examples.

For example, in the "host vehicle positional information" column, value information indicating longitude and latitude coordinates obtained by GPS are stored. In the "number of driving lanes" column, the number of driving lanes on the road being driven on is stored. In the "lane in which host vehicle is driving" column, value information indicating the position of the lane being driven in is stored. In the "distance until start/end of merging section" column, when there is a start or end of a merging section within a predetermined distance, the distance until start or end of the merging section is classified into one of a plurality of predetermined levels, and the level into which it is classified is stored. Note that when there is no start or end of a merging section within the predetermined distance, "0" is stored in the "distance until start/end of merging section" column.

In the "distance until start/end of divergence" column, when there is a start or end of a divergence within a predetermined distance, the distance until start or end of the divergence is classified into one of a plurality of predetermined levels, and the level into which it is classified is stored. Note that when there is no start or end of a divergence within the predetermined distance, "0" is stored in the "distance until start/end of divergence" column. In the "distance until start/end of construction section" column, when there is a start or end of a construction section within a predetermined distance, the distance until start or end of the construction section is classified into one of a plurality of predetermined levels, and the level into which it is classified is stored. Note that when there is no start or end of a construction section within the predetermined distance, "0" is stored in the "distance until start/end of construction section" column.

In the "distance until start/end of section where lane ends" column, when there is a start or end of a section where the lane ends within a predetermined distance, the distance until start or end of the section where the lane ends is classified into one of a plurality of predetermined levels, and the level into which it is classified is stored. Note that when there is no start or end of a section where the lane ends within the predetermined distance, "0" is stored in the "distance until start/end of section where lane ends" column.

In the "distance until scene of accident" column, when there is a scene of an accident within a predetermined distance, the distance until the scene of the accident is classified into one of a plurality of predetermined levels, and the level into which it is classified is stored. Note that when there is no scene of an accident within the predetermined distance, "0" is stored in the "distance until scene of accident" column.

The positional information may further include information on which of the lanes of the road on which the host vehicle is driving is the merging lane, diverging lane, construction lane, ending lane, or accident lane.

Note that the driving environment history illustrated in FIG. 60 is merely one example, and the present invention is not limited to this example. For example, when the adjacent lane information described above is right lane information, the driving environment history may further include "left lane information", which is the adjacent lane on the opposite side.

"Left lane information" includes information on a diagonally rearward vehicle to the left that is driving in the lane to the left of the host vehicle and behind the host vehicle, information on a diagonally forward vehicle to the left that is driving in the lane to the left of the host vehicle and in front of the host vehicle, and information on the residual left lane length DRda of the host vehicle.

The information on the diagonally rearward vehicle to the left includes the relative speed Vfa of the diagonally rearward vehicle to the left relative to the host vehicle, the distance Dfa between the fronts of the diagonally rearward vehicle to the left and the host vehicle, and the rate of change Rfa in the distance between the fronts of the vehicles. The distance Dfa between the fronts of the diagonally rearward vehicle to the left and the host vehicle is the distance between the nose (front) of the host vehicle measured in a direction along the direction of travel of the host vehicle (and the diagonally rearward vehicle to the left) and the nose (front) of the diagonally rearward vehicle to the left.

Here, the relative speed Vfa and the distance Dfa between the fronts of the vehicles are detected by, for example, a sensor or radar. The rate of change Rfa in the distance between the fronts of the vehicles is calculated as Rfa=Vfa/Dfa.

The information on the diagonally forward vehicle to the left includes the relative speed Vga of the diagonally forward vehicle to the left relative to the host vehicle, the distance Dga between the fronts of the diagonally forward vehicle to the left and the host vehicle, and the rate of change Rga in the distance between the fronts of the vehicles. The distance Dga between the fronts of the diagonally forward vehicle to the left and the host vehicle is the distance between the nose (front) of the host vehicle measured in a direction along the direction of travel of the host vehicle (and the diagonally forward vehicle to the left) and the nose (front) of the diagonally forward vehicle to the left.

Here, the relative speed Vga and the distance Dga between the fronts of the vehicles are detected by, for example, a sensor or radar. The rate of change Rga in the distance between the fronts of the vehicles is calculated as Rga=Vga/Dga.

Note that here, the examples in the description assume that the directionality of traffic is left-hand traffic, but the same processes may be applied to left-hand traffic by reversing "right" and "left".

Moreover, the driving environment history illustrated in FIG. 60 may include "rearward vehicle information" indicating information on vehicles driving in the same lane as the host vehicle and behind the host vehicle.

The rearward vehicle information includes the relative speed Vea of the vehicle to the behind the host vehicle, relative to the host vehicle, the distance Dea between the fronts of the vehicle behind the host vehicle and the host vehicle, and the rate of change Rea in the distance between the fronts of the vehicles. The distance Dea between the fronts of the vehicle behind the host vehicle and the host vehicle is the distance between the nose (front) of the host vehicle measured in a direction along the direction of travel of the host vehicle (and the vehicle behind the host vehicle) and the nose (front) of the vehicle behind the host vehicle.

Here, the relative speed Vea and the distance Dea between the fronts of the vehicles are detected by, for example, a sensor or radar. The rate of change Rea in the distance between the fronts of the vehicles is calculated as Rea=Vea/Dea.

Note that when, for example, the distance between the fronts of the vehicles cannot be measured due to view being blocked by a moving object, instead of the distance between the fronts of the vehicles, measurable inter-vehicle distance may be used, an approximate value obtained by adding a predetermined vehicle length to the inter-vehicle distance may be used, and the distance between the fronts of the vehicles may be calculated by adding a vehicle length associated with the type of vehicle recognized to the inter-vehicle distance. Moreover, regardless of whether the distance between the fronts of the vehicles can be measured or not, instead of the distance between the fronts of the vehicles, measurable inter-vehicle distance may be used, an approximate value obtained by adding a predetermined vehicle length to the inter-vehicle distance may be used, and the distance between the fronts of the vehicles may be calculated by adding a vehicle length associated with the type of vehicle recognized to the inter-vehicle distance.

The driving environment history may include other various information on the driving environment of the vehicle. For example, the driving environment history may include information on the size and/or type of the leading vehicle, an adjacent vehicle, and/or a merging vehicle, and information on the position of the leading vehicle, an adjacent vehicle, and/or a merging vehicle relative to the host vehicle. For example, the type of a vehicle approaching from the rear may be recognized using a camera sensor, and when the vehicle is an emergency vehicle, the driving environment history may include information indicating that the vehicle is an emergency vehicle. This makes it possible to notify information for dealing with the emergency vehicle. Alternatively as illustrated in FIG. 55, the driving environment history may include values indicating input amounts, expressed in steps, for the steering wheel, brake, and accelerator; and information on passengers.

Moreover, the driver driving environment history may include an aggregation of behaviors selected while autonomous driving, and may include an aggregation of behaviors implemented while the driver was manually driving. This makes it possible to collect a driving environment history in accordance with the driving state, i.e., where the vehicle was being autonomously or manually driven.

Moreover, in the example in FIG. 60, the environment parameters included in the driving environment history are exemplified as parameters indicating the driving environment at the time the associated behavior of the vehicle was shown to the driver, but the environment parameters may be parameters indicating the driving environment at the time driver selected the associated behavior. Alternatively, the driving environment history may include both environment parameters that indicate the driving environment at the time the associated behavior of the vehicle was shown to the driver and environment parameters that indicate the driving environment at the time driver selected the associated behavior.

Furthermore, when vehicle controller 7 generates the bird's-eye views illustrated in (a) in FIG. 2, (a) in FIG. 5, (a) in FIG. 6, (a) in FIG. 7, (a) in FIG. 8, (a) in FIG. 9, and (a) in FIG. 10, or the display illustrated in (c) in FIG. 14, vehicle controller 7 may also generate, as notification information, at least one of information on environment parameters that are highly contributed and information relating to those environment parameters (for example, icons), which are factors for the selection of the primary behavior and secondary behaviors, and may cause notifier 92 to notify of the notification information by, for example, displaying the generated notification information on top of the bird's-eye view.

In these cases, for example, if the contribution of the inter-vehicle distance DRba between the leading vehicle and the host vehicle and/or the rate of change RSb in the size of the leading vehicle is high, vehicle controller 7 may display a region in which the brightness has been increased or the color has been changed between the leading vehicle and the host vehicle in the bird's-eye view, and cause notifier 92 to notify the driver with notification information.

Moreover, vehicle controller 7 may display, as notification information, an icon indicating that the contribution of the inter-vehicle distance DRba between the leading vehicle and the host vehicle and/or the rate of change RSb is high. Vehicle controller 7 may further cause notifier 92 to depict a line segment connecting the leading vehicle and the host vehicle on the bird's-eye view as the notification information or cause notifier 92 to depict line segments connecting all surrounding vehicles to the host vehicle as the notification information, and highlight the line segment connecting the leading vehicle and the host vehicle on the bird's-eye view.

Moreover, instead of a bird's-eye view, vehicle controller 7 may cause notifier 92 to display an augmented reality (AR) display in which, in an image from the perspective of the driver, the region between the leading vehicle and the host vehicle has been brightened more so than the surrounding regions or the color has been changed to a different color than that of the surrounding regions, as the notification information. Moreover, in the perspective image, vehicle controller 7 may cause notifier 92 to display an AR display including, as the notification information, an icon indicating a high contribution environment parameter in the region between the leading vehicle and the host vehicle.

Moreover, in the perspective image, vehicle controller 7 may display an AR display in which a line segment connecting the leading vehicle and the host vehicle is depicted as the notification information or display an AR display in which line segments connecting all surrounding vehicles to the host vehicle are depicted as the notification information, and highlight the line segment connecting the leading vehicle and the host vehicle.

Note that the method of notifying the driver of the high-contribution environment parameters or of information related to the high-contribution environment parameters is not limited to the above method. For example, vehicle controller 7 may generate, as the notification information, an image in which the leading vehicle associated with the high-contribution environment parameters is displayed highlighted, and cause notifier 92 to display the image.

Moreover, vehicle controller 7 may generate, as the notification information, in a bird's-eye view or AR display, information indicating the direction of, for example the leading vehicle associated with the high-contribution environment parameters, and display that information on the host vehicle or in the region surrounding the host vehicle.

Moreover, instead notifying the driver of the high-contribution environment parameters or of information related to the high-contribution environment parameters, for example, display of a leading vehicle associated with low-contribution environment parameters may be subdued by vehicle controller 7 by, for example, reducing the brightness, to thereby generate, as the notification information, information on high-contribution environment parameters or information related to the high-contribution environment parameters, and vehicle controller 7 may cause notifier 92 to display the generated information.

Next, building of a driver model based on the driving environment history of a driver will be described. Driver models include clustering driver models in which driving environment histories for a plurality of drivers are clustered and built, and individual adaptive driver models in which a driver model for a specific driver (for example, driver x) is built from a plurality of driving environment histories that are similar to the driving environment history of driver x.

First, the clustering driver model will be described. The building method of the clustering driver model includes preliminarily aggregating driving environment histories for each driver, such as the driving environment history illustrated in FIG. 60. Then, a plurality of drivers whose driving environment histories have a high degree of similarity, that is to say, a plurality of drivers who have similar driving operation tendencies, are grouped to build the driver model.

For example, when the behaviors in the driving environment histories for driver a and driver b are converted into numerical values based on a predetermined rule, the degree of similarity between driving environment histories can be determined from a correlation value of vectors whose elements are the environment parameter values and the behavior values. In such cases, for example, when the correlation value calculated from the driving environment histories for driver a and driver b exceeds a predetermined value, the driving environment histories for driver a and driver b are grouped together. Note that the calculation of the degree of similarity is not limited to this example.

Next, an individual adaptive driver model will be described. The building method of the individual adaptive driver model includes preliminarily aggregating driving environment histories for a plurality of drivers, as illustrated in FIG. 60, just like with the clustering driver model. Here, the point of difference with the clustering driver model is that the driver model is built for each driver. For example, when a driver model is built for driver y, the driving environment history for driver y is compared with driving environment histories for a plurality of other drivers, and those driving environment histories for drivers having high degrees of similarity are extracted. Then, the individual adaptive driver model for driver y is built from the extracted driving environment histories for the plurality of drivers.

Note that a driver model (situation database) based on the driving environment history illustrated in FIG. 60 is not limited to a clustering driver model or a individual adaptive driver model, and may be, for example, built so as to include the driving environment histories for all drivers.

Here, a usage method of the built driver model will be described by giving an example. Hereinafter, an example will be given in which a driver model of aggregated driving environment histories for four drivers a through d is used for driver x. Note that the driver model is built by vehicle controller 7.

FIG. 61 illustrates a usage method of a driver model according to this variation. In FIG. 61, (a) illustrates environment parameters indicating the current driving environment of the vehicle driven by driver x. In FIG. 61, (a) illustrates one example of a driver model for driver x.

As illustrated in (a) in FIG. 61, a behavior (input) for environment parameters indicating the current driving environment is graphed. Vehicle controller 7 obtains the environment parameters at predetermined intervals, and determines the next behavior from the driver model illustrated in (b) in FIG. 61 using a number of the environment parameters as triggers.

The "trigger" may be an environment parameter indicating that a vehicle input needs to be changed, such as when the distance until the start of a merging section is a predetermined distance or less away, or the relative speed relative to the leading vehicle is a predetermined value or less.

Vehicle controller 7 compares the environment parameters illustrated in (a) in FIG. 61 with the environment parameters in the driving environment histories for the driver models illustrated in (b) in FIG. 61, and the behavior associated with the most similar environment parameters is determined to be the primary behavior. Moreover, other behaviors associated with other similar environment parameters are determined to be secondary behaviors.

Whether environment parameters are similar or not is determined from a correlation value of vectors whose elements are environment parameter values. For example, when a correlation value calculated from a vector whose elements are the environment parameter values illustrated in (a) in FIG. 61 and a vector whose elements are the environment parameter values illustrated in (b) in FIG. 61 exceeds a predetermined value, those environment parameters are determined to be similar. Note that the method for determining whether or not environment parameters are similar or not is not limited to this example.

For example, here the behavior is determined based on the degree of similarity between environment parameters, but instead, first, similar environment parameters may be grouped and then statistics may be extrapolated from the environment parameters in the group, and the behavior may be determined from the statistical data.

In this way, by building, in advance, a personal driver model from driving environment histories for a plurality of drivers, the driver can be notified of an even more appropriate behavior. Note that in order to register a safer driving environment history into the database, information may be stored in storage 8 that indicates a criterion for safe driving, vehicle controller 7 may determine whether a driving environment history meets the criterion or not, and vehicle controller 7 may then register driving environment histories that meet the criterion into the database and not register driving environment histories that do not meet the criterion into the database.

Moreover, by associating parameters indicating the driving environment with behaviors, vehicle controller 7 can determine the next behavior with precision without having to determine what kind of driving environment it is specifically, that is to say, without having to label the driving environment.

Note that the driver model (situation database) may be built from a driving environment history in which a behavior selected by the driver during autonomous driving is associated with environment parameters indicating the driving environment at the time the behavior was presented to the driver. Alternatively the driver model (situation database) may be built from a driving environment history in which a behavior selected by the driver during autonomous driving is associated with environment parameters indicating the driving environment at the time the behavior was implemented by the vehicle.

When the environment parameters indicate the driving environment at the point in time that the behavior selected by the driver was implemented by the vehicle, environment parameters that indicate a future driving environment may be predicted from environment parameters indicating the current driving environment, and the behavior associated with the environment parameters that have the highest degree of similarity with the predicted environment parameters from among the environment parameters indicating the driving environment at the point in time that the behavior selected by the driver was implemented by the vehicle may be determined to be the primary behavior, and the behaviors associated with the other similar environment parameters may be determined to be secondary behaviors.

The above-described prediction is performed by for example, extrapolating environment parameters for a future point in time from environment parameters indicating the current driving environment and environment parameters indicating a driving environment at a point in time before the current driving environment.

Alternatively, the driver model (situation database) may be built from both a driving environment history in which a behavior selected by the driver during autonomous driving is associated with environment parameters indicating the driving environment at the time the behavior was presented to the driver and a driving environment history in which a behavior selected by the driver during autonomous driving is associated with environment parameters indicating the driving environment at the time the behavior was implemented by the vehicle.

In such cases, for example, both driving environment histories are stored in a format like the one illustrated in (b) in FIG. 61, and vehicle controller 7 determines the next behavior from the driving environment histories. Here, vehicle controller 7 may assign priorities to the two driving environment histories and may determine the next behavior preferentially from, for example, the driving environment history in which a behavior selected by the driver during autonomous driving is associated with environment parameters indicating the driving environment at the time the behavior was implemented by the vehicle.

Note that in the present invention, the functions implemented by vehicle controller 7 may be implemented by a server such as a cloud server. In particular, since the amount data resulting from the accumulation of driving environment histories is large, storage 8 may be installed in a server such as a cloud server instead of in vehicle 1. Alternatively, storage 8 may store already built driver models and vehicle controller 7 may refer to the driver models stored in storage 8 to determine a behavior.

Note that in a configuration in which storage 8 is installed in a cloud server, a cache is preferably provided to account for instances in which storage 8 cannot be accessed due to a drop in connection speed or disconnection.

Figure 62:
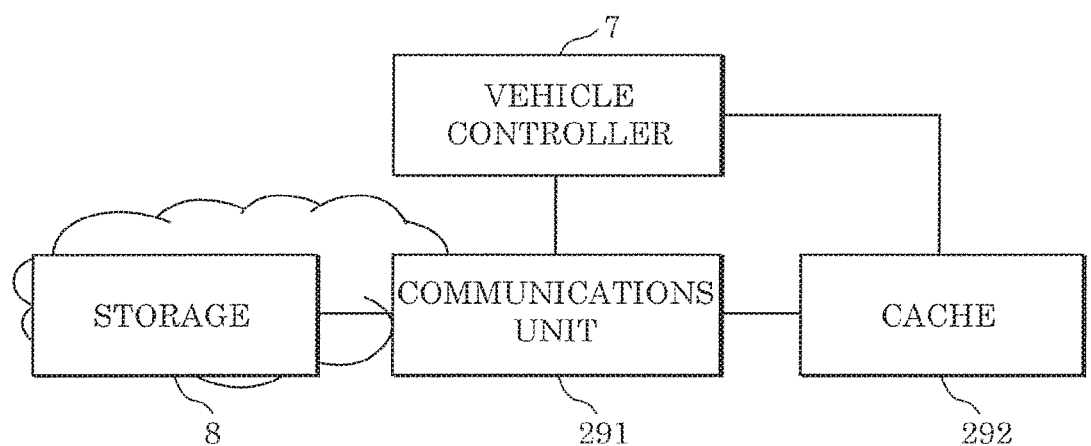
FIG. 62 is a block diagram illustrating one example of a cache arrangement according to this variation.

FIG. 62 is a block diagram illustrating one example of a cache arrangement. Vehicle controller 7 saves driving environment histories in storage 8 via communications unit 291, and causes, via communications unit 291, cache 292 to store some of the driver models (situation databases) stored in storage 8.

Vehicle controller 7 accesses driver models stored in cache 292. Conceivable methods for creating the cache include a method of limiting the cache based on the presence or absence of an environment parameter, a method of using positional information, and a method of processing data. Each will be described in more detail below.

First, the method of limiting the cache based on the presence or absence of an environment parameter will be described. Extracting similar surroundings by comparison is possible if there are sufficient driving environments (situations) including only the same environment parameters. Accordingly, vehicle controller 7 extracts driving environments having only the same environment parameters from among the driving environments stored in storage 8, sorts the extracted driving environments, and stores them in cache 292.

Here, vehicle controller 7 updates the primary cache when an environment parameter obtained from the detected surroundings is updated. With this, vehicle controller 7 can extract similar surroundings even if there is a drop in connection speed. Note that the environment parameter(s) to be checked for updates may be all of the environment parameters described above, or may be one or more of the environment parameters.

Moreover, since the environment parameters update on a moment to moment basis, cache 292 may include a primary cache and a secondary cache. For example, vehicle controller 7 stores driving environments having the same environment parameters in the primary cache. Further, vehicle controller 7 stores, in the secondary cache, at least one of a driving environment temporarily stored in the cache to which one environment parameter has been added and a driving environment temporarily stored in the cache to which one environment parameter has been removed.

With this, vehicle controller 7 can extract a similar surrounding state using only data stored in cache 292, even if the connection is temporarily interrupted.

Figure 63:
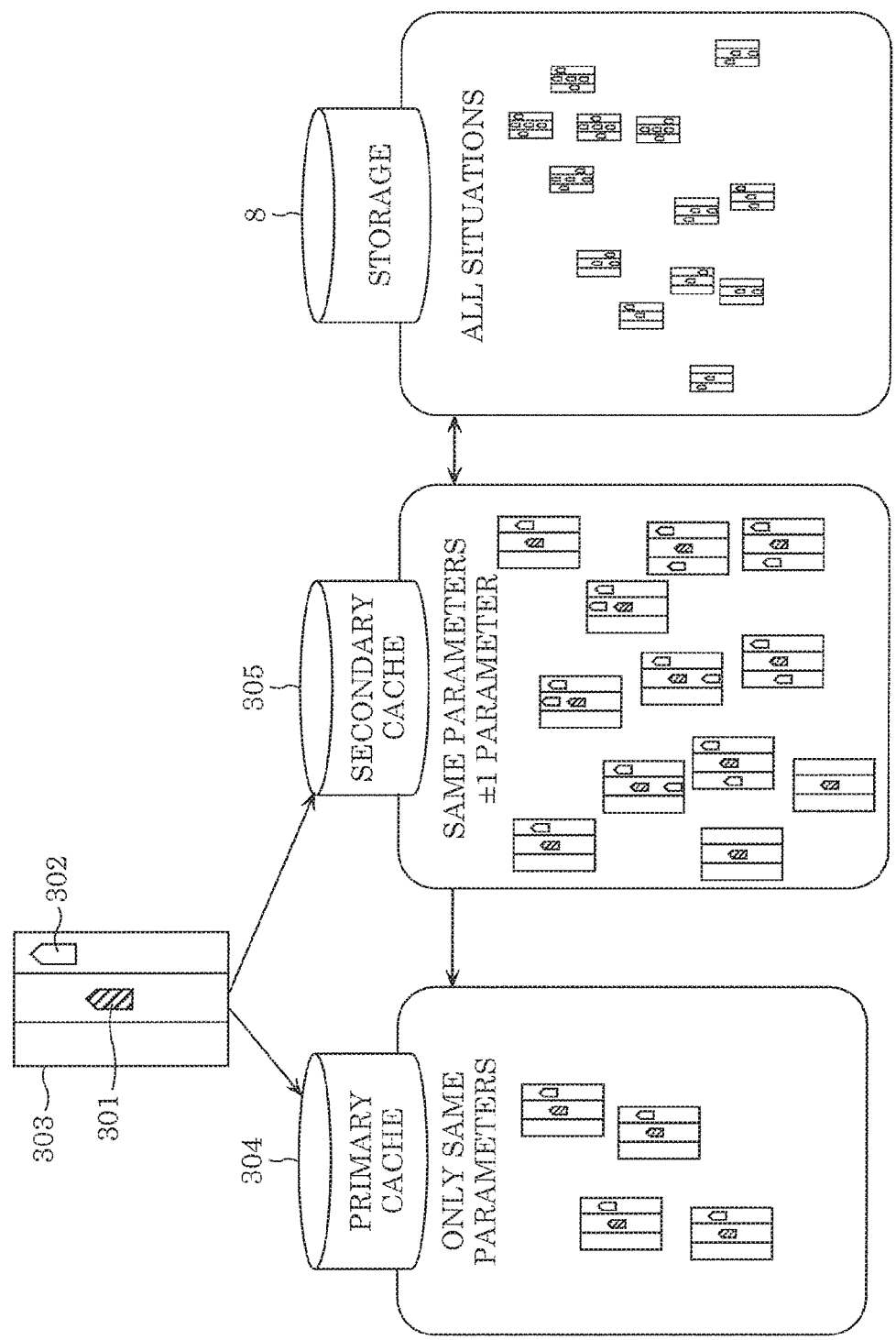
FIG. 63 is a block diagram illustrating one example of a cache creation method according to this variation.

This will be described in further detail with reference to FIG. 63. When sensor 62 detects surrounding state 303 in which only diagonally forward vehicle 302 is present in the surroundings of host vehicle 301, vehicle controller 7 extracts, from storage 8 in which all driving environments (situations) are stored, a driving environment in which only diagonally forward vehicle 302 is present (a driving environment including only the same environment parameters), and stores it in primary cache 304.

Vehicle controller 7 further extracts, from storage 8, a driving environment including, in addition to diagonally forward vehicle 302, one other vehicle (a driving environment to which one environment parameter has been added in addition to the same environment parameters) or a driving environment that does not include diagonally forward vehicle 302 (a driving environment to which one environment parameter has been removed from the same environment parameters), and stores the extracted driving environment in secondary cache 305.

Then, when surrounding state 303 detected by sensor 62 changes, vehicle controller 7 copies the driving environment corresponding to the changed surrounding state 303 from secondary cache 305 to primary cache 304, extracts, from storage 8, a driving environment to which one environment parameter has been added relative to the driving environment corresponding to the changed surrounding state 303 and a driving environment to which one environment parameter has been removed relative to the driving environment corresponding to the changed surrounding state 303, and stores the extracted driving environments into secondary cache 305 to update secondary cache 305. With this, vehicle controller 7 can smoothly extract a similar surrounding state by smoothly comparing surrounding states.

Next, the method that uses positional information will be described. When the environment parameters include positional information, vehicle controller 7 can extract, from storage 8, a driving environment (situation) in which the position indicated in the positional information is within a predetermined range centered on the position of the host vehicle, and store the extracted driving environment in cache 292.

In these cases, when the position indicated in the positional information corresponding to the driving environment is outside of the predetermined range, vehicle controller 7 updates cache 292. With this, even if the connection is interrupted for a long period of time, vehicle controller 7 can extract a similar surrounding state so long as the position is within a predetermined range.

Next, the method including processing data will be described. Input histories including environment parameters are accumulated in storage 8. Vehicle controller 7 divides the environment parameters per predetermined range to generate meshes in a multi-dimensional space. Vehicle controller 7 then generates a table in which behaviors included in the meshes are counted based on classification.

Figure 64:
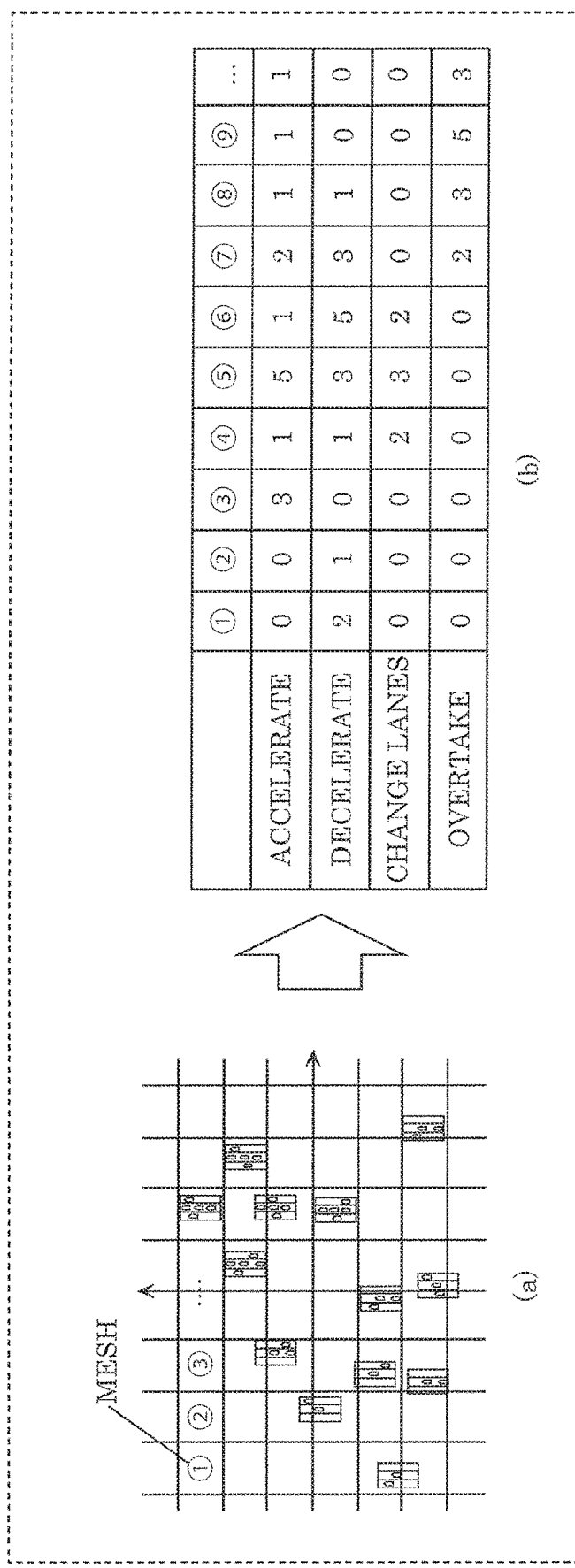
FIG. 64 is a block diagram illustrating one example of a cache creation method according to this variation.

For illustrative purposes, suppose that only two types of environment parameters are used, vehicle controller 7 two-dimensionally maps the environment parameters included in the input histories as illustrated in (a) in FIG. 64, and by dividing the axes of these at predetermined ranges, the plane can be divided into a plurality of blocks. Each of these is referred to as a mesh.

Vehicle controller 7 counts the number of behaviors included in each mesh based on the category of the behavior (for example, accelerate, decelerate, change lanes, overtake, etc.). In FIG. 64, (b) illustrates a table in which the number of behaviors included in each mesh has been counted based on category.

Vehicle controller 7 stores this information in cache 292. Then, upon extracting a similar surrounding state by comparison of surrounding states, vehicle controller 7 determines which mesh the detected environment parameter is positioned in, selects the behavior having the highest count from among the behaviors included in the determined mesh, and determines the selected behavior to be the behavior to be notified to the driver.

For example, when vehicle controller 7 determines that the detected environment parameter is located in mesh number 3, a behavior is determined that notifies of input of the behavior having the highest count from among the behaviors included in mesh number 3 (here, "accelerate"). With this method, cache 292 may be updated at any time, and cache 292 can be maintained at a constant size.

The cache is created using one or a combination of these methods. However, the methods provided above are mere examples to which the creation of the cache is not limited.

In this way in the driver model expansion example given in Embodiment 7, vehicle controller 7 obtains information on a feature amount indicating driving characteristics of the driver including information on a past driving environment, storage 8 stores the information on the feature amount, and when it is determined that the behavior of the vehicle needs to be changed, vehicle controller 7 determines, from among information on the feature amount stored in storage 8, information that is similar to feature amount indicating the driving characteristics of the driver including information on a newly obtained driving environment, and notifies the driver of a behavior corresponding to the determined information.

Moreover, in the driver model expansion example given in Embodiment 7, information on a feature amount indicating the driving characteristics of the driver including information on a past driving environment is at least one of information on a feature amount at the time the behavior of the vehicle is presented to the driver or information on a feature amount at the time that the driver selected the behavior.

Moreover, in the driver model expansion example given in Embodiment 7, when the information on a feature amount indicating the driving characteristics of the driver including information on a past driving environment is both information on a feature amount at the time the behavior of the vehicle is presented to the driver and information on a feature amount at the time that the driver selected the behavior, vehicle controller 7 determines, from among information on both the feature amounts, information that is similar to a feature amount indicating the driving characteristics of the driver including information on a newly obtained driving environment, and notifies the driver of a behavior corresponding to the determined information.

Moreover, in the driver model expansion example given in Embodiment 7, when the information on a feature amount indicating the driving characteristics of the driver including information on a past driving environment is both information on a feature amount at the time the behavior of the vehicle is presented to the driver and information on a feature amount at the time that the driver selected the behavior, vehicle controller 7 preferentially determines, from among information on feature amounts at the time the driver selected the behavior, information that is similar to a feature amount indicating the driving characteristics of the driver including information on a newly obtained driving environment, and notifies the driver of a behavior corresponding to the determined information.

Moreover, in the driver model expansion example given in Embodiment 7, information on a feature amount indicating the driving characteristics of the driver including information on a past driving environment is information on a feature amount indicating driving characteristics of the driver when the vehicle is being autonomously driven and/or when the vehicle is being manually driven.

With this, vehicle controller 7 can build an appropriate driver model from the driving tendencies of the driver, and based on the built driver model, can implement autonomous driving that is even more appropriate for the driver. By associating parameters indicating the driving environment with behaviors, it is possible to determine the next behavior with precision without having to determine what kind of driving environment it is specifically that is to say, without having to label the driving environment.

Embodiments according to the present invention have hereinbefore been described in detail with reference to the drawings, but the functions of the devices and processing units described above can be realized by a computer program.

A computer that realizes the above functions via a program includes, for example, an input device such as a keyboard, mouse, and/or touch panel, an output device such as a display and/or speaker(s), a processor or central processing unit (CPU), read only memory (ROM), random access memory (RAM), a storage device such as a hard disk and/or solid state drive (SSD), a reading device that reads information from a storage medium such as a universal serial bus (USB) memory, and a network card that performs communication over a network, and each unit is connected via a bus.

The reading device reads the above-described program from a recordable medium storing the program and stores the program into the storage device. Alternatively, the network card performs communication with a server connected to the network, and stores a program, downloaded from the server, for realizing the functions of the above-described devices into the storage device.

Then, the processor or CPU copies the program stored in the storage device into the RAM, and the commands included in the program are sequentially read from the RAM and executed, whereby the functions of the above-described units are realized.

INDUSTRIAL APPLICABILITY

The information processing system, information processing method, and program according to the present invention are applicable to devices and systems that process information related to the driving of a vehicle.

REFERENCE MARKS IN THE DRAWINGS 1 vehicle
2 brake pedal
3 accelerator pedal
4 turn signal lever
5 steering wheel
6, 1001 detector
7 vehicle controller
8 storage
9 information notification device
10 touch panel
29a-29c, 29g, 39a-39c, 39g, 59a-59c, 59g, 69a, 69c, 69g, 79a, 79c, 79g, 89a-89c, 89g, 99b. 99c, 99g, 109a-109d, 109e, 109g, 121, 121a-121d display region
51 input interface
51a-51h input button
59, 69, 79, 89, 99 text information
91 information obtainer
92 notifier
101 display unit
102 input unit
109 display
111, 112, 113, 114, 121, 121', 122, 122', 123, 131, 131', 132, 133, 134, 134', 135-137, 231, 232, 233, 233', 234, 234', 235, 251, 251', 252, 252', 253, 261, 262, 263, 264, 265, 266, 267, 268 symbol
291 communications unit
292 cache
301 host vehicle
302 diagonally forward vehicle
303 detected surrounding state
304 primary cache
305 secondary cache
401, 421, 1002 behavior learning unit
402, 422, 1003 behavior estimation unit
403, 416, 423, 436 behavior estimation result receiver
411, 431 general purpose behavior learning unit
412, 432 general purpose behavior estimation unit
413, 433 histogram generator
414, 434 dedicated behavior learning unit
415, 435 dedicated behavior estimation unit
441 evaluation unit
442, 442a, 442b switch
443 driver model behavior estimation unit
1000 information processing system

The invention claimed is:

1. An information processing system, comprising:
a detector that detects a vehicle environment state, the vehicle environment state being at least one of surroundings of a vehicle and a driving state of the vehicle;
a behavior learning circuit configured to cause a neural network to learn a relationship between the vehicle environment state detected by the detector and a behavior of the vehicle implemented in response to the vehicle environment state; and
a behavior estimation circuit configured to estimate a behavior of the vehicle by inputting, into the neural network that learned, the vehicle environment state detected at a current point in time by the detector; and
an evaluation circuit configured to determine whether the behavior estimated by the behavior estimation circuit is valid or not, and output the behavior estimated when the behavior estimated is determined to be valid,
wherein the behavior learning circuit includes:
a general purpose behavior learning circuit configured to build a general purpose neural network by causing the neural network to learn, for each of a plurality of drivers, the relationship between the vehicle environment state detected by the detector and the behavior of the vehicle implemented in response to the vehicle environment state; and
a dedicated behavior learning circuit configured to build a dedicated neural network for a specific driver by transfer learning involving causing the general purpose neural network to relearn by using a vehicle environment state detected by the detector for the specific driver and a behavior of the vehicle implemented in response to the vehicle environment state detected by the detector for the specific driver when the vehicle is driven by the specific driver,
wherein the behavior estimation circuit includes:
a general purpose behavior estimation circuit configured to estimate a tentative behavior of the vehicle being driven by the specific driver by inputting the vehicle environment state detected by the detector for the specific driver into the general purpose neural network;
a dedicated behavior estimation circuit configured to estimate a behavior of the vehicle being driven by the specific driver by using the dedicated neural network,
wherein the information processing system further comprises:
a histogram generator that generates a histogram of an estimation result of the tentative behavior by the general purpose behavior estimation circuit, and the dedicated behavior learning circuit is configured to build the dedicated neural network by the transfer learning involving referring to the histogram generated;
wherein the vehicle is at least partially autonomous; and
wherein an autonomous operation of the vehicle is modified in response to the building of the dedicated neural network.

2. The information processing system according to claim 1, further comprising:
an input circuit configured to receive a behavior of the vehicle input by the specific driver,
wherein the evaluation circuit
is configured to evaluate the behavior of the vehicle estimated by the behavior estimation circuit, based on the behavior of the vehicle received by the input circuit, and when the evaluation circuit evaluates that there is an error in the behavior of the vehicle estimated by the behavior estimation circuit, the evaluation circuit is configured to cause the behavior learning circuit to cause the neural network to relearn by using the behavior of the vehicle received by the input circuit and the surroundings of the vehicle detected by the detector at a time of the estimation of the behavior of the vehicle.

3. The information processing system according to claim 1, wherein
the dedicated behavior learning circuit
is configured to build, for each scene in which the vehicle is driven by the specific driver, the dedicated neural network for the specific driver in accordance with the scene, and select, from among a plurality of the dedicated neural networks, the dedicated neural network that is in accordance with a current scene in which the vehicle is driven by the specific driver, and
the dedicated behavior estimation circuit
is configured to estimate the behavior of the vehicle being driven by the specific driver by using the dedicated neural network selected.

4. The information processing system according to claim 1, further comprising:
a notifier circuit that notifies a driver of the behavior estimated by the behavior estimation circuit before the behavior is implemented.

5. An information processing method, comprising:
detecting a vehicle environment state, the vehicle environment state being at least one of surroundings of a vehicle and a driving state of the vehicle;
causing a neural network to learn a relationship between the vehicle environment state detected and a behavior of the vehicle implemented in response to the vehicle environment state;
estimating a behavior of the vehicle by inputting, into the neural network that learned, the vehicle environment state detected at a current point in time; and
determining whether the behavior estimated is valid or not, and outputting the behavior estimated when the behavior estimated is determined to be valid,
wherein the causing of a neural network to learn includes:
building a general purpose neural network by causing the neural network to learn, for each of a plurality of drivers, the relationship between the vehicle environment state detected and the behavior of the vehicle implemented in response to the vehicle environment state; and
building a dedicated neural network for a specific driver by transfer learning involving causing the general purpose neural network to relearn by using the vehicle environment state detected for the specific driver and the behavior of the vehicle implemented in response to the vehicle environment state detected by the detector for the specific driver when the vehicle is driven by the specific driver,
wherein the estimating includes:
estimating a tentative behavior of the vehicle being driven by the specific driver by inputting the vehicle environment state detected for the specific driver into the general purpose neural network;
estimating a behavior of the vehicle being driven by the specific driver by using the dedicated neural network, wherein the method further comprises:
generating a histogram of an estimation result of the tentative behavior, and in the building of the dedicated neural network, and
the dedicated neural network is built by the transfer learning involving referring to the histogram generated;
wherein the vehicle is at least partially autonomous; and
wherein an autonomous operation of the vehicle is modified in response to the building of the dedicated neural network.

6. A non-transitory computer-readable recording medium for use in a computer, the recording medium having a computer program recorded thereon for causing the computer to execute:
detecting a vehicle environment state, the vehicle environment state being at least one of surroundings of a vehicle and a driving state of the vehicle;
causing a neural network to learn a relationship between the vehicle environment state detected and a behavior of the vehicle implemented after the vehicle environment state;
estimating a behavior of the vehicle by inputting, into the neural network that learned, the vehicle environment state detected at a current point in time; and
determining whether the behavior estimated is valid or not, and outputting the behavior estimated when the behavior estimated is determined to be valid,
wherein the causing of a neural network to learn includes:
building a general purpose neural network by causing the neural network to learn, for each of a plurality of drivers, the relationship between the vehicle environment state detected and the behavior of the vehicle implemented after the vehicle environment state; and
building a dedicated neural network for a specific driver by transfer learning involving causing the general purpose neural network to relearn by using the vehicle environment state detected for the specific driver and the behavior of the vehicle implemented after the vehicle environment state detected by the detector for the specific driver when the vehicle is driven by the specific driver,
the estimating includes:
estimating a tentative behavior of the vehicle being driven by the specific driver by inputting the vehicle environment state detected for the specific driver into the general purpose neural network; and
estimating a behavior of the vehicle being driven by the specific driver by using the dedicated neural network,
the program further causes the computer to execute:
generating a histogram of an estimation result of the tentative behavior, and in the building of the dedicated neural network, and
the dedicated neural network is built by the transfer learning involving referring to the histogram generated,
wherein the vehicle is at least partially autonomous; and
wherein an autonomous operation of the vehicle is modified in response to the building of the dedicated neural network.

* * * * *